(12) United States Patent
McGrath et al.

(10) Patent No.: US 6,648,506 B2
(45) Date of Patent: Nov. 18, 2003

(54) FLUORESCENCE EMISSION RATIO IMAGING THERMOGRAPHY FOR USE IN HEAT TRANSFER ANALYSIS

(75) Inventors: John J. McGrath, DeWitt, MI (US); Bin Lian, Portland, OR (US)

(73) Assignee: Board of Trustees of Michigan State University, East Lansing, MI (US)

(*) Notice: Subject to any disclaimer, the term of this patent is extended or adjusted under 35 U.S.C. 154(b) by 0 days.

(21) Appl. No.: 09/949,281

(22) Filed: Sep. 7, 2001

(65) Prior Publication Data

US 2003/0128737 A1 Jul. 10, 2003

(51) Int. Cl.[7] .......................... G01K 11/00; G01K 3/00; G01N 21/64
(52) U.S. Cl. ..................... 374/161; 374/137; 250/461.1
(58) Field of Search ................................ 374/137, 161; 250/459.1, 461.1, 372; 356/43

(56) References Cited

U.S. PATENT DOCUMENTS

| | | | |
|---|---|---|---|
| 2,551,650 A | | 5/1951 | Urbach |
| 4,061,578 A | * | 12/1977 | Kleinerman ................. 250/330 |
| 4,075,493 A | | 2/1978 | Wickersheim |
| 4,198,568 A | * | 4/1980 | Robbins et al. ............. 250/459 |
| 4,215,275 A | | 7/1980 | Wickersheim |
| 4,302,970 A | | 12/1981 | Snitzer et al. |
| 4,374,037 A | | 2/1983 | Takahashi |
| 4,448,547 A | | 5/1984 | Wickersheim |
| 4,455,741 A | | 6/1984 | Kolodner |
| 4,523,799 A | | 6/1985 | Delhaye et al. |
| 4,560,286 A | | 12/1985 | Wickersheim |
| 4,652,143 A | | 3/1987 | Wickersheim et al. |
| 4,708,494 A | | 11/1987 | Kleinerman |
| 4,729,668 A | * | 3/1988 | Angel et al. ................. 374/161 |
| 4,789,992 A | | 12/1988 | Wickersheim et al. |
| 4,791,585 A | * | 12/1988 | Maki et al. ................. 374/159 |
| 4,819,658 A | | 4/1989 | Kolodner |
| 4,945,245 A | * | 7/1990 | Levin ....................... 250/461.2 |
| 5,149,972 A | | 9/1992 | Fay et al. |

(List continued on next page.)

FOREIGN PATENT DOCUMENTS

JP 61048739 A * 3/1986 ................. 374/161

OTHER PUBLICATIONS

Crofcheck et al, "Temperature–Sensitive Luminescence . . . " J. of Poly. Scie: . . . v33, pp 1735–1744 (1995).

Liu et al., Exp. Therm. Fluid Sci. 10: 101–112 (1995).

Chance et al., Adv. Chem. Phys. 37: 1–65 (1978).

Wicks et al., In: Organic Coatings: Science and Technology Vo. II. pp. 65–81 (1994).

Hoke. In: Experimental Measurement of the Slit Response Fun. and Corrected . . . Thesis, MSU, East Lansing, MI (1998).

*Primary Examiner*—Christopher W. Fulton
*Assistant Examiner*—Mirellys Jagan
(74) *Attorney, Agent, or Firm*—Ian C. McLeod

(57) ABSTRACT

The present invention provides a fluorescent imaging thermographic method and system for use particularly in surface temperature measurements, which are reproducible over time. The invention provides a temperature-sensitive fluorescent probe comprising a rare earth compound in an ultraviolet and fluorescence transparent medium wherein the intensity of fluorescence varies as the temperature varies, in particular, provided are probes comprising Europium(1,1,1,5,5,5-hexafluoroacetylacetone)$_3$ for measuring temperatures greater than 24° C., and Terbium(1,1,1,5,5,5-hexafluoroacetylacetone)$_3$ for measuring temperatures less than 24° C. The probe is applied as a layer to a surface, exposed to fluorescence-inducing energy, and emitted fluorescence measured. A ratio imaging algorithm enables the temperature at each location on the surface to be determined.

5 Claims, 41 Drawing Sheets

U.S. PATENT DOCUMENTS

| | | | |
|---|---|---|---|
| 5,304,809 A | | 4/1994 | Wickersheim |
| 5,435,937 A | | 7/1995 | Bell et al. |
| 5,580,172 A | * | 12/1996 | Bhardwaj et al. ............ 374/137 |
| 5,618,732 A | | 4/1997 | Pease et al. |
| 5,653,539 A | * | 8/1997 | Rosengaus .................. 374/159 |
| 5,705,821 A | | 1/1998 | Barton et al. |
| 5,730,528 A | * | 3/1998 | Allison et al. ............... 374/161 |
| 5,783,804 A | * | 7/1998 | Burke et al. ................. 219/494 |
| 5,971,610 A | * | 10/1999 | Kolodner et al. ............ 374/161 |
| 6,033,107 A | * | 3/2000 | Farina et al. ................... 374/5 |
| 6,123,455 A | | 9/2000 | Beshears et al. |

* cited by examiner

Poor Fiber/Matrix Wetting

Air Bubbles

Composite Surface Temperature Distribution at t = 21.0 s

Composite Surface Temperature Distribution at t = 45.5 s 7.7°C

-40°C

FLUORESCENCE EMISSION RATIO IMAGING THERMOGRAPHY FOR USE IN HEAT TRANSFER ANALYSIS

CROSS-REFERENCE TO RELATED APPLICATION

Not Applicable.

STATEMENT REGARDING FEDERALLY SPONSORED RESEARCH OR DEVELOPMENT

Not Applicable.

Reference to a "Computer Listing Appendix Submitted on a Compact Disc"

Not Applicable.

BACKGROUND OF THE INVENTION (1) Field of the Invention

The present invention relates to a fluorescent imaging thermographic method and system for use particularly in surface temperature measurements, which are reproducible over time. The invention provides a temperature-sensitive fluorescent probe comprising a rare earth compound in an ultraviolet and fluorescence transparent medium wherein the intensity of fluorescence varies as the temperature varies, in particular, probes comprising Europium(1,1,1,5,5,5-hexafluoroacetylacetone)$_3$ for measuring temperatures greater than 24° C., Terbium(1,1,1,5,5,5-hexafluoroacetylacetone)$_3$ for measuring temperatures less than 24° C., or both. The probe is applied as a layer to a surface, exposed to fluorescence-inducing energy, and the emitted fluorescence is captured as an image by a CCD camera. A novel ratio imaging algorithm enables the temperature at each location on the surface to be determined.

(2) Description of Related Art

The prior art has developed methods using fluorescence measurements to determine the temperature of a surface. The problem has been that the measurements have not been reproducible over time because of the photo-bleaching of the fluorescent probe.

U.S. Pat. No. 2,551,650 to Urbach discloses the measurement of temperature distributions on the surface of solid bodies using fluorescence emitting phosphors.

U.S. Pat. Nos. 4,075,493, 4,215,275, 4,448,547, and 4,560,286 to Wickersheim discloses a technique wherein an object or environment to be measured is provided with a phosphor material layer that emits at least two optically isolatable wavelength ranges whose intensity ratio depends upon the object or environment temperature. The technique uses optical system filters and signal processing to determine the temperature profile of the surface of the object. In particular embodiments, the emitted radiation is brought to the detector by an optical system, which may include an optical fiber.

U.S. Pat. No. 4,302,970 to Snitzer et al. discloses a temperature probe formed by an optical fiber having a core fabricated from a glass host doped with a trivalent rare earth such as europium positioned at the location where temperature is to be measured.

U.S. Pat. No. 4,374,037 to Takahashi discloses a method for preparing a divalent-europium-activated calcium sulfide phosphor comprising reacting a molten mixture consisting essentially of alkaline-earth-metal chloride and europium chloride with gaseous carbon disulfide at temperatures between 850° C. and 1200° C. for one to six hours.

U.S. Pat. No. 4,455,741 to Kolochner discloses a solid state electronic device that is optically monitored during fabrication to detect hot spots which are indicative of faulty operation. The surface temperature of the device is measured by applying a fluorescent material to the device and subsequently monitoring the temperature dependent fluorescence of the material.

U.S. Pat. No. 4,523,799 to Delhaye et al. discloses a device that optimizes the coupling of two optical systems for the observation and analysis of objects, one of the systems producing the illumination of a point on the object being studied while the other produces the image of that point in an analyzer.

U.S. Pat. Nos. 4,652,143 and 4,789,992 to Wickersheim et al. discloses an optical temperature measurement technique that utilizes the decaying luminescent intensity characteristic of a sensor composed of a luminescent material that is excited to luminescence by a light pulse or other periodic or other intermittent source of radiation. The luminescence emissions of a preferred sensor exhibit an approximately exponential decay with time that is the average of a distribution of chemically reproducible crystallites and are repeatable with a high degree of accuracy regardless of excitation level or prior temperature history of the sensor.

U.S. Pat. No. 4,708,494 to Kleinerman discloses methods and materials associated with remote optical measurements of temperatures with luminescent sensors.

U.S. Pat. No. 4,819,658 to Kolodner discloses a method and apparatus for measuring the temperature profile of a surface exhibiting spacial or temporal variations in temperature. The fluorescent material is applied in a layer less than 10 $\mu$m in thickness and in thermal contact with the surface.

U.S. Pat. No. 5,149,972 to Fay et al. discloses an imaging apparatus, which includes a fluorescence imaging microscope, ultraviolet radiation source capable of producing a plurality of ultraviolet excitation wavelengths, a filter device to select a first and a second excitation wavelength from the plurality of ultraviolet excitation wavelengths, a sample chamber to hold a sample for illumination by the radiation of the first and second wavelengths, and a processor in communication with a photometer to record the intensity signal produced by the photometer.

U.S. Pat. No. 5,304,809 to Wickersheim discloses the use of a CCD camera to measure the image and luminescent signal from a fluorescent layer disposed on an object. The system further contains a computer for measuring the differences in transmissions and calculating the temperature of the object.

U.S. Pat. No. 5,435,937 to Bell et al. discloses a polymer material containing compounds, which are internally luminescent.

U.S. Pat. No. 5,618,732 to Pease et al. discloses a method of calibrating photo-activatable chemiluminescent matrices.

U.S. Pat. No. 5,705,821 to Barton et al. discloses a scanning fluorescence microthermal imaging apparatus and method. The apparatus focuses a laser onto a thin fluorescent film disposed over the surface of an integrated circuit. By collecting fluorescent radiation information from the film, and performing point-by-point data collection with a single-point photodetector, a thermal map of the integrated circuit is formed to measure any localized heating associated with defects in the integrated circuit.

U.S. Pat. No. 6,123,455 to Beshears et al. discloses an apparatus for measuring the temperature of a moving substrate which includes an air gun to spray controlled amounts of a powdered phosphor onto the moving substrate. A laser produces light pulses, and optics direct the light pulses onto the phosphor on the moving substrate, in response to which the phosphor emits luminescence with a decay rate indicative of the temperature of the phosphor. A photodetector detects the luminescence.

Crofcheck et al. (J. Polymer Sci: Part A: Polymer Chem. 33: 1735–1744 (1995)) discloses a method for monitoring the temperature of high speed cationic photopolymerizations using temperature-sensitive tris(β-diketone) chelates of europium probes and detecting temperature-sensitive luminescence of the probes during the reaction. The method uses either europium(1,1,1,5,5,5-hexafluoroacetylacetone)$_3$ or europium(benzoyl-1,1,1-trifluoroacetone)$_3$ as the probe and measures the temperature of the photopolymerizations using a two-wavelength ratiometric method.

SUMMARY OF THE INVENTION

The present invention provides a fluorescent imaging thermographic method and system for use particularly in surface temperature measurements, which are reproducible over time. The invention provides a temperature-sensitive fluorescent probe comprising a rare earth compound in an ultraviolet and fluorescence transparent medium wherein the intensity of fluorescence varies as the temperature varies, in particular, provided are probes comprising Europium(1,1,1, 5,5,5-hexafluoroacetylacetone)$_3$ for measuring temperatures greater than 20° C. or Terbium(1,1,1,5,5,5-hexafluoroacetylacetone)$_3$ for measuring temperatures less than 20° C., or both. The probe is applied as a layer to a surface, exposed to fluorescence-inducing energy, and the emitted fluorescence is captured as an image by a CCD camera. A novel ratio imaging algorithm enables the temperature at each location on the surface to be determined.

Therefore, the present invention provides a system for determining a temperature distribution of a surface exhibiting spatial, temporal, or combinations thereof variations in temperature where there is a layer on the surface with a temperature sensitive fluorescent material including a rare earth compound that is resistant to photo-bleaching over time in an ultraviolet and fluorescence transparent medium, wherein the material is in thermal contact with the surface, and wherein the fluorescence emission of the material varies as the temperature of the surface varies, which system comprises (a) light producing means for exposing the material to fluorescence-inducing energy over time as the temperature changes which induces the material to emit fluorescence at one or more visible wavelengths; (b) sensing means for detecting an image of the fluorescence induced by the fluorescence-inducing energy; (c) photodiode means for measuring fluctuations in the fluorescence-inducing energy during calibration of the system or during long exposure times of the material to the fluorescence-inducing energy source; and (d) computer means for processing the image from the camera means and the measurements from the photodiode means wherein the computer means determines the temperature distribution of the surface over time.

Preferably, the light producing means in the system produces is ultraviolet light.

Further it is preferable that the temperature distribution is produced by determining a relationship between the fluorescence intensity and the temperature for each location on the surface by establishing the calibration between either a ratio of broadband fluorescent intensity at an unknown temperature and at a known reference temperature for each location on the surface or a ratio of fluorescent intensities of at least two distinct wavelengths of fluorescence emission, whereby the ratio is an indication of the temperature for each location on the surface.

Further still, it is preferable that the transparent medium is selected from the group consisting of poly(methylmethacrylate), perdeutero-poly(methylmethacrylate), and mixture thereof.

Further still, it is preferable that the rare earth compound is a lanthanide(β-diketone)$_3$ chelate. Preferably, wherein the lanthanide(β-diketone)$_3$ chelate is selected from the group consisting of europium(1,1,1,5,5,5-hexafluoroacetylacetone)$_3$, europium(benzoyl-1,1,1-trifluoroacetone)$_3$, europium(6,6,7,78,8,8-heptafluooro-2,2-dimethyl-3,5-octanedionato)$_3$, europium(2,2,6,6-tetramethyl-3,5-heptanedionato)$_3$, terbium(1,1,1,5,5,5-hexafluoroacetylacetone)$_3$, terbium(benzoyl-1,1,1-trifluoroacetone)$_3$, terbium(6,6,7,78,8,8-heptafluooro-2,2-dimethyl-3,5-octanedionato)$_3$, and terbium(2,2,6,6-tetramethyl-3,5-heptanedionato)$_3$, and combinations thereof.

It is further preferred that in the system the sensing means is selected from the group consisting of a CCD camera, a CID sensor, and a CMOS sensor.

Further still, the present invention provides a system for determining a temperature profile of a surface exhibiting spatial, temporal, or combinations thereof variations in temperature of a layer including a temperature-sensitive fluorescent material selected from the group consisting of Europium(1,1,1,5,5,5-hexafluoroacetylacetone)$_3$, terbium(1, 1,1,5,5,5-hexafluoroacetylacetone)$_3$, and combinations thereof in an ultraviolet and fluorescence transparent medium capable of being positioned on the surface wherein the fluorescence of the material varies as the temperature varies, which apparatus comprises (a) a light producing means for providing a fluorescence-inducing energy source for inducing the temperature-sensitive fluorescent material to emit fluorescence in one or more visible wavelengths, which are reproducible over time; (b) a sensing means for acquiring an image of the fluorescence; (c) a photodiode means for measuring fluctuations in the fluorescence-inducing energy during calibration of the apparatus or during long exposure times of the layer on the surface to the fluorescence-inducing energy source; and (d) a computer means for processing the image acquired by the camera means and the measurements from the photodiode means wherein the computer means determines the temperature distribution of the surface at each point in the image.

In a preferred embodiment, the light producing means produces ultraviolet light.

Preferably, in the system the temperature distribution is produced by determining a relationship between the fluorescence and the temperature for each location on the surface by establishing a calibration between either a ratio of broadband fluorescent intensity at an unknown temperature and at a known reference temperature for each location on the surface or a ratio of fluorescent intensities of at least two distinct wavelengths of fluorescence emission, whereby the ratio is an indication of the temperature for each location on the surface.

Further still, it is preferable that the medium is selected from the group consisting of poly(methylmethacrylate), perdeutero-poly(methylmethacrylate), and mixture thereof.

Further still, it is preferable that the sensing device is selected from the group consisting of a CCD camera, a CID sensor, and a CMOS sensor.

The present invention also provides a method for measuring a temperature distribution of a surface exhibiting spatial, temporal, or combinations thereof variations in temperature, comprising (a) providing a surface with a layer of a temperature-sensitive fluorescent material including a rare earth compound that is resistant to photo-bleaching over time in an ultraviolet and fluorescence transparent medium, wherein the material is in thermal contact with the surface, and wherein the fluorescence emission of the material varies as the temperature of the surface varies; (b) exposing the material to a fluorescence-inducing energy source which induces the material to emit fluorescence at one or more visible wavelengths over time; (c) detecting the induced fluorescence emission with a sensing device over time, which produces an image of the induced fluorescence, and measuring fluctuations in the fluorescence-inducing energy during calibration of the method and during long exposure times of the material on the surface to the fluorescence-inducing energy source with a photodiode; (d) determining the temperature distribution of the surface by establishing a calibration which defines quantitatively a relationship between fluorescence intensity and the temperature for each location on the surface wherein the calibration is either a ratio of broadband fluorescent intensity at an unknown temperature and at a known reference temperature for each location on the surface or a ratio of fluorescent intensities of at least two distinct wavelengths of fluorescence emission, whereby the ratio is an indication of the temperature for each location on the surface; and (e) measuring the temperature of the surface over time.

Preferably, in the method the fluorescence image and the fluorescence intensity are digitized and stored in a data buffer of a computer.

It is further preferable in the method that a computer program accesses the fluorescence image and the fluorescence intensity from the data buffer and processes the fluorescence image and the fluorescence intensity to produce the temperature distribution.

In a preferred embodiment of the method, the medium is selected from the group consisting of poly(methylmethacrylate), perdeutero-poly(methylmethacrylate), and mixture thereof.

It is further preferable that the rare earth compound is a lanthanide($\beta$-diketone)$_3$ chelate. In particular, wherein the lanthanide($\beta$-diketone)$_3$ chelate is selected from the group consisting of europium(1,1,1,5,5,5-hexafluoroacetylacetone)$_3$, europium(benzoyl-1,1,1-trifluoroacetone)$_3$, europium(6,6,7,78,8,8-heptafluooro-2,2-dimethyl-3,5-octanedionato)$_3$, europium(2,2,6,6-tetramethyl-3,5-heptanedionato)$_3$, terbium(1,1,1,5,5,5-hexafluoroacetylacetone)$_3$, terbium(benzoyl-1,1,1-trifluoroacetone)$_3$, terbium(6,6,7,78,8,8-heptafluooro-2,2-dimethyl-3,5-octanedionato)$_3$, and terbium(2,2,6,6-tetramethyl-3,5-heptanedionato)$_3$, and combinations thereof.

It is further preferable, that the fluorescence-inducing energy source is ultraviolet light.

Further still, it is preferable that the sensing device is selected from the group consisting of a CCD camera, a CID sensor, and a CMOS sensor.

The present invention further provides a method for measuring a temperature distribution of a surface exhibiting spatial, temporal, or combination thereof variations in temperature, comprising (a) providing on the surface with a layer of a temperature-sensitive fluorescent material selected from the group consisting of Europium(1,1,1,5,5,5-hexafluoroacetylacetone)$_3$, terbium(1,1,1,5,5,5-hexafluoroacetylacetone)$_3$, and combinations thereof in an ultraviolet and fluorescence transparent medium, wherein the material is in thermal contact with the surface, and wherein fluorescence emission of the material varies as the temperature of the surface varies; (b) exposing the material to fluorescence-inducing energy which causes the material to emit fluorescence in a visible wavelength; (c) detecting the fluorescence emission of the material over time; and (d) determining the temperature distribution of the surface over time.

Preferably, the fluorescence-inducing energy is ultraviolet light.

Further still, it is preferable that the medium is selected from the group consisting of poly(methylmethacrylate), perdeutero-poly(methylmethacrylate), and mixture thereof.

Further still, it is preferable that the temperature distribution is produced by determining a relationship between the fluorescence intensity and the temperature for each location on the surface by establishing a calibration between either a ratio of broadband fluorescent intensity at an unknown temperature and at a known reference temperature for each location on the surface or a ratio of fluorescent intensities of at least two distinct wavelengths of fluorescence emission, whereby the ratio is an indication of the temperature for each location on the surface.

Further still, it is preferable that the fluorescence induced by the fluorescence-inducing energy is detected as an image by a sensing device and a photodiode is provided for measuring fluctuations in the fluorescence induced by the fluorescence-inducing energy during calibration of the method or during long exposure times of the material on the surface to the fluorescence-inducing energy source. In particular, wherein the sensing device is selected from the group consisting of a CCD camera, a CID sensor, and a CMOS sensor.

Further still, it is preferable that the fluorescence image and the intensity are digitized and stored in a data buffer of a computer. In particular, wherein a computer program accesses the image from the data buffer and processes the image and the intensity to produce the temperature distribution.

OBJECTS

It is an object of the present invention to provide a method and system for determining the temperature profile on a surface exhibiting spatial, temporal, or combinations thereof variations in temperature of a layer using a temperature-sensitive fluorescent material as a probe wherein the probe is resistant to photo-bleaching.

These and other objects of the present invention will become increasingly apparent with reference to the following drawings and preferred embodiments.

DESCRIPTION OF THE DRAWINGS

FIG. 59b is another view of the glass housing shown in FIG. 59a.

DETAILED DESCRIPTION OF THE INVENTION

Figure 1:
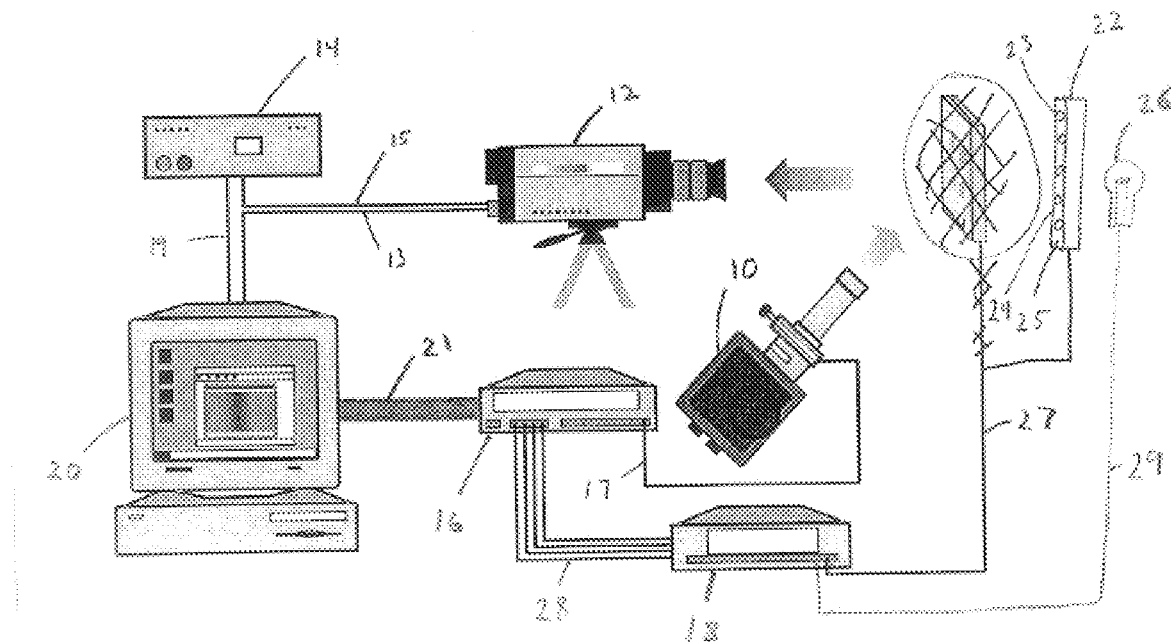
FIG. 1 is a schematic illustration of the system of the present invention.

All patents, patent applications, government publications, government regulations, and literature references cited in this specification are hereby incorporated herein by reference in their entirety. In case of conflict, the present description, including definitions, will control.

The term "FERIT" is an acronym for "Fluorescence Emission Ratio Imaging Thermography" which is used herein to refer to the method and system of the present invention.

There have been increasing demands in energy-related industrial process control and monitoring for two-dimensional thermographic information. With the dramatic increase in computing power and lower computational costs, complex 2-dimensional and 3-dimensional heat transfer problems can now be modeled to evaluate a product's performance before the designs are handed to the manufacturing floor. Such practice is crucial not only to ensure good performance of a product, but it also plays a vital role in cost reduction related to the potential savings in prototyping. The accuracy of the computer model will ultimately determine the usefulness of the model itself.

There have been continuing efforts devoted to verifying computer models. Comparison of data created by the computer models with experimental measurements are necessary and critical. Such comparison requires as much experimental data as possible. In the case of temperature measurements, there have been increasing demands for field information, which can only be offered by thermographic measurement tools such as infrared, liquid crystal, and fluorescent/phosphorescent methods.

Unfortunately, it is not possible to meet the above measurement requirements using only one of the methods currently available while considering accuracy, ease of use, dynamic response, and cost factors.

For example, while the infrared method is quite versatile, its high cost and relatively poor spatial resolution as well as the difficulty of obtaining accurate emissivity data make it less attractive to many users. New classes of IR cameras have become available using small format (320×240) PtSi sensor arrays or even the microbolometer arrays. Their temperature measurement accuracy is poorer than the scanning HgCdTe sensor even with calibration to account for the response non-uniformity of individual IR sensing element. There has been some improvement in dynamic response (frame-rate) for these new devices but there isn't much improvement for its spatial resolution.

Moderately high temperature accuracy (about 0.2° C.) can be achieved utilizing the liquid crystal method but this is only possible in a fairly narrow temperature range (about 10° C.). The method has limited dynamic response and is useful primarily on flat surfaces. Calibration is a difficult problem for the liquid crystal method. The method has rarely been applied to applications on microscopic scale (about 1 μm).

The phosphor method, which measures the decay time of rare-earth chemical compounds, usually requires exotic optics and electronics. The method has had limited success for use in obtaining accurate temperature measurements because of high costs. Prior art fluorescence-based methods such as those based on europium theoyltrifluoroacetonate (EuTTA) probes applied as a layer on a surface promised low cost, good accuracy and high spatial resolution. However, photo-bleaching (fluorescence intensity decaying over time)of EuTTA probes when exposed to a fluorescence-inducing energy source such as ultraviolet (UV) light has prevented the EuTTA-based methods from being useful for measuring temperatures on a surface either transiently or under steady-state conditions. Photo-bleaching makes calibration difficult because the sample has to be placed in a vacuum to prevent photo-bleaching over the several hour period required for calibration (in general, about 3 hours is required for 7 calibration points). In addition, fluctuation of the UV light source is a major determining factor in intensity measurement accuracy, which has not been considered in previous investigations. The EuTTA-based methods also have a limited workable temperature range centered around 30° C. Therefore, measuring temperature distributions on a surface under high or low temperature conditions is not possible.

Fluorescent imaging thermographic methods have been proposed as early as the 1970's but they never received the attention and popularity that had been achieved by the infrared and liquid crystal methods. Even though limited progress had been achieved in areas such as temperature-sensitive film fabrication, little work had been done towards development of a fluorescent imaging thermographic method that is useful.

Compared to the infrared method, the present invention enables higher spatial resolution because the emitted light from the probe is in the region of visible wavelengths and the present invention has much lower costs, easier calibration and temperature interpretation, comparable or higher temperature accuracy, a broader temperature operating range, and lower operating and maintenance costs.

Compared to the liquid crystal method, the present invention enables higher spatial resolution because thinner films can be fabricated (sub-micron for the present invention compared to about 50 $\mu$m for liquid crystal) and it has a wider operating range, easier calibration, and easier temperature interpretation.

Compared to other fluorescent methods, the present invention has a solvent system that is more environmentally friendly. The solvent system has lower surface tension than chlorobenzene or acetone and has a higher evaporation rate. Most importantly, the temperature-sensitive flourescent probes were discovered to be resistant to photo-bleaching, which makes calibration much easier. The probes also have a wider working range compared to the 30° C. for the EuTTA system. And, system characterization and UV fluctuation monitoring reduces error by more than half.

FIG. 1 shows a schematic diagram illustrating the general setup of the FERIT method and system of the present invention. The method and system comprises a fluorescence-inducing energy source 10, a sensing device 12 capable of computing at least both 12 and 16 bit gray scale images, a sensing device temperature controller 14, a multi-function acquisition board 16, a channel expansion board 18, and a computer 20 for overall system control and integration, data acquisition for energy source intensity fluctuation monitoring, temperature measurement, and digital control. Preferably, sensing device 12 is charge-coupled-device (CCD) camera, either a full-frame or frame transfer CCD camera. However, other sensing devices such as CID and CMOS sensors, which are based on different operating principles, can be used. In the embodiment shown herein, fluorescence-inducing energy source 10 is an ultraviolet light source consisting of a mercury/xenon lamp and ultraviolet light filter. Preferably, computer 20 uses a PENTIUM or equivalent computer with a WINDOWS-based operating system with a clock speed exceeding 300 MHz. WINDOWS is a trademark of Microsoft Corporation and PENTIUM is a trademark of Intel Corporation.

An object 22 is coated with an admixture comprising a temperature sensitive fluorescence probe 23 in an ultraviolet and fluorescence transparent medium 25 to form layer 24. Object 22 is connected to channel expansion board 18 via data input-output line 27. Channel expansion board 18 is connected to multi-function acquisition board 16 via data input-output line 28. Object 22 is exposed to energy source 10, which is controlled by computer 20 via data input-output line 21 to multi-function acquisition board 16 via data input-output line 17. Energy source 10 induces the probe 23 in layer 24 to emit fluorescence at one or more visible wavelengths. Temperature controller 14, which is controlled by computer 20 via data input-output line 19, maintains sensing device 12 at an appropriate cooled temperature via input-output line 15. The sensing device 12, acquires an image of the fluorescence emitted by probe 23 in layer 24 and transfers the images by data input-output line 13 to computer 20, which measures the gray scale intensity of each location in the image. As the temperature of object 22 changes, the intensity of the fluorescence changes for each location in the image. In general, the change in temperature across the surface of object 22 is not uniform over time, therefore, the change in intensity for each location on the surface varies. Sensing device 12 measures the changes in intensity caused by the temperature change over time and transfers the images to computer 20. These intensity changes are calibrated to quantify the change in temperature of object 22.

In an optional embodiment, the system further includes photodiode 26 for measuring fluctuations in the fluorescence-inducing energy from energy source 10 during calibration of the system or during long exposure times to the fluorescence-inducing energy source. Photodiode 26 is connected to channel expansion board 18 via data input-output line 29.

The system preferably includes sensing device temperature controller 14 operably connected by line 15 to sensing device 12 because controller 14 helps to reduce dark current which could degrade the dynamic range of the images and keeps sensing device 12 at a stable temperature so that consistent measurements can be obtained. In general, cooling below −10° C. to −20° C. is sufficient.

The multi-function acquisition board 16 measures UV source intensity fluctuation and selects a temperature channel from expansion board 18, which measures the temperature of the selected channel.

The FERIT method and system uses as the probe for determining a temperature distribution of a surface a temperature sensitive fluorescent material comprising a rare earth compound that is resistant to photo-bleaching in an ultraviolet and fluorescence transparent medium. Preferably, the rare earth compound is a lanthanide($\beta$-diketone)$_3$ chelate. In particular, a lanthanide($\beta$-diketone)$_3$ chelate that is selected from the group consisting of europium(1,1,1,5,5,5-hexafluoroacetylacetone)$_3$, europium(benzoyl-1,1,1-trifluoroacetone)$_3$, europium(6,6,7,78,8,8-heptafluooro-2,2-dimethyl-3,5-octanedionato)$_3$, europium(2,2,6,6-tetramethyl-3,5-heptanedionato)$_3$, terbium(1,1,1,5,5,5-hexafluroacetylacetone)$_3$, terbium(benzoyl-1,1,1-trifluoroacetone)$_3$, terbium(6,6,7,78,8,8-heptafluooro-2,2-dimethyl-3,5-octanedionato)$_3$, and terbium(2,2,6,6-tetramethyl-3,5-heptanedionato)$_3$, and combinations thereof.

Ultraviolet and fluorescence transparent mediums include, but are not limited to, poly(methyl-methacrylate) (PMMA), perdeutero-poly(methylmeth-acrylate) (D-PMMA), polystyrene, and polyethylene.

Figure 2:
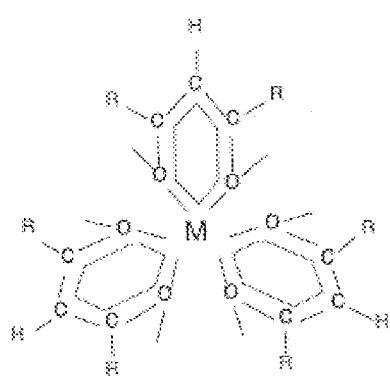
FIG. 2 is a diagram of the chemical structure of a lanthanide($\beta$-diketone)$_3$ chelate wherein M is europium or terbium and R is a CF$_3$ group of the 1,1,1,5,5,5-hexafluoroacetylacetone (hfa). When M is europium, the lanthanide($\beta$-diketone)$_3$ chelate is europium(1,1,1,5,5,5-hexafluoroacetylacetone)$_3$ (Eu(hfa)$_3$) and when M is terbium, the lanthanide($\beta$-diketone)$_3$ chelate is terbium(1,1,1,5,5,5-hexafluoroacetylacetone)$_3$ (Tr(hfa)$_3$).
Figure 3:
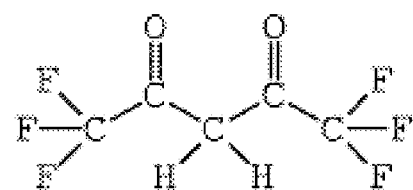
FIG. 3 is the structure of 1,1,1,5,5,5-hexafluoroacetylacetone (hfa).
Figure 19:
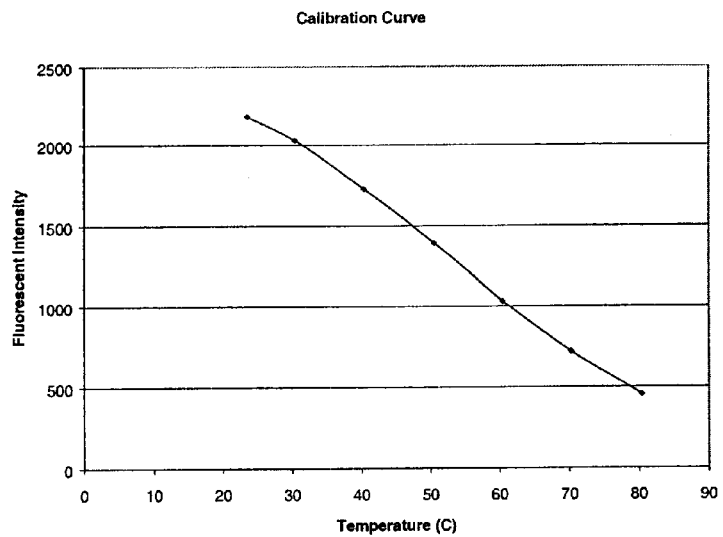
FIG. 19 is a graph of the calibration curve for the fluorescent emission of Eu(hfa)$_3$ as a function of temperature.

In a preferred embodiment of the FERIT method and system of the present invention, the lanthanide($\beta$-diketone)$_3$ chelate probe that is preferred for determining a temperature distribution of a surface in the temperature range from about 24° C. to the melting temperature of the medium containing the probe is europium(1,1,1,5,5,5-hexafluoroacetylacetone)$_3$ (Eu(hfa)$_3$), which has a molecular weight of 773.11. FIG. 2 shows the structure of Eu(hfa)$_3$ wherein M is europium and R is a CF$_3$ group of the 1,1,1,5,5,5-hexafluoroacetylacetone. FIG. 3 shows the structure of 1,1,1,5,5,5-hexafluoroacetylacetone. FIG. 19 shows the fluorescent emission intensity for Eu(hfa)$_3$ as a function of temperature. Because of thermal quenching, the fluorescent emission intensity decreases monotonically with increasing temperature.

As shown in the examples herein, the probe is applied to surfaces as an admixture in a medium comprising PMMA. In general, PMMA has a melting temperature of about 200° C.; however, the precise melting point of the PMMA will vary depending on the chain length of the monomers and the grade of the PMMA. Therefore, the Eu(hfa)$_3$ probe in admixture with PMMA has a useful measuring range from about 24° C. to at least 200° C. Thus, the effective measuring range for the Eu(hfa)$_3$ probe is limited by the melting temperature of the medium. The higher the melting temperature of the medium comprising the Eu(hfa)$_3$ probe, the higher the upper limit of the temperature measuring range. The only requirements for the medium is that it be transparent to ultraviolet light and fluorescent light and preferably, that it be resistant to water or moisture.

By mixing the Eh(hfa)$_3$ probe with the polymer PMMA to form an admixture and applying the admixture to a surface, the admixture forms a layer on the surface that is both water and moisture resistant. In contrast, prior art probes such as the Eu(TTA) probe are sensitive to water and moisture. Thus, the Eu(hfa)$_3$ probe, particularly when in admixture with a water impervious medium such as PMMA, enables temperature distributions of a surface to be determined when the surface is in a high humidity or an aqueous environment.

The Eu(hfa)$_3$ probe was discovered to be resistant to photo-bleaching under constant ultraviolet light irradiation. Photo-bleaching is a severe limitation of prior art probes such as the Eu(TTA) probe. Because the Eu(hfa)$_3$ probe is resistant to photo-bleaching, the probe can be exposed to light for extended periods of time, which makes long-term temperature measurements possible. This is a substantial improvement over the probes of the prior art.

The lanthanide(β-diketone)$_3$ chelate probe that is preferred for determining a temperature distribution of a surface in the temperature range of 240 C to at least −80° C. is terbium(1,1,1,5,5,5-hexafluoroacetylacetone)$_3$ (Tr(hfa)$_3$). FIG. 2 shows the structure of Tr(hfa)$_3$ wherein M is terbium and R is a CF$_3$ group of the 1,1,1,5,5,5-hexafluoroacetylacetone. The only limitation on the Tr(hfa)$_3$ probe is that fogging or frosting, which may develop over time at very low temperatures, may result in scatter of the excitation and emission signals.

For measuring temperature distributions on a surface over a wide range of temperatures, from very cold to very hot, the Eu(hfa)$_3$ and Tr(hfa)$_3$ probes can be applied to the surface as an admixture in an appropriate medium such as PMMA. The admixture is useful for determining temperature distributions on a surface over time for surfaces that are exposed to both hot and cold temperatures.

To obtain the surface temperature distribution of a particular object coated with one of the above probes, an image containing the intensity distribution at a known (reference) temperature is obtained so that the temperature at other times can be inferred from images taken at later times. Since the calibration is essentially non-linear, an efficient algorithm/method was developed to facilitate fast temperature rendering.

Previously published qualitative work used a linear or exponential relationship to infer the temperature distribution, which usually resulted in several degrees in measurement error. A more elaborate mathematical model can be used to obtain a much better fit for the calibration curve. Such a model also provides an efficient way to convert fluorescent intensity to temperature.

One option is to use a high order polynomial function to represent the calibration relation. To obtain temperature information with such an approach, the following steps are required.

(1) Reference intensity at the reference temperature $I_{calib}$ ($T_{ref}$) is calculated with the calibration relation (polynomial: Intensity (Temperature)).

(2) The two measured intensities $I(T_{ref})$ and $I(T_{unknown})$ are scaled proportionally so that $I^+(T_{ref})=I_{calib}(T_{ref})$, and $I^+(T_{unknown})$ is obtained (the asterisk denotes scaled measurements).

(3) Apply $I^+(T_{unknown})$ to the inverse polynomial relation (polynomial: Temperature (Intensity)) to obtain $T_{unknown}$.

It is apparent that a total of 16 multiplications is required (16=14+2) for seven calibration points. However, because multiplication is an expensive calculation, such an approach is very slow. In addition, the temperature conversion time depends on the number of calibration points, which is an undesirable feature.

Two avoid the above, a hybrid linear search model was developed for the FERIT method and system of the present invention, which is used by a computer program to determine the temperature. Instead of using a polynomial to represent the calibration relation for the temperature range that is calibrated, the calibration relation is tabulated in very small intervals (0.01° C.). Since seven calibration points were measured between room temperature up to 80° C. (at 10° C. intervals), a seventh degree polynomial was used to fit the seven calibration data and data are interpolated between calibration points with a 0.01° C. interval. The error introduced is minimal for the range considered (<0.01° C.).

To derive temperature measurements, the measured intensities are scaled to match the value of calibration at the reference temperature to obtain $I^+(T_{ref})=I_{calib}(T_{ref})$ and $I^+(T_{unknown})$. Since the approximate slope in the intensity temperature calibration curve is known, a linear search is performed to get to the neighborhood of the final temperature where a sequential search starts until the final temperature is found. Since this approach uses only three multiplications and the sequential search is very efficient, the resulting speed is very good (<0.2 s) and is independent of the number of calibration points.

This ratiometric approach can be readily illustrated mathematically by the following derivation, which starts with a generic expression for fluorescent signal and its contributing factors.

Fluorescent intensity is determined by the following equation:

$$Vout(i,j)=[k(i,j)QE_{ccd}*T_{optical}*\Omega*[1+R(\lambda)]* [I_{uv}D_{probe}A_{element}*QE_{probe}(T)*\Delta t]$$ Eqn. [1]

where K(i,j) is the digitizing conversion factor of pixel (i,j); $QE_{ccd}$ is is the Quantum efficiency of the CCD detector; $T_{optical}$ is the optical transmittance optical elements (lenses, band-pass filters); $\Omega$ is the solid angle subtended by the lens towards the fluorescent element; $R(\lambda)$ is the spectral surface reflectance; $I_{uv}$ is the UV intensity; $D_{probe}$ is the fluorescent probe density per unit area; $A_{element}$ is the emitting area on sample surface that corresponding to pixel size; $Qe_{probe}(T)$ is the temperature dependent fluorescent emission quantum efficiency; and, $\Delta t$ is the exposure time.

Using this temporal ratiometric approach (ratioing of intensities derived at different times, with one of them at known reference temperature), the optical features caused by UV excitation non-uniformity, film non-uniformity, surface reflectance variation is canceled out:

$$\frac{V(T_{unknown})}{V(T_{ref})} = \frac{QE(T_{unknown})}{QE(T_{ref})} \qquad \text{Eqn. [2]}$$

since all of the other parameters remain unchanged except probe quantum efficiency induced by temperature change. The only assumption made using this ratiometric approach is that the probe fluorescent quantum efficiency is a function of temperature only while other parameters are kept constant. If a calibration relation for relative intensity change as a function of temperature is established, temperature distribution in future measurements can be obtained by comparing their relative intensity against the calibration.

The unknown temperature can be inferred from the following implicit ratiometric equation:

$$\frac{V(T_{unknown})}{V(T_{ref})} = \frac{V_{calib}(T_{unknown})}{V_{calib}(T_{ref})} \qquad \text{Eqn. [3]}$$

wherein $V(T_{ref})$ is the gray scale intensity at t=0 at known startup temperature $T_{ref}$; $V(T_{unknown})$ is the gray scale intensity at time t at which point the temperature is to be determined; $V_{calib}(T_{ref})$ is the gray scale intensity at $T_{ref}$ from calibration curve; and, $V_{calib}(T_{unknown})$ is the gray scale intensity determined from the implicit equation from which the unknown temperature is inferred.

Figure 4A:
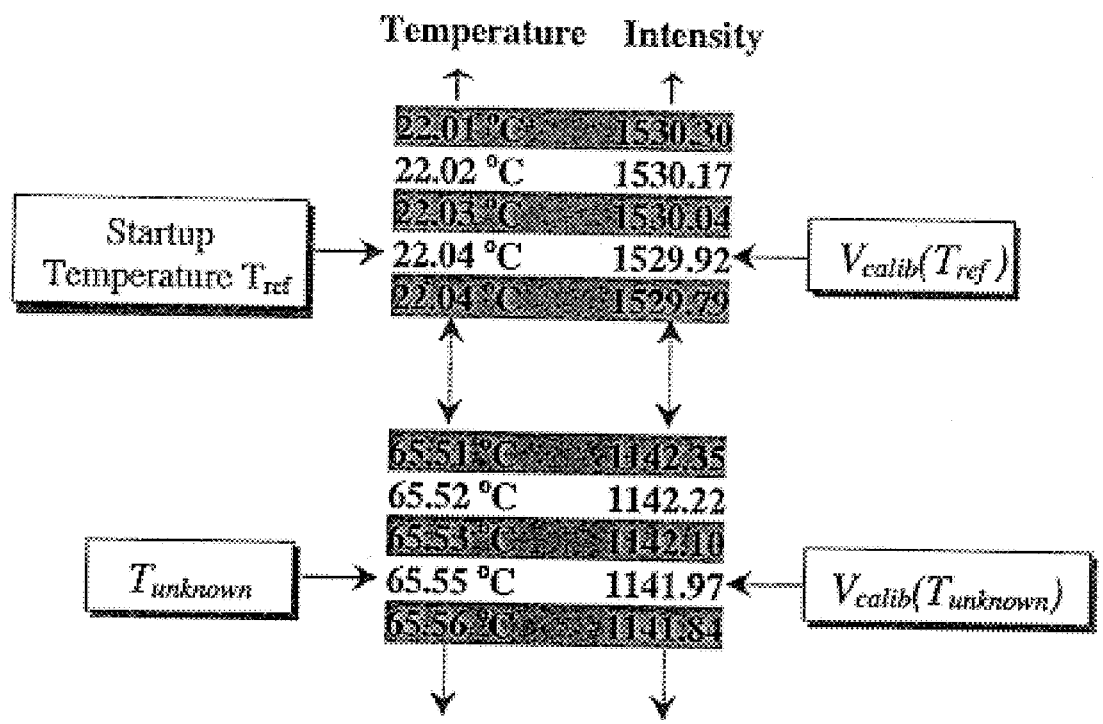
FIG. 4a shows a calibration table of the calibration data and temperature used by the temperature rendering method of the present invention for temperature determinations.

Therefore, the ratiometric method used in the FERIT method and system of the present invention to determine the temperature distribution on the surface of an object is novel and demonstrates that quantitative temperature measurements can be made for each location on the surface through a comparison against a calibration curve, which characterizes the relative fluorescent emission intensity as a function of temperature. This temperature distribution is implicitly determined by the temperature distribution equation $$V_{test}(T_{ref})/V_{test}(T_{unknown}) = V_{calib}(T_{ref})/V_{calib}(T_{unknown}) \qquad \text{[Eqn. 4]}$$

where $I_{test}(T_{ref})$ is the measured fluorescent intensity at a known reference temperature at time of the test, $I_{test}(T_{unknown})$ is the measured fluorescent intensity at time of interest, $I_{calib}(T_{ref})$ is the fluorescent intensity on the calibration curve corresponding to the same reference temperature, and $I_{calib}(T_{unknown})$ is the fluorescent intensity on the calibration curve which satisfies the above ratiometric equation from which the unknown temperature is determined. The calibration curve can be approximated by a polynomial, or it can be implemented as a lookup table as shown in FIG. 4a.

Figure 4B:
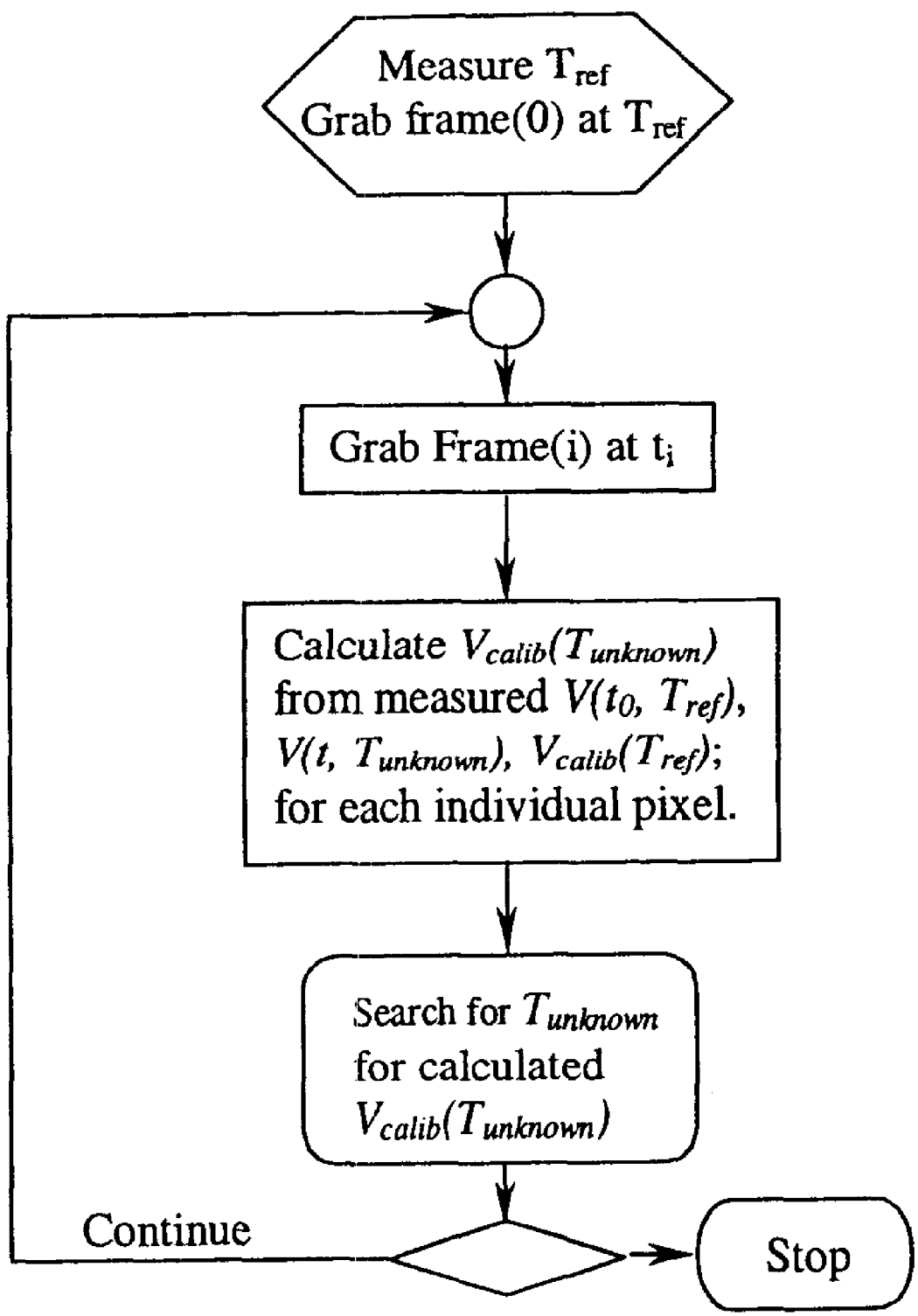
FIG. 4b shows a flow chart for temperature determinations using the temperature rendering method of the present invention.

FIG. 4b shows a flow chart of the temperature determination. In step 1, measure $T_{ref}$ and grab frame(0) of the image of the fluorescence at $T_{ref}$ at time(0) ($t_0$). In step 2, grab frame(i) of the image of the fluorescence at time(i) ($t_i$). In step 3, for each individual pixel in the images calculate $V_{calib}(T_{unknown})$ from measured $V(t_0, T_{ref})$, $V(t_i, T_{unkown})$, $V_{calib}(T_{ref})$. In step 3, search for $T_{unknown}$ for calculated $V_{calib}(T_{unknown})$. This process continues for additional temperature determinations or stops when there are no further temperature determinations to be made. This approach has the advantage of versatility because its implementation does not depend on the particular form of the mathematical model for the calibration relation, i.e., fluorescent intensity as a function of temperature.

Therefore, the fluorescence emission ratio imaging method of the present invention provides an algorithm that determines the temperature for each location on the surface, which is highly efficient and accurate. Because of the high pixel count in a thermographic image, it is important to have a highly efficient method to convert the fluorescent emission intensity to temperature values. Prior art algorithms that have been used include polynomial fit or exponential fit, the computations involved in the former are extremely complex and the computations involved in the latter usually has poor accuracy. The algorithm of the present invention is a hybrid algorithm for solving the temperature distribution equation to produce the temperature for each location on the surface.

The algorithm of the present invention takes advantage of the fact that the calibration relation is relatively linear. The calibration relation is first tabulated with fixed, small temperature increments. Because $V_{test}(T_{ref})$, $V_{test}(T_{unknown})$ are measured values and $V_{calib}(T_{ref})$ is listed in the calibration table for $T_{ref}$, $V_{calib}(T_{unknown})$ can be determined. The task is to find the temperature that corresponds to $V_{calib}(T_{unknown})$ in the calibration table effectively. Because the slope of the calibration curve is known, the search for the $V_{calib}(T_{unknown})$ temperature can jump to the relevant part of the calibration table, which is estimated by dividing the relative change in measured intensities $V_{test}(T_{ref})$ and $V_{test}(T_{unknown})$ by the slope. Once the relevant part of the calibration table is determined, the $V_{calib}(T_{unknown})$ temperature is determined by a sequential search through the relevant part of the calibration table. The above process is performed for each location on the surface. The algorithm is performed by a computer using the computer program described herein, which also manages the hardware activities, data acquisition and analysis, and visualization of the temperature determinations of the method of the present invention.

As a part of the FERIT method and system of the present invention, a Microsoft WINDOWS-based application software program was developed to accomplish camera control, imaging, data acquisition and digital input/output (I/O), measurement, temperature rendering, and visualization. The software was created because of the limited data processing capability of the application software that came with the ORBIS CCD camera that was used to develop the FERIT method and system of the present invention. Similar software can be written for other sensing devices. A program listing that contains the key code for the software that was developed is subsequent to the specification but prior to the claims.

The software was created with Microsoft VISUAL C++ version 5.0 and features a multi-document graphic user interface. The software has a basic data structure called "Document/View paradigm" in which the document class manages the data and storage while the view class handles data visualization, window messages, and user interactions with the selected document. Similar to word processing software, where text and formatting information are the primary data, the software application herein primarily deals with gray scale images that are two-dimensional arrays of numerical data. Image data are copied into a document data buffer after they are obtained by the acquisition routine of the imaging library.

Figure 5:
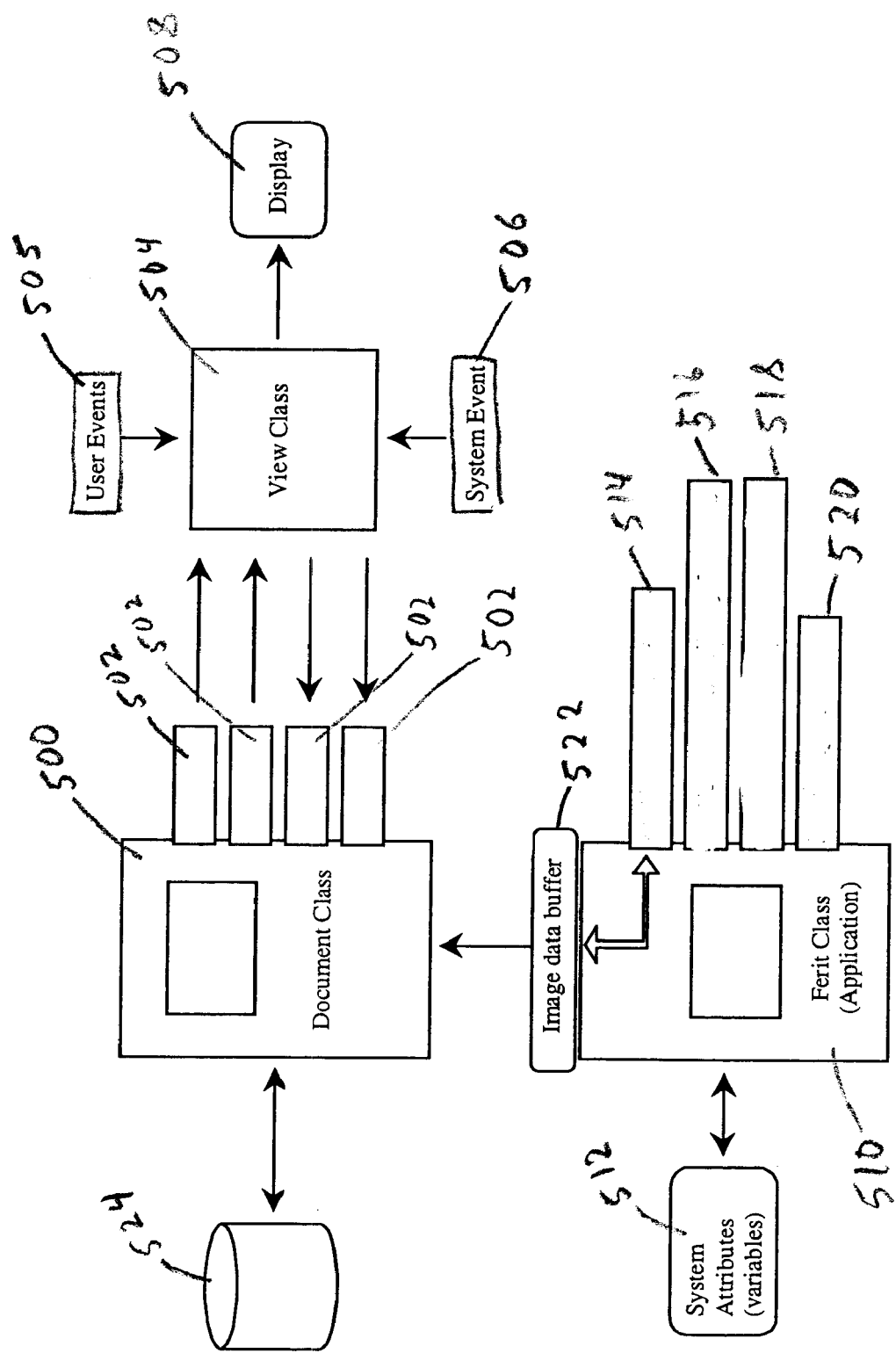
FIG. 5 is a diagram illustrating the structure of the software used by the present invention.

FIG. 5 shows the overall structure of the software for the FERIT method and system of the present invention. While the software was developed for use with the ORBIS CCD camera, software of similar structure can be developed for use with other sensing devices. The software comprises three classes: Document Class 500, FERIT Class 510, and View Class 504. Document Class 500 contains a document and owns the data structure that holds all of the document's data. Documents can be loaded to Document Class 500 as a TIFF formatted file from disk 524 or saved from Document Class 500 to disk 524 as a Tagged Image Format File (TIFF) file. Data Functions 502 consists of various functions that encapsulate the data structure of the document in Document Class 500. View Class 504 interacts with the Data Functions 502 and accepts User Events 505 and System Events 506 and enables Display 508 of the document's data. FERIT Class 510 is the application that interacts with Document Class 500 through Image Data Buffer 522 and interacts with System Attributes (variables) 512. FERIT Class 510 comprises sensing device (e.g., ORBIS CCD camera) library functions 514, multi-function acquisition board (e.g., DAS802/16) library functions 516, channel expansion board (e.g., CIOEXP16) library functions 518, and can include future expansions 520.

The fluorescent-based thermographic method and system of the present invention has been successfully developed and evaluated. The present invention is capable of performing field temperature measurement of surfaces. Starting from fundamental fluorescent emission and optical imaging theory, the present invention demonstrates that the temporal ratiometric approach eliminates optical features caused by excitation and film thickness variation by ratioing the intensity at a point of interest with the intensity at a known reference temperature.

The present invention represents an integration of hardware and custom-built software to accomplish imaging, temperature rendering, data visualization and storage. The hardware used to demonstrate the present invention consisted of a cooled digital camera, highly stable UV source, UV monitoring photo-detector, 300 Mhz personal computer, and data acquisition/temperature measurement and digital control boards. The software created for the present invention includes two WINDOWS-based application software programs for general-purpose data acquisition and temperature measurement, as well as FERIT.EXE, the custom-developed WINDOWS-based application software which handles interactions with imaging hardware, creates an image display and performs temperature conversion. The software utilizes image control library functions and a more common file format (TIFF), which allows more flexibility. The software also makes it possible to realize simultaneous UV excitation monitoring and digital control for other hardware.

Calibration relations for the temperature dependent fluorescent emission intensity has been obtained and integrated into the temperature rendering algorithm for efficient temperature conversion.

The present invention also has many advantages over previous temperature probe systems in terms of photo-bleaching and resistance to moisture, which makes the present invention a robust choice for many application situations.

The measurement errors of the present invention were also identified and evaluated, including read noise, dark noise, shot noise, flicker noise, digitizing noise. Among these the shot noise was found to be the major contributing factor. Based on the estimate of these noise sources, the noise was estimated to be approximately 0.4° C., which is about a factor of 2 better than that of system developed by another group (Liu et al., Exp. Therm. Fluid Sci. 10: 101–112 (1995)).

Several applications of surface temperature measurement were designed to demonstrate some of the capabilities of the present invention, for both large scale (inch) and the microscopic scale ($\mu$m) applications. The measurement results were compared with traditional methods (thermocouples) and a numerical model. Good agreement was observed. Better spatial resolution was observed for FERIT compared to the infrared technique.

In Summary, the present invention is capable of providing quantitative surface temperature measurement at both large (inches) and small (mm) scales. The present invention has a temperature resolution of approximately 0.2° C. (based on the reproducibility of intensity measurement of the CCD camera). The present invention has an accuracy of 0.4° C., which is comparable to its infrared and liquid crystal counterparts. The frame rate achieved is approximately 1 fps (with a full frame device) which can be further improved by using a frame transfer device (10 fps). The present invention has a temperature operating range of approximately 80° C. Compared with the infrared method, the present invention has the advantage of higher spatial resolution ($\mu$m), easier data interpretation, and lower costs. Compared with the liquid crystal technique, the present invention has a higher spatial resolution and a wider operating range, easier data interpretation, and it is easier to apply to surfaces. Compared with the previous fluorescence-based systems, the present invention has better photo-bleaching resistance, which greatly reduces the calibration difficulties and makes it applicable to both transient and steady state conditions. The introduction of UV monitoring improves the measurement accuracy, while the newly developed temperature rendering algorithm is more efficient and accurate than the traditional polynomial or exponential fit methods.

Considerations that should be taken into account in practicing the present invention include the following.

(1) Camera. Being the heart and soul of an imaging system, the camera is the most important component that ultimately determines the performance characteristics of the system, such as dynamics, sensitivity, resolution, and noise.

A CCD (Charge-Coupled-Device) remains the primary choice as the sensing device, although other devices based on different operating principles are also available, such as CID, and CMOS sensors.

CCD imaging sensors can generally be classified into two categories: full frame and frame transfer devices.

The operation of a full frame device requires a mechanical shutter to control the start and stop of an exposure. There is a line of readout registers the same size as the number of columns in the CCD and charges at each row of the CCD can be parallel-shifted to these registers and eventually be sequentially shifted to the output amplifier and digitized. The digitization is complete when the last row (farthest from the readout registers) is read out. An imaging cycle typically consists of the following steps (FIG. 64): Clear the CCD, Open shutter to start exposure, Integrate for desired period of time, Close shutter to end exposure, Start loop for the number of rows, Clear readout registers, Parallel shift one row of charges to readout registers, Sequentially shift the readout registers to the readout amplifier and digitize, and End.

This limits the frame rate of a full frame device to about 1 s. Due to its relatively simple architecture, the cost of such system is low (a few thousand dollars) and it has become very popular amount amateurs for astronomical observation. High end systems are also available which feature a cooling option to reduce the dark current (which is useful for faint signals that require long exposure times), scientific grade CCD, large CCD format and high resolution digitizer. CCD sensitivity (back-illuminated or not), format (pixel count), grade (defect count), cooling option are the most important determining factors.

Contrary to the full frame device, the frame transfer device operates a bit differently since it has a buffer the same size as the sensing array to temporarily store the charges: Clear CCD, Integrate for desired period of time, Transfer charges to buffer, Start loop for the number of rows, Clear readout registers, Parallel shift one row of charges to readout registers, Sequentially shift the readout registers to the readout amplifier and digitize, and End.

This procedure not only eliminates the necessity for a mechanical shutter and the time overhead caused by the movement of the shutter blade (about 5 ms), it also allows charge transfer and digitizing to be performed simultaneously with exposure. If the digitization time is shorter than the exposure time, the dynamic capability of such a device is only determined by the exposure time itself. Such devices (especially those with back-illumination option of high QE) were limited to military use in the early and mid 90 s. Civilian applications and scientific research with these CCDs are just getting started.

In contrast to high volume production of CCD systems for surveillance and home entertainment, most CCD systems for scientific and quantitative imaging applications are custom-built in small batches to fit individual needs. Available options include imager format/resolution, cooling option, full frame or frame transfer, intensifier options, digitizing resolution.

For most fluorescent imaging applications, the signal strength is relatively low. This is particularly true for microscopic specimen. The exposure time required is usually around one second for the sensor to get close to saturation. Full fame systems are attractive since they cost less and they are suitable for applications that will tolerate frame rates greater than 1 fps (frame per second). Sub-area imaging or a line-scan mode might not help much since the most dominant part of the total time is the exposure time. A frame transfer device works best for situations with high signal strength and high frame rate. Its advantage over a full frame device is not very significant for faint signals such as fluorescent emission since exposure time is much longer than data transfer time. The cooling option is usually recommended, since it will not only reduce the dark current that could degrade the dynamic range, but it will also keep the CCD at a stable temperature so that consistent readings can be obtained. Usually cooling below −10° C. to about −20° C. will be sufficient.

Since the noise or uncertainty of the detector is usually more than 0.1%, selecting a system with 10 to 12 bit resolution would be enough for most situations (0.1% and 0.025% error, respectively). The 0.1% uncertainty is determined by the fact that most CCD sensors have a full well of electrons less than $10^6$, in which case the shot noise is $1/\sqrt{N}=0.1\%$.

As to the CCD format (pixel count), a small or intermediate format is recommended (256×256~1K×1K), since a larger format is much more expensive and it will also take a longer time to digitize the frame.

The specifications of the ORBIS 1 system used in the examples is listed as follows:

CCD-Model: SI-502AB (back-illuminated) Scientific-Grade; Manufacturer: Scientific Imaging Technologies, Inc.; Format: 512×512; Pixel Size: 24 μm×24 μm; Array Size: 12.3 mm×12.3 mm; Optical Full Factor: 100%; Quantum Efficiency: 82% at 450 nm, 86% at 550 nm, 88% at 650 nm; Charge Transfer Efficiency: 0.99999 (at 50 KHz Digitizing Rate); Full Well Capacity: 350,000 e/pixel; Read Out Noise: 7 e at −90° C.; Dark Current: 12.75 e/pixel/sec at −30° C.

Camera Head-Resolution: 12 and 16 bit A/D Converter; Wide Dynamic Range: 94 dB (16bit, 50 kHz), 81 dB (12 bit, 1 MHz); CCD Temperature: −20° C. (Two Stage TEC) ±0.1° C.; Exposure Time: 0.01 second to hours; Interface: PCI bus.

Software-Camera Control: Exposure, Subframe, Sequence, Multiple Frame Average; Display Analysis: Gray Scale and False Color, Line Profile, Photometric Measurements; Image Processing: Flat/Bias/Dark Field Compensation, Basic Frame Arithmetic; File Formats: FITS.

(2) UV Source. A stable UV source is highly recommended since a highly stable UV lamp is not that much more expensive than a poor one, and it is not a major part of the investment for the overall system. Although flicker noise of an unstable UV source can be monitored and compensated, the complexity and cost introduced by extra electronic hardware needed to accomplish that might cost more than the saving on the UV lamp. Utilizing an UV source with less than 0.1% noise does make test and data processing easier since the flicker noise can be neglected.

(3) Photodiode. Even with a highly stable UV source, its output will also drift one or two percent over a period of several hours. For example, to obtain a calibration relation, the fluorescent film will be set to different temperatures for its emission intensities to be measured. Such an experiment can take as long as five hours depending on the number of set points. In such a case, a photodiode sensitive to UV should be employed to monitor the UV intensity change so that the fluorescent intensities can be compensated. The OPT301M photodiode from Burr-Brown has a silicon sensor and preamplifier integrated and is very convenient to use.

(4) The Influence of Film, Surface Dimension, and UV Intensity. The low signal strength is always an important factor that limits the dynamic system response since the CCD has to be integrated long enough to obtain sufficient enough light. One solution would be to manipulate the film parameters to maximize its output. This can usually be accomplished in two ways: (1) Increase the probe concentration; (2) Increase the film thickness. The concentration used in our study is already very high (25 wt %) and there is not too much room to increase it. The second approach will work but it has some adverse effect on the surface temperature distribution and the dynamic response of the surface being measured. If the film is too thick, first of all, it has the potential to alter the surface temperature distribution since it introduces one more conduction path across the surface. Second, since a polymer film is a poor thermal conductor, its thermal resistance might be significant in the thickness direction, especially when convection is important. In addition, it might also affect the dynamic response of the surface due to the finite thermal mass of the film. The following table illustrates the response time scale for different film thickness (Acrylic):

TABLE 1

Dynamic Response as a Function of Film Thickness.

$t \sim L^2/\alpha$, $\alpha = \kappa/\rho C_p$; $\alpha \sim 1.0e - 7$ for Acrylic

| L (micron) | 1000.0 | 100.0 | 10.0  | 1.0      | 0.1      |
|------------|--------|-------|-------|----------|----------|
| t (s)      | 10.0   | 0.10  | 0.001 | 1.0e − 5 | 1.0e − 7 |

As one can expect, the thicker the film, the slower the response one will get. The films we made are usually around 10 μm thick, the corresponding response time (1 ms) is much less than the camera frame period (>0.2 s). The film thickness can be estimated by scratching the film with a sharp blade, and the notch formed can be analyzed under a microscope with an objective of very narrow depth of field. The corresponding thermal resistance (L/k) is about 5e-5 m²K/W, which is much smaller than that of natural convection 1/h=0.2 m² K/W.

(5) Optical Consideration. For a given film thickness and UV excitation level, the optical and geometric characteristics also play important roles in determining the signal strength. The following calculations consider measurements made for both large (inches) and small (mm) dimensions.

From the following equation:

$$V_{out}(i,j) = [kQE_{ccd}]*T_{optical}*\Omega*[1+R(\lambda)]$$
$$I_{uv}D_{probe}A_{element}*QE_{probe}(T)\Delta t\} \sim \Omega*A_{element}.$$

The following calculations provide some idea in a relative sense about how optics determines signal strength, assuming constant UV excitation intensity. Parameters: CCD: Pixel Size: 24×24 microns, format: 512×512; Optical Lens: Diameter $D_1$=10.0 mm, focal length f=25.0 mm; Microscope Objective: Magnification=10×, working distance=5 mm, diameter D2=5 mm Case 1: Optical Lens—Object distance L=0.5 m, $A_{element}=(512*24*L/f)^2=0.0604$ m², $Q=\pi(D_1/2)^2/L^2=0.000314$, Vout=1.9 e-5 (surface dimensions: 0.245 m×0.245 m)

Case 1: Microscope Objective—Object distance L=5 mm, $A_{element}=(512*24/M)^2=1.5$ e-6 m², $Q=\pi(D_2/2)^2/L^2=0.785$ Vout=1.2 e-6 (surface dimension: 1.22 mm×1.22 mm)

The above calculations show that for the same fluorescent film and UV excitation level, a decrease in surface dimension by 20-fold will result in a decrease of the signal strength by one order of magnitude. That is why microscopic fluorescent imaging usually requires a fairly long exposure time (>1 s).

(6) UV Intensity. One other option to enhance the fluorescent signal output is to increase the UV excitation level. Experimental study has shown that very good linearity is obtained for the excitation level tested (<5 W/m²). Applying very high UV excitation has two implications: (1) the response might move towards saturation; (2) surface heating effect becomes significant. Keeping the UV excitation level below 1 W/m² is recommended.

The fluorescent imaging method can be applied to other applications in heat transfer analysis that require surface temperature measurements, for example, surface convective heat transfer coefficient mapping, wind tunnel experiments, electronic packaging and cooling analyses.

To use the present invention to measure convective heat transfer coefficient, one influencing factor could be the ambient light, which can reduce the system dynamic range since the ambient background could be a major part of the total signal. This problem can be resolved partly by using opaque screens to block out the ambient light. Since an airbrush can be used to fabricate the fluorescent film, it is more advantageous than the liquid crystal method, which has problems to cover large or curved surfaces.

For wind tunnel applications, the present invention can be adapted readily to conduct temperature measurement. Since the emission is in the UV-visible region, the only requirement is that an optically transparent window is available so that UV can be directed to the area of interest and that the red emission can be captured. Quartz glass is a good candidate as a material for such windows since it has high transmittance for both wavelengths. Fluorescent paint can be spray-painted onto the inner surface of the wind tunnel. The present invention has obvious advantages over infrared methods in these applications since the present invention employs a ratiometric approach, which is not very sensitive to the properties of most window materials, while using infrared the window absorption has to be compensated. In addition, infrared transmitting optics and windows are very expensive.

It is most likely that it is in the area of electronic cooling that the present invention will demonstrate its advantages regarding many aspects of thermographic methods. For board level applications, both infrared and liquid crystal have difficulties in one way or the other. For the infrared method, the wide range of emissivity values of electronic components will give false information about the temperature; i.e., metallic leads usually have very low emissivity and the temperature will appear low. However, other packaging materials such as plastics have fairly high emissivity and their temperature reading will be more realistic. Applying a layer of black paint might solve the emissivity problem. Nevertheless, the black paint has to be relatively thick (about 50 μm) so that the surface will be fully covered. This would inevitably alter the surface thermal resistance and dynamic response. Another drawback for the infrared method is its limited spatial resolution, it becomes problematic when a structure is smaller than 300 μm, which makes it inapplicable to the microstructures of many modern electronic devices. Even though the liquid crystals are also available as spray paint, the temperature response uniformity and calibration accuracy is not as good as the regular flat sheet product.

In contrast, fluorescent films can be fabricated either by spray painting or spin-coating. They can be made as thin as the sub-micron level so that they can be used to discern very small structures. As the semiconductor industry is pushing toward smaller device and high switching frequency/power consumption, present invention will become an economic and practical choice for thermal management and heat transfer analysis of such devices. The precaution for the present invention method is to make sure the solvent will not interact with the components of the circuit board.

(7) Fluorescent Probes for Low and High Temperature Applications. The present invention can be transferred readily to other temperature probe systems that have different operating ranges. However, there are more complications for both high and low temperature applications.

If the application temperature is higher than the melting temperature of the polymer base, other carrying media needed to be considered to replace the polymer since it has a relatively low melting temperature (PMMA: about 200° C.).

For low temperature application, fogging and frosting could be a problem at the time of calibration and application since fogging and frosting would tend to develop over time and would scatter the excitation and emission signals.

(8) Further Study in Microscopic Scale. For heat transfer at the microscopic level, there is one more complexity associated with the calibration relation, for film application on metallic surfaces. The metallic surface will act as a mirror and create an image dipole for each excited fluorescent molecule. The interaction between the original dipole and its mirror image will change its lifetime in the excited state, which eventually affects the relaxation behavior of the excited molecules. This effect is most significant for molecules near the metallic surface (within 1000 nm) (Chance et al., Adv. Chem. Phys. 37: 1–65 (1978)).

Systematic study is necessary for this particular case to yield more insights: metallic film materials and thickness, fluorescent film thickness and concentration, surface quality (oxidation, roughness, etc.). It is desirable to design experiments with the above parameters in a controlled manner and conduct calibration measurements for fluorescent emission intensity as a function of temperature. Such tests would require expertise and facilities in many areas, including surface chemistry, quantitative film characterization, optical measurement, and even chemical synthesis. Since the examples concentrates on the length scale from centimeter to micrometers, the fluorescent film is relatively thick for the above phenomena to become significant. However, this area remains an interesting and challenging work for applications in microscopic scale (<1 micron).

The following examples are intended to promote a further understanding of the present invention.

EXAMPLE 1

This example shows the development of the FERIT method and system of the present invention for measuring temperatures on a surface. The high temperature sensitive fluorescent probe $Eu(hfa)_3$ was synthesized using Europium (III) Chloride hexahydrate and ligand 1,1,1,5,5,5-hexafluoroacetylacetone.

Europium chloride hexahydrate was first dissolved into 50 ml of distilled water and the pH of the solution was increased to approximately 8.5 by adding ammonium hydroxide. Next, a stoichiometric amount of ligand (hfa) was added while stirring. The solution was allowed to react overnight. Afterwards, the precipitate was filtered and dried for 24 hours at 70° C.

Figure 6:
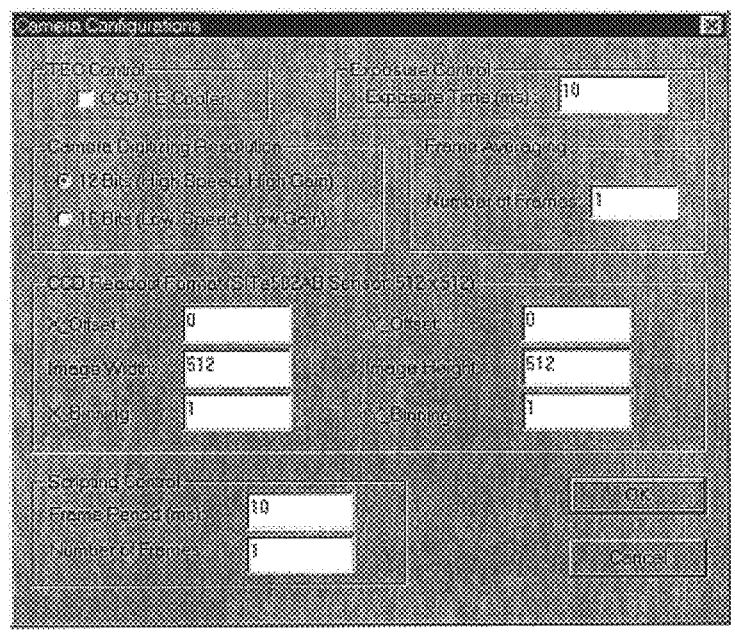
FIG. 6 is a computer screen display of a configuration panel produced by the program of the present invention.

The low temperature sensitive fluorescent probe $Tr(hfa)_3$ was synthesized using Terbium(III) Chloride hexahydrate and ligand 1,1,1,5,5,5-hexafluoroacetylacetone. The chemical structure of $Tr(hfa)_3$ is shown in FIG. 6.

Terbium chloride hexahydrate was first dissolved into 50 ml of distilled water and the pH of the solution was increased to approximately 8.5 by adding ammonium hydroxide. Next, a stoichiometric amount of ligand (hfa) was added while stirring. The solution was allowed to react overnight. Afterwards, the precipitate was filtered and dried for 24 hours at 70° C.

Film application methods are primarily determined by the costs, film thickness, appearance requirements, and structure of the object to be coated. Several commonly used methods such as using brushes, pads, hand rollers, spray guns, and electrostic spray guns are described in Wicks et al. (In: Organic Coatings: Science and Technology. Vol. II. Wiley-Interscience Publication. pp. 65–81 (1994)). In this example, a compressed air spray gun was used, the Paasche 2P-VL#3 airbrush.

The solvent mixture to apply to the surface was prepared as follows. First, in the paint bottle for the airbrush, 0.15 g of PMMA pellets was added to 10 g methyl-ethyl-ketone solvent and the mixture heated at 70° C. with constant stirring for about 20 minutes or until all the PMMA pellets had dissolved in the solvent. The solvent mixture was allowed to cool to room temperature with constant stirring. Next, 0.05 g of the $Eu(hfa)_3$ or $Tr(hfa)_3$ probe was added to the solvent mixture and mixture stirred for about 5 minutes. Afterwards, the paint bottle containing the mixture solvent and probe was connected to the airbrush and the air intake nozzle of the spray gun was connected regulated compressed air.

Figure 10:
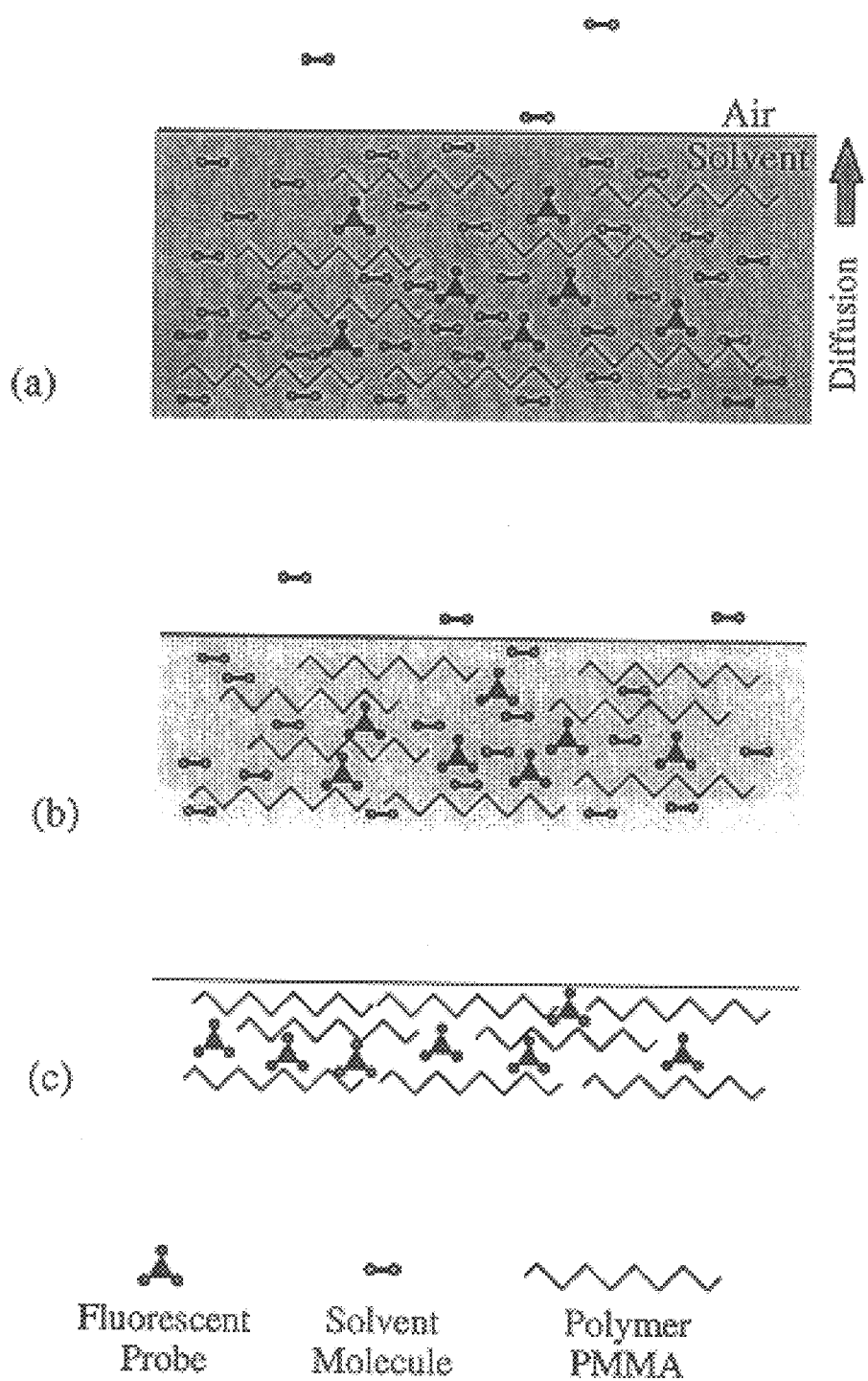
FIG. 10 illustrates the fluorescent film forming process: (a) shows initial solvent evaporation and diffusion, (b) shows an intermediate step, and (c) shows formation of the solid film.

To produce fluorescent thin films in this example, a thin layer of solvent mixture was applied to the surface using the airbrush at a distance of about 13 cm. Back and forth lateral motion of the airbrush was required to produce a uniform film that covered the whole surface. The film formation process is illustrated in FIGS. 10. After application of the film, solvent molecules evaporated from the air/solvent interface into the open air thereby reducing the solvent concentration near the air/film interface and increasing the film viscosity. As the film dries, solvent molecules in the deeper layer of the film move up to the air/film interface driven by diffusion. When the film had finished drying, a solid film was formed on the surface wherein the temperature probe was encapsulated by the polymer matrix (PMMA). To facilitate removal of solvent molecules deep within the film, the surface was incubated at a temperature of about 120° C. for about half an hour.

The fluorescent emission ratio imaging thermographic system that was used comprise the following components: ORBIS cooled digital CCD camera capable of outputting both 12 and 16 bit gray scale images, ultraviolet light source consisting of a Mercury/Xenon lamp and UV filter, WINDOWS-based PENTIUM computer (300 MHz) for overall system control and integration, data acquisition for UV intensity fluctuation monitoring, temperature measurement and digital control. The ORBIS camera was purchased from SpectraSource Instruments, Inc. The selected CCD sensor was manufactured by SITe Inc. (formerly Tektronix) and it is a back-illuminated 512×512 sensing array with 24 $\mu m \times 24$ $\mu m$ square pixel format. The CCD is thermoelectrically cooled to −20° C. to reduce dark current. The device operates in full frame mode and is capable of a frame rate up to 3 frames/second.

The optical lens used was a Rainbow G25 with adjustable IRIS and focus (focal length=25 mm, minimum working distance=0.50 m).

The highly stable UV source (STD <0.1%) was made by Opti-Quip. It features a 200W Mercury/Xenon lamp with 2000 hour life expectancy and 1.9 mm arc length, according to the manufacturer (USHIO: UXM-S200KL, Opti-Quip: #BA-026). The UV filter was a high temperature bandpass filter (Model: 365HT25, central wavelength=365 nm, bandwidth=25 nm, 2 inches OD) from Omega Optical with high transmittance at 365 nm (42%). The red or emissions filter was also from Omega Optical (Model: 620DF35, central wavelength=620nm, bandwidth=35 nm, 1 inches OD) which features high transmittance at 620 nm (about 90%).

A general purpose camera control and acquisition software was shipped with the camera which provides basic function control of the thermoelectric unit and the camera such as exposure time, binning, sub-area acquisition and basic arithmetic operations of images. Since the software only works with a self-contained file format (FTS) and lacks the flexibility for image processing, a custom application software was developed.

In order to give an estimate of errors of the measurement system as a whole, the performance of the individual system components were characterized and quantified, including the camera and UV source.

Noise Characteristics of ORBIS Cooled Digital Camera. The measurement noises of the CCD camera can be classified into the following groups: (1) read noise, (2) dark noise, (3) shot noise, (4) systematic offset. The importance of each noise source is identified and used as criteria for estimating noise levels for future camera operation conditions. Such analysis applies to the full frame CCD camera and can also be applied to other CCD devices such as frame transfer CCD devices.

The read noise is the uncertainty introduced by the readout devices such an amplifiers and A/D circuitry while converting electronic charges to a digital value. The back-illuminated SI502AB normally operates up to 3 frames/sec with a serial pixel rate of about 800 K pixels/sec. Operating at higher readout rates results in a loss of full well in addition to increased noise. From bandwidth considerations we expect the noise to increase by the square root of the pixel rate. For example, increasing the rate from 50 K pixels/s (the rate at which the readout noise is measured at SITe) to 800 K pixels/s (the readout rate of the ORBIS camera used herein) would result in approximately 4.5 times more noise, i.e., from 9 electrons to 41 electrons. Since the full well of SITe502AB is approximately 350,000 electrons, the above change would correspond to an error of 0.48 detector unit (DU) (12 bit mode, 0–4095) and is well below the digitizing resolution (1 out of 4095).

Dark noise is associated with the electric charges accumulated during the exposure period through thermal excitation. It is linearly related to the exposure time. For a fixed exposure time, the way to reduce the dark noise is to cool the CCD to lower temperature. The SI502AB CCD sensor has a dark noise of 12.75 e/pixel/s at −30° C. (data from SITe Inc.). The ORBIS camera is cooled down to −20° C. and the exposure-time dependent dark noise was re-evaluated here for this study. The shot noise is the inherent uncertainty associated with the fluorescent signal strength. The relative error induced by this source (error to signal) is $1/\sqrt{N}$, where N is the number of photo-electrons collected and detected. The stronger the signal strength, the higher the accuracy. The simple way to reduce the noise is to average repeated measurements, essentially by increasing N.

System offset represents the difference between the measured value and real value without any other noise sources present. For a CCD imager, the offset is purposely pushed above zero to stay away from possible fluctuation below zero caused by other noise sources.

Linearity Study of UV Excitation and Fluorescent Intensity. As described in the section describing the fluorescent emission mechanism, fluorescent emission intensity is linearly related to UV excitation to a certain extent and then it will start to level off. Very high UV excitation will make stimulated emission become a competing energy relaxation mechanism, in addition to thermal quenching and fluorescence. In such a condition, the calibration relation between fluorescent emission intensity and UV excitation level will depend on the excitation intensity. Even though increasing UV excitation intensity has the benefit of enhancing fluorescent intensity, one could also run into the risk of inducing saturation and severe photo bleaching, as well as surface heating. It is important to verify that the measurement stays within the linear region.

Photo Bleaching Study. One advantage of the system of the present invention is that it is less susceptible to photo-bleaching, which can severely limit the use of the fluorescent imaging technique. The combination of temperature probe and solvent has several advantages over the other systems tested to date. The fluorescent film at room temperature is illuminated with an UV source over a period of one hour while the excitation intensity is monitored by a photodiode, and the fluorescent emission intensity will be measured at specified time interval. This study defines the extent of photo-bleaching for the excitation intensity used.

Influence of Moisture. Water molecules compete with the ligands for the central ion and if such an effect becomes significant, it will drastically change the calibration behavior. On the other hand, since the polymer film (PMMA) is water-resistant and it protects the fluorescent molecules from the moisture. Although the fluorescent probe wasn't shown to be susceptible to the presence of trace amount of moisture in the ambient air, it would be interesting to observe its behavior under extreme conditions. The fluorescent film is immersed in a water bath and the fluorescent intensity is monitored over time. If significant change in behavior is found, the response of the fluorescent film to different humidity levels is also be investigated.

Effects of Quenching. Since there are a certain amount of solvent molecules trapped in the deeper layer of the fluorescent film, quenching the film above the polymer's glass transition temperature (PMMA: ~100° C.) would enhance the diffusion process and leave fewer solvent molecules within the film, it might also change the free volume experienced by the probe molecules. The effect of quenching is studied in relation to its effect on the shape of the calibration curves.

Reproducibility. As a measurement system, it is important to demonstrate that the measurement produced by the system has good reproducibility. This is verified in two ways: reproducibility of repeated tests and reproducibility between neighboring pixels in the same test. A test is defined as a calibration measurement of fluorescent emission intensity as a function of temperature. In the first comparison, the fluorescent emission intensity as a function of temperature is measured several times for the same sample before and after annealing at the same measurement location, and the shapes of the calibration relation are compared. The second comparison focuses on the same test, but the measurements are conducted for neighboring pixels that have experienced the same heating history. A sample with the high temperature Eu(hfa)$_3$ probe is also heated up from room temperature to 80° C. and cooled back down to room temperature to detect hysteric effects and a sample with the low temperature Tr(hfa)$_3$ probe is also cooled down from room temperature to −80° C. and heated back up to room temperature to detect hysteric effects.

Effect of Fluorescent Probe Concentration. The solid fluorescent film fabricated consists of two components: the temperature-sensitive fluorescent probe and the polymer base (PMMA). Since the concentration of the temperature probe is very high (25 wt %), the interaction between neighboring molecules might influence the temperature dependent behavior. Samples of different concentration were fabricated and the calibration relations for these samples were compared. If the behaviors are concentration-dependent, local variation of probe concentration will result in temperature measurement variation even without the presence of any other system noise.

Aging Effect. Since the present invention utilizes a chemical probe as the sensing material and there might be aging effect associated with it, i.e., its temperature-dependent fluorescent emission behavior might change over time. The shape of calibration curve is compared for two measurements made over extended period of time (about one month).

System Dynamic Response. For time-dependent surface temperature measurements, dynamic response (frame rate) of the imaging system is an important factor that determines the system's temporal resolution. The dynamic response of ORBIS camera is evaluated for a metallic film heated by a pulse source. The pulse frequency/period is varied and the temperature history of the film surface is monitored.

EXAMPLE 2

The digital CCD camera is an important part of the FERIT method or system of the present invention and its noise characteristics have a direct impact on the measurement accuracy of the fluorescent emission intensity. The following tests evaluated the relative importance of various sources of uncertainty associated with the equipment.

The ORBIS camera was set to a default resolution of 12 bit to achieve better frame rate, thus all the quantities related to gray scale intensity measurements in the following experiments are in detector units (minimum: 0 DU, maximum: 4095 DU at 12 bit resolution).

CCD Read Noise Characterization. With no light input to the CCD sensor and minimal exposure time, the only contributing signal was the read noise. As shown in the next section, the dark noise with 10 ms exposure time was 0.383*0.01=0.00383 DU, which was negligible compared to other noise sources. Other noises (shot noise, flicker noise) were zero since there was no light falling onto the CCD sensor.

The following procedure was used to determine the read noise. The ORBIS camera was powered up and the thermoelectric cooler was turned on. The CDD was allowed to reach steady low temperature (252K), which took about 20 minutes. The camera exposure time was set to the minimum (10 ms). The camera lens aperture was closed or in some cases a cover was placed over the lens head to eliminate light input to CCD sensor. Then two consecutive images were acquired. Finally, the standard deviation between pixels from the two images was calculated as follows.

A group of pixels was selected from the center of the each image for which measurements were conducted. In this experiment, a 100×100 array of pixels at $(x_1, Y_1)$: $(x_2, Y_2)$=(200, 200): (299, 299) within the 512×512 sensing area were sampled and the standard deviation was calculated with the following equation:

$$\sigma = \sqrt{\left(\sum_{i,j=1}^{100} (I_{ij}^{frame1} - I_{ij}^{frame2})^2\right)/4(N-1)} \quad \text{Eqn. [7]}$$

Where $I_{ij}^{frame}$ is the intensity of pixel measured at location (i, j). Such an approach is different from the standard way that measures many frames and performs measurement for pixels in each frame, which requires a substantial sample population (number of frames) to arrive at an acceptable value.

The experimentally determined read noise was 0.62 DU (detector unit), which was close to the estimate given by the CCD manufacturer (0.48). The discrepancy could be because the data provided by the CCD manufacturer was conducted at 30° C. instead of −20° C. Because the measured read noise was close to one detector unit, it could not be neglected.

CD Dark Noise Characterization. In addition to the photoelectrons created by the absorbed photons, there is stochastic source of electrons in a CCD well through thermal excitation. Electrons can be freed from the CCD material itself through thermal vibration and then, trapped in the CCD well, be indistinguishable from "true" photoelectrons. The importance of this dark signal was evaluated by varying the exposure time and measuring the pixel outputs with the camera lens closed. The results are summarized in Table 2 and plotted in FIG. 11. The pixel intensity is the average of 100×100 pixels at the same location $(x_1, y_1)$: $(x_2, Y_2)$=(200, 200): (299, 299) and the CCD digitizing resolution was set to 12 bit.

TABLE 2

Dark Signals of CCD Sensor at Different Exposure Times.

| Exposure Time (ms) | Signal Level (DU) |
|---|---|
| 10 | 108.238 |
| 40 | 108.2635 |
| 160 | 108.2995 |
| 640 | 108.5285 |
| 2560 | 109.1215 |
| 10240 | 111.848 |
| 20480 | 115.5825 |
| 40960 | 123.4725 |
| 81920 | 139.4955 |
| 163840 | 170.906 |

Figure 11:
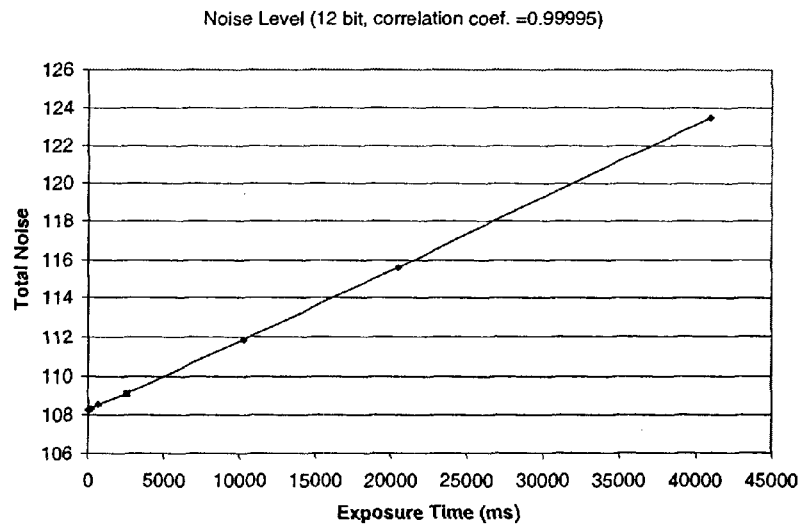
FIG. 11 is a graph that shows CCD dark noise as a function of exposure time.

In FIG. 11, the non-zero intercept at the abscissa is the result of systematic offset, which is a constant value. The intensity is expressed in detector units (0~4095 for 12 bit digitizing resolution, 0~65535 in 16 bit). The data was fit linearly by the following equation.

$$I=108.096+0.382727*\text{exposure\_time(second)} \quad \text{[Eqn. 8]}$$

Figure 12:
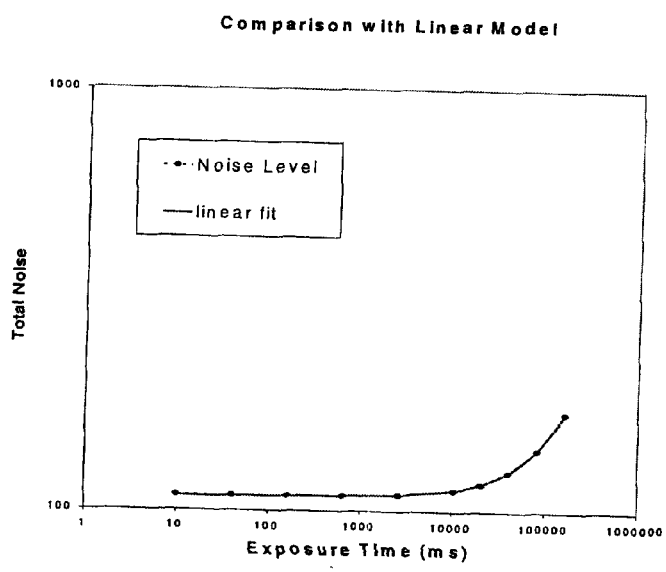
FIG. 12 is a graph that compares CCD dark noise as a function of exposure time between experimental data and a linear model.

The linear fit had a very high linear correlation coefficient of 0.99995 and FIG. 12 shows a comparison of the experimental data with the linear fit in logarithmic scale. The equation indicates that the dark signal grew linearly with time as $I_{dark}$ (DU)=0.383*Exposure_Time(s).

The linear equation further indicated that for exposure time less that 2 seconds, the dark noise was not significant since it was smaller than the camera digitizing resolution. The dark electron creation rate was calculated from the slope of the linear relation and was found to be about 32.76 e/pixel/seconds (based on the assumption that full well=300,000 electrons, and full scale=4095 for 12 bit), which was different from the manufacturer's data (12.75 electron/pixel/second) because their test was conducted at −30° C. instead of −20° C., the operating temperature of our CCD. The above difference is quite consistent with the rule of thumb that CCD dark current doubles for every increase of 7° C. in CCD temperature.

Even though the dark signal is deducted from the total intensity by the subtracting the background image, there is still noise associated with the dark signal that is described by the Poisson distribution.

The magnitude of this noise can be evaluated as follows. For a typical exposure time of 1 second, the corresponding number of electrons is N=(0.383*1)*300,000/4095=28 electrons. The associated noise is √N=5.3 electrons=4095*5.3/300,000 DU=0.072 DU, which is much smaller than the digitizing resolution (1 DU) and can be neglected. The above calculation assumes a full well of 300,000 electrons and 12 bit digitization resolution.

Figure 13:
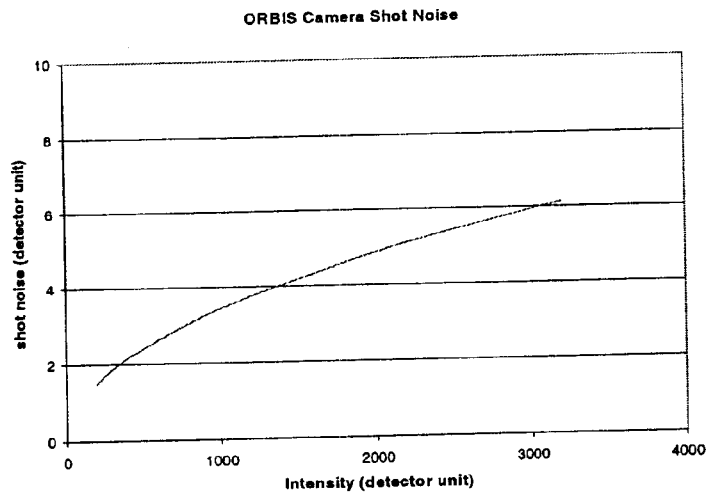
FIG. 13 is a graph that shows ORBIS camera shot noise verses intensity (detector unit).

Shot Noise. Shot noise is the statistical uncertainty associated with a given signal of certain strength, which is described by the Poisson distribution. Shot noise was determined by the signal strength of the measurement and it was found to be proportional to the square-root of the total number of photoelectrons detected. The following calculation assumed the CCD sensor had a full well of approximately 300,000 electrons (for the SITe502AB CCD sensor used in this study, a TV CCD camera typically has a full well of approximately 30,000 electrons). The signal shot noise of certain intensity (gray level in DU) is determined as:

$$\text{Shot\_Noise}(DU) = \text{gray\_scale}(DU)/\sqrt{\text{num\_of\_photoelectron}}$$

$$= \text{gray\_scale}(DU)/\sqrt{300{,}000 \cdot \frac{\text{gray\_level}(DU)}{\text{full\_scale}(DU)}}$$

$$= \sqrt{\frac{\text{gray\_level}(DU) * \text{full\_scale}(DU)}{300{,}000}}$$

which was plotted in FIG. 13. It can be seen that shot noise was proportional to square-root of N, with N being the number of photoelectrons detected in the CCD well. Even though the amplitude of shot noise was growing with signal strength, the relative error (shot-noise/signal) was decreasing as $1/\sqrt{N}$.

UV Light Source Characterization. As an important component of the fluorescent emission imaging system, the UV light source is also a determining factor for the system performance. Since the system operates in the linear region regarding UV excitation relative to fluorescent emission, fluctuation in the UV excitation will be proportionally translated into the magnitude of noise in final intensity reading.

A Burr-Brown integrated photodiode (model: OPT301M) with amplifier was used to conduct UV light intensity measurements. The characteristics of the photodiode are a photodiode size of 0.090×0.090 inch, a 1 MΩ feedback resister, a high responsivity of 0.47 A/W (at 650 nm), an improved UV response of 0.15 A/W at 365 nm, low dark errors of 2 mV, a wide supply range of ±2.25 V to ±18.0 V, a bandwidth of 4 kHz, a low quiescent current of 400 nA, and excellent linearity of 0.01%. The photodiode has good UV response and very low dark and read noise. With a full scale at about 8.0 volts (±9V power supply), the noise level of the integrated photodiode was measured to be less that 0.001 volts. The linearity with respect to intensity variation was 0.01% of full scale. The dynamic response (about 5 kHz) was also fast enough to capture the rapid change in UV light intensity. The spectral response of the photodiode at 365 nm was approximately 0.15A/W and the sensing area was 2.29×2.29 mm. The absolute excitation intensity was obtained by dividing the output voltage by the value of the known feedback resistor:

$$I = \frac{U_{output}}{R_F \cdot R_p(\lambda) \cdot A} \qquad \text{Eqn. [9]}$$

where $U_{output}$ is the output voltage in volts, $R_F$ is the feedback resistor (1M), $R_p(\lambda)$ is the spectral response (0.15A/W), and A is the active sensing area of the photodiode (2.29×2.29 mm$^2$).

Most UV sources have a power regulator to maintain steady output. This standard Silicon Controlled Rectifier (SCR) type of supply switches on and off only 120 times a second and can produce a significant amount of ripples.

Figure 14A:
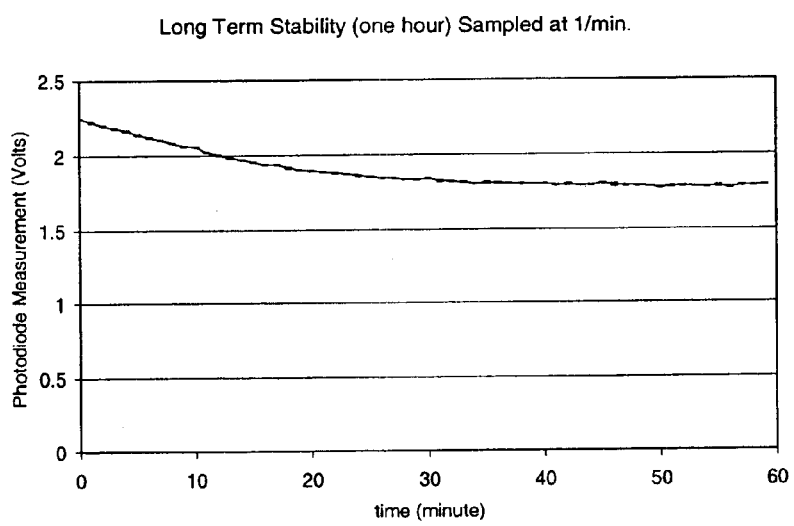
FIG. 14a is a graph that shows long term stability of a 100W Nikon mercury lamp over one hour sampled at 1 minute intervals.
Figure 14B:
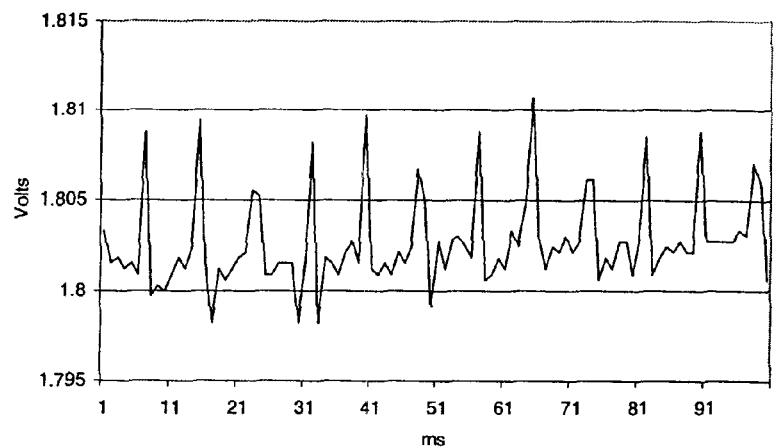
FIG. 14b is a graph that shows short term stability of a 100W Nikon mercury lamp over one hour sampled at 1 minute intervals.

The long-term and short-term intensity variations that were observed for a 100W Nikon high-pressure mercury lamp are illustrated in FIGS. 14a and 14b. The time units for the abscissa are in minutes and milli-seconds, respectively. Each data point in the long-term curve represents an average of 1000 intensity measurements sampled at 1 kHz. It can be seen that the power output stabilized after 40 minutes but the fluctuation was still fairly high after that (about 0.5% standard deviation). The short-term behavior was characterized by 120 Hz output spikes. A sampling rate of 1 kHz was necessary to accurately capture the intensity fluctuation.

Figure 9:
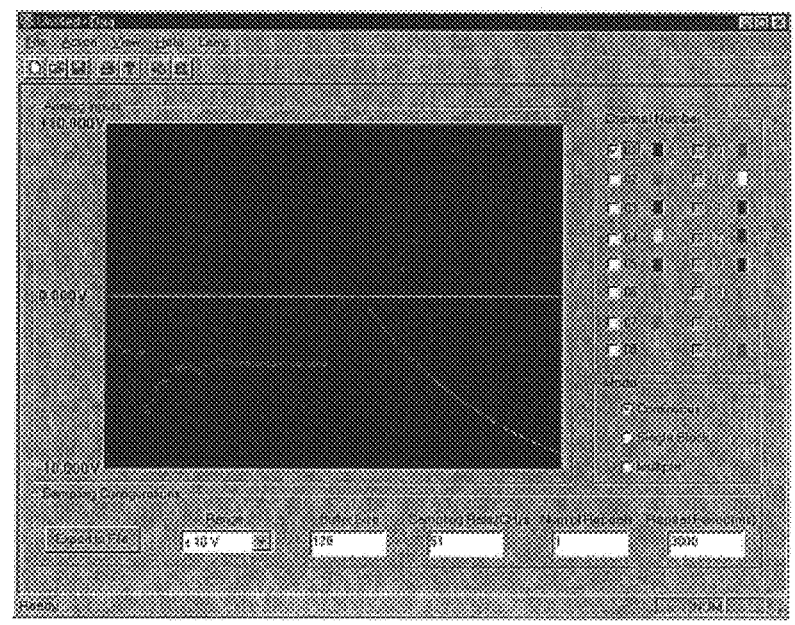
FIG. 9 is another computer screen display of a single-document graphic user interface panel produced by the program of the present invention.
Figure 15A:
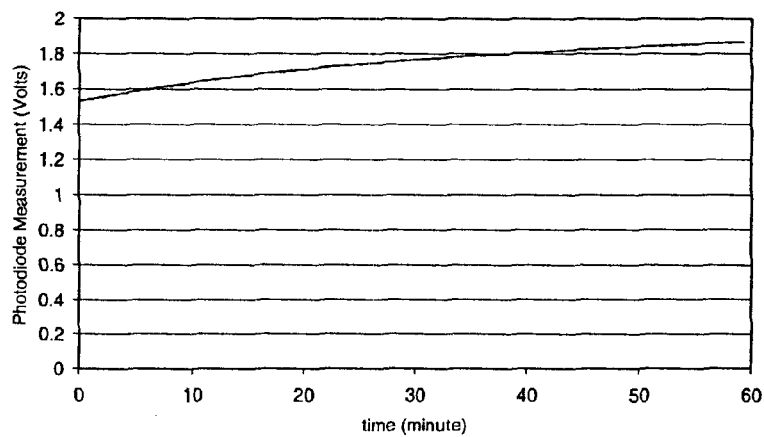
FIG. 15a is a graph that shows long term stability of an OPTI-QUIP xenon/mercury lamp over one hour sampled at 1 minute intervals.
Figure 15B:
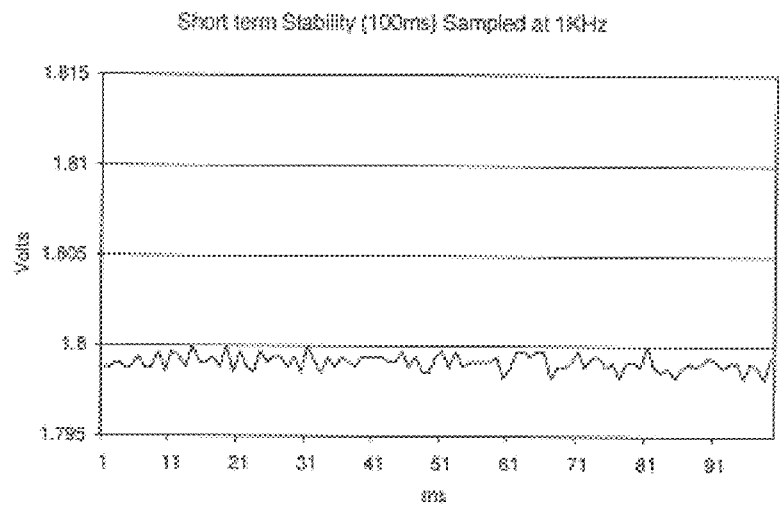
FIG. 15b is a graph that shows short term stability of an OPTI-QUIP xenon/mercury lamp over 100 ms sampled at 1 kHz.

The Opti-Quip 1600 power supply used MOSFET regulating circuit and switching at 30,000 times per second. Such an approach improved the short and long term behavior dramatically. The short-term ripple was less than 0.1%, as shown in FIG. 9. The system used a USHIO 1.9 mm gap 200W Mercury-Xenon lamp (USHIO: UXM-S200KL, Opti-Quip: BA-026) as its source, which features extended the lamp's life-span (2000 hour life) and provided good stability. FIGS. 15a and 15b shows the long term and short term stability of the OPTI-QUIP xenon/mercury Lamp. It can be seen that the long-term and short-term stability was much better where the short-term fluctuation was less than 0.1% (standard deviation/amplitude). With such a stable source, tests that are conducted in a short period of time (<1 minute) do not need to be UV-compensated.

Photo-Bleaching Study. One of the potential advantages of the probes of the FERIT system or method of the present invention is that they are less susceptible to photo-bleaching. Photo-bleaching is problem that occurs in the EuTTA system where, under constant UV excitation, the fluorescent emission intensity decreases up to approximately 40% over a period of 30 minutes even though the sample is held at constant temperature (Caffrey. In: Digitized Fluorescent Film Thermography. Master Thesis, Michigan State University, East Lansing, Mich. (1994)). Oxygen was identified as the main cause of this problem (Caffrey, ibid.).

Photo-bleaching not only imposes a problem for calibration, but it also restricts measurements of temperature to transient processes or even steady state situations. Therefore, to inhibit photo-bleaching when using the EuTTA system, the sample coated with the EUTTA probe has to be sealed inside a vacuum to prevent oxygen from interacting with the EuTTA probe (Liu et al., Exp. Therm. Fluid Sci. 10: 101–112 (1995)).

Figure 16:
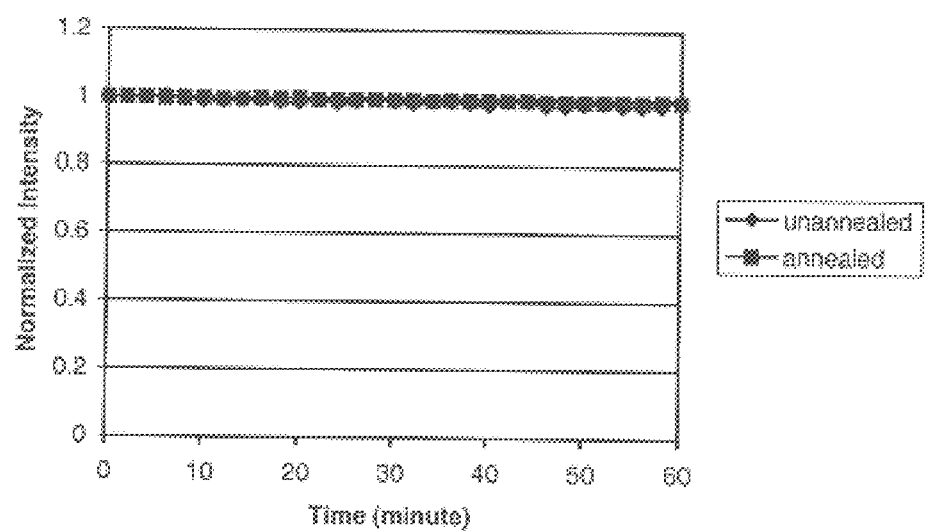
FIG. 16 is a graph that shows fluorescent emission intensity of Eu(hfa)$_3$ as a function of time between unannealed and annealed films in ambient air.

Even though the Eu(hfa)$_3$ probe of the FERIT method or system of the present invention is an Eu-based probe, it is not susceptible to photo-bleaching. This feature of the FERIT method or system of the present invention was demonstrated as follows. A sample surface coated with the Eu(hfa)$_3$ probe as in Example 1 was illuminated by UV light and held at room temperature. The gray scale intensity was imaged by the ORBIS camera. A photodiode was also used to monitor and compensate for excitation fluctuation of the UV light. The tests were conducted over a period of one hour and one image was taken every two minutes. The results are shown in FIG. 16. The initial fluorescent intensity was approximately 2500DU while the digitizing resolution was set to 12 bit. The percentile decreases were approximately 1.0% and 2.1% respectively for an annealed and an unannealed film. The results demonstrate that when using the Eu(hfa)$_3$ probe of the FERIT method or system of the present invention, no significant decrease in intensity was observed even though the UV excitation level applied was about 1 W/m$^2$ which was similar to test conditions typically used for EuTTA probes.

Linearity Study of UV Excitation and Fluorescent Emission Intensity. Different intensity levels of UV excitation were used to illuminate the fluorescent film at room temperature and the ORBIS camera was used to obtain images of the fluorescent emission. The OPTI-QUIP 200W xenon-mercury lamp was used as the light source. UV excitation was selected by an Omega band pass filter 365HT25. A set of Oriel neutral density filters was selected and placed between the UV source and UV band pass filter to realize various excitation levels. Actual excitation intensity was monitored by the OPT301M photodiode mounted next to the sample and voltage outputs were converted to UV intensities according to Equation 6.

The optical densities and the corresponding transmittance of the neutral density filters selected are listed in Table 3.

TABLE 3

Transmittance and Optical Density of Neutral Density Filters.

| Optical Density (O.D.) | Transmittance |
| --- | --- |
| 2.0 | 0.010 |
| 1.0 | 0.100 |
| 0.5 | 0.316 |
| 0.4 | 0.398 |
| 0.3 | 0.501 |
| 0.2 | 0.631 |

Where the quantities are related by:

$$O.D.=-\text{Log}_{10}T \qquad \text{Eqn. [10]}$$

Figure 17:
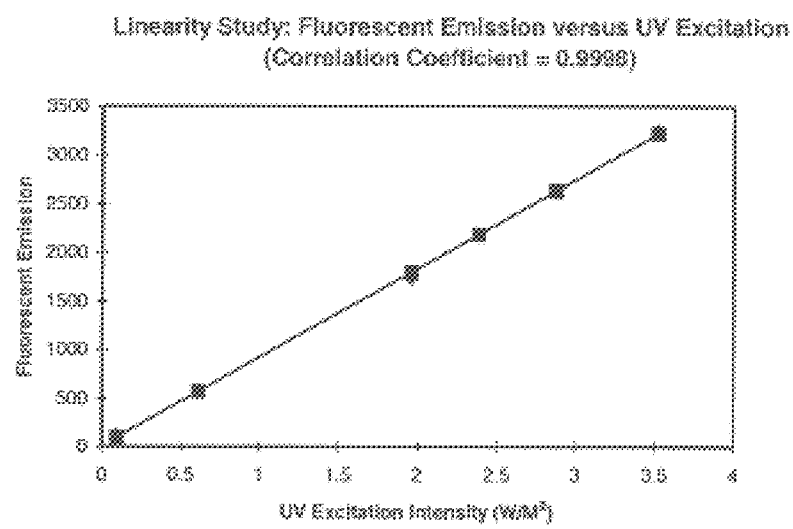
FIG. 17 is a graph of fluorescent emission intensities of Eu(hfa)$_3$ as a function of UV excitation intensities. The graph is a linearity study of fluorescent emission as a function of UV excitation (correlation coefficient=0.9998).

A high degree of linearity was observed for the UV intensity range tested (FIG. 17).

A higher frame rate was achieved to a certain degree by increasing the UV excitation intensity since exposure time can be reduced accordingly. This was especially true for a frame transfer CCD sensor, which does not have the data readout overhead. However, care must be taken to ensure that an increase in UV excitation intensity does not cause other problems such as linearity wherein saturation effects start to set in for increasing UV intensity; photo-bleaching wherein high UV excitation has the potential of permanently destroying the chemical bonds of the fluorescing molecules, even when other environmental factors are not present; and UV heating.

Figure 18A:
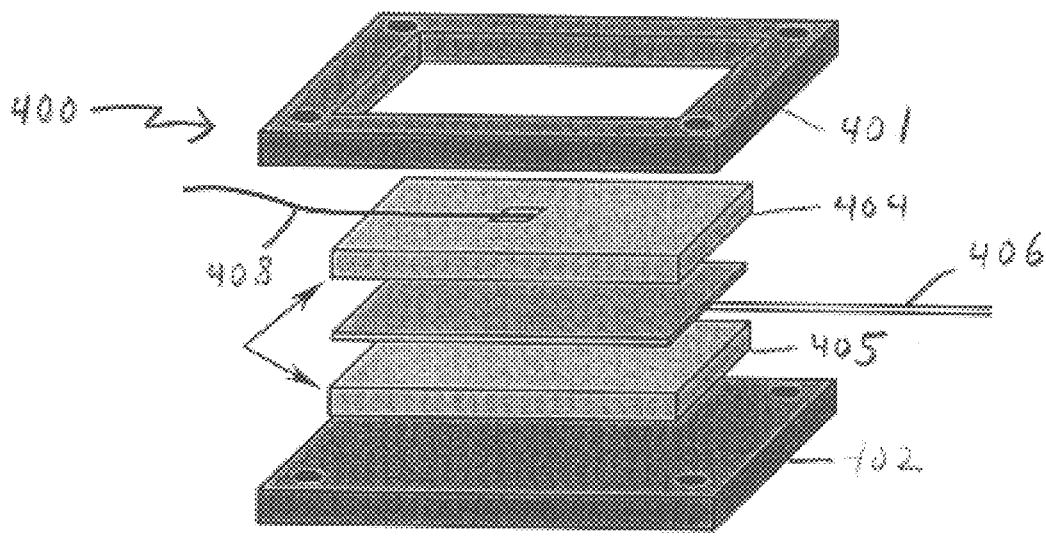
FIG. 18a illustrates the calibration rig that was used for determining the relation between fluorescence intensity and temperature.
Figure 18B:
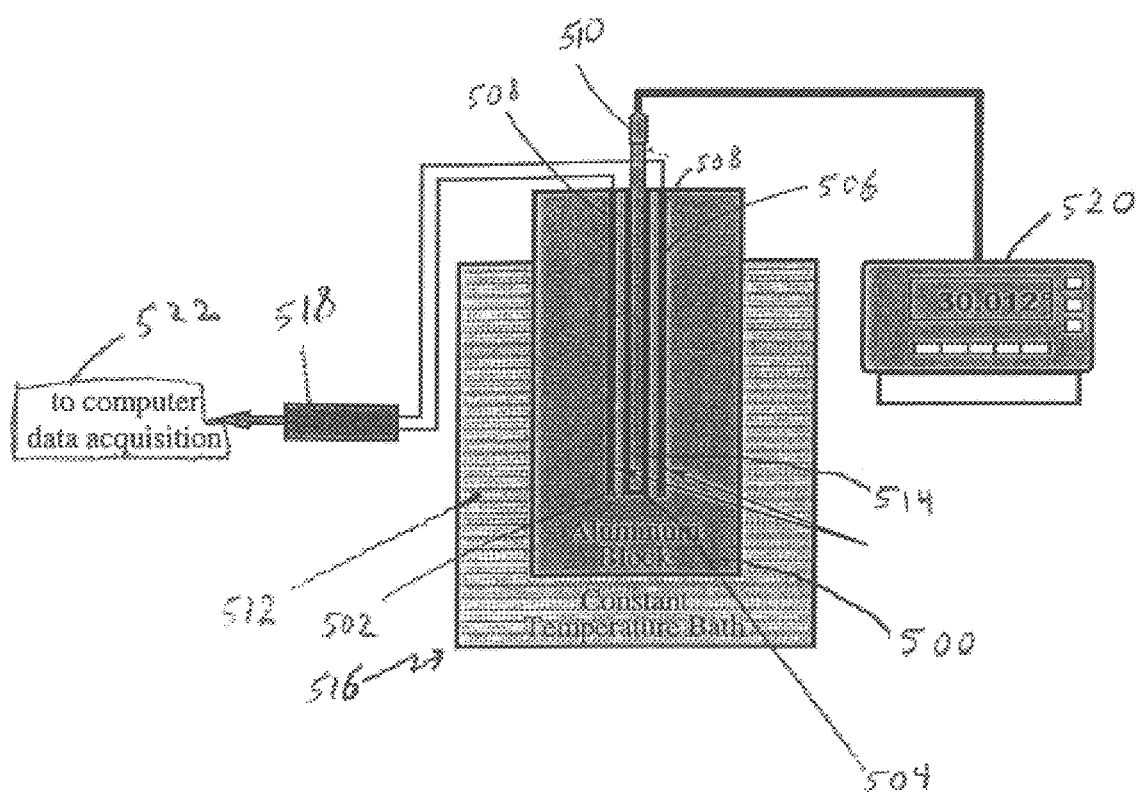
FIG. 18b illustrates the setup for thermocouple calibration.

Calibration Curve for Fluorescent Emission Intensity and Temperature. The relation between fluorescent emission intensity and temperature was determined experimentally for the temperature region of interest. A test rig 400 was built to facilitate the experiment, as shown in FIG. 18. Two low thermal conductivity (composite wood) frames were made which hold the test plates together by four screws. The top frame 401 was 1.5×1.5 in$^2$ outside and 0.9×0.9 in$^2$ for the inside, ¼ in thick. The bottom frame 402 was 1.5×1.5×¼ in$^3$. The two test plates were top aluminum block 404 and bottom aluminum block 405, each (1.0×1.0×⅟₁₆ in$^3$) to ensure uniform lateral temperature distribution. A thermofoil heater 406 (MINCO thermofoil heater, model #: 2-HK5318R26.1L12A) was sandwiched between the aluminum plates 404 to provide heating to desired temperatures. Steady temperature was reached when the energy generation and heat dissipation by natural convection was balanced for the rig 400. Thermocouple 408 was attached to top aluminum block 404.

An important factor that will determine the accuracy of the calibration relation is the ability to measure the surface temperature accurately by thermocouples or some other means as standard. The thermocouples used in the experiments were calibrated by an Omega DP95 digital RTD thermometer, which was factory calibrated to an accuracy of 0.01° C. A cylindrical block 500 was made of aluminum with drilled holes 502, 504, and 506 to accommodate the thermocouples 508 and the RTD probe 510. The ⅛" holes for thermocouples were small enough to minimize the temperature gradient along the holes but large enough to accommodate most thermocouple types. Three-quarters of the aluminum cylinder was immersed in the coolant 512 to maintain a uniform temperature around the thermocouples 508 and the RTD tip region 514. A constant temperature bath 516 (NESLAB RTE-140) was used to maintain the temperature of the block 500. The thermocouples 508 were calibrated from 0° C. to 90° C. in 5° C. intervals. The thermocouple data acquisition boards 518 (CIO-DAS802/16 and CIO-EXP16) had a temperature resolution of 0.125° C. and the temperature fluctuation of the constant temperature bath 516 was 0.1° C. as specified by the manufacturer.

After the constant temperature bath 516 reached the set temperature and allowed to stabilize for ten minutes, 200 data points were read at 20 Hz rate with the data acquisition boards 518, which sent the data to computer 522. The averages were calculated and the RTD readings were also recorded by recorder 520. These RTD readings were repeated until measurements for all the desired set points had been performed. The measured data were compared with the RTD readings and the differences were adjusted in the thermocouple measurement program (TCDAQ.exe) for each input channel. The calibration block 500 accommodated a total of eight thermocouples 508, and the data acquisition board 518 had sixteen input channels so only half of the inputs were used.

Two methods for attaching the thermocouple to the sample surface were investigated: epoxy adhesive configuration and thin tape adhesive configuration. For the epoxy method, a tiny volume of Omega 101 A/B epoxy was applied to the tip of the thermocouple and carefully set onto the sample surface. The epoxy spot size was about 1 mm wide and 0.5 mm thick. Several problems were observed for such a method. First, it was very sensitive to room/building air circulation. When the block was at about 75° C., the fluctuation was greater than 0.2° C. Second, the thermocouple wires near the tip revealed a fin effect (thermal drain), which introduced systematic error. At the same heater power level, this method measured approximately 2° C. below the value obtained from method two when the block was at 75° C. Third, the epoxy permanently set the thermocouple onto the surface after it cured so that the calibrated thermocouple was not reusable.

In thin tape method, the thermocouple tip was wetted by silicon heat sink paste before it was taped onto the sample surface using thin high temperature tape (by CHR/FURON Division). The heat sink paste ensured that the thermocouple was in good thermal contact with the surface. This approach reduced the temperature fluctuation to 0.1° C. and provided thermal grounding for the thermocouple, which inhibited the fin effect. A resistive network model was used to estimate the effect of the tape since the tape had the potential to introduce extra thermal resistance to the surface.

The presence of the tape induced a temperature increase of about 0.075° C. at the surface assuming $T_{source}-T_{ambient}=60°$ C. The error was below the resolution limit of the thermocouple measurement device (0.1° C.) and was not significant.

The calibration was conducted from room temperature up to 80° C. with 10° C. intervals. For each calibration point, the thermocouple measurement was obtained by averaging 100 samples at 10 Hz. For the calibration rig design, it took approximately 20 minutes to reach the desired set point, and usually another ten minutes waiting period was necessary for the temperature to stabilize. Using a smaller calibration rig might reduce the time to reach setpoints, however, because the smaller rig has a smaller thermal mass, it can become susceptible temperature fluctuations caused by air drafts. Due to the length of the calibration procedure (about 3 hours for seven calibration points), the OPT301M photodiode was used to monitor the UV variations during the test and the fluorescent emission intensities measured were compensated. Each fluorescent image was the average of three consecutive frames. Each intensity measurement was obtained by sampling at approximately 1 mm from the thermocouple tip. The measurement was done as close to the thermocouple tip as possible. The calibration results are shown in FIG. 19 with ORBIS camera operating at 12 bit mode. The measurement errors for the intensities were estimated in the following section. The fluorescent emission intensity decreased with increasing temperature, almost linearly. Most non-linearity occurred near room temperature (20° C.) and at high temperature (80° C.). This calibration relation was fitted with a seventh degree polynomial. The polynomial was then used to create an intensity-temperature table for the calibrated range with 0.01° C. interval. This table can be used by the hybrid-linear search algorithm to determine temperature of future measurements.

Estimate of Temperature Measurement Errors. In order to derive temperature measurements using the ratiometric approach, measured fluorescent emission intensities were compared with the calibration curve, which describes the temperature-dependent behavior of the relative fluorescent emission intensities. Since the intensity measurements at the time of interest and the calibration relation both have uncertainties and the measurements are independently performed, they both contribute to the total measurement error:

$$\sigma_{total} = \sqrt{\sigma_{calib}^2 + \sigma_{test}^2},$$ Eqn. [11]

with $\sigma_{calib}$ being the error of the calibration and $\sigma_{test}$ being the error of intensity measurement at time of interest. $\sigma_{test}$ is comprised of two components:

$$\sigma_{test} = \sqrt{\sigma_{intensity}^2 + \sigma_{TC}^2},$$ Eqn. [12]

where $\sigma_{TC}$ is the error of the thermocouple reading for the reference temperature and $\sigma_{intensity}$ is the temperature error associated with the intensity measurement error, which can be determined from dark noise, shot noise, read noise, flicker noise (UV source), background noise, and digitizing error, and is shown in equation 11.

$$\sigma_{intensity} = \sqrt{\sigma_{dark}^2 + \sigma_{read}^2 + \sigma_{shot}^2 + \sigma_{flicker}^2 + \sigma_{bg}^2 + \sigma_{digi}^2};$$ Eqn. [13]

It has been shown that the dark noise signal grows proportionally with time. Therefore, dark noise will not become significant unless the exposure time exceeds 2 seconds because the ORBIS camera is cooled to −20° C., and equivalent noise of 1 DU will require approximately 193 seconds exposure time, which can easily be verified by the method used to evaluate the dark noise as above.

The read noise was less than one detector unit (DU) since the CCD was design to read at relatively low speed (<1 Mbyte/s) as compared to about 15 Mbyte/s of ordinary video camera.

Calculations showed that shot noise could reach about 6 to 7 DU and constitutes a significant part of the total noises. It was the result of the limited electron potential well and the governing statistics. For given equipment, improvement can be obtained by increasing the exposure time or averaging multiple frames. Both have the same effect of increasing sampling size to reduce error. The tradeoff is that it will take a longer period of time to obtain a measurement. As governed by statistics, the reduction in shot noise was proportional to $1/\sqrt{N}$, where N is the sample size.

Flicker noise was primarily determined by the quality of the UV source. Even a good UV source will drift over the long term (about 1 hour). It is advised to monitor the UV intensity if the measurement will be conducted over a relatively long period of time (>10 minutes). By monitoring and compensating for the UV fluctuation, the flicker noise was minimized to less than 1 DU.

The background noise depends on the characteristics of the background light source and the camera exposure time. To realize the full potential (dynamic range) of the CCD camera, it is advised to conduct measurement in low ambient light condition. Since the background was subtracted from the image to obtain net measurement, the noise effect was minimized and was rendered insignificant. The background effect can become significant if it comprises a significant part of the total signal, especially when the exposure time is short (about 0.01 s) since the background (room) light source is fluctuating at about 100 Hz. In this example, the background level was approximately 5% of the total signal.

Digitizing noise will become significant when the signal is very faint or exposure time is too short. Digitizing noise represents the error introduced while quantifying a constant physical quantity (such as voltage) by the equipment with a numeric number. In the case of digital camera, the magnitude of such error was always 1 DU, the smallest unit used to represent the intensity.

Figure 20:
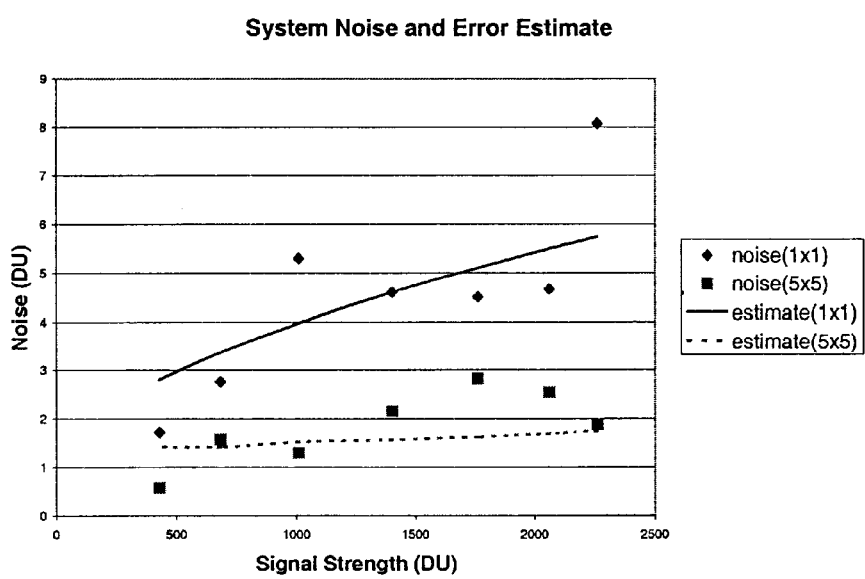
FIG. 20 is a graph that shows a comparison of measurement errors and error estimate model for system noise.

To evaluate the error estimation model (Eqn. [11] to Eqn.[13]), results from experimental measurements of various gray scale intensities were compared to the values given by the estimation model, as shown in FIG. 20. Seven intensity levels between 400 DU and 2300 DU were tested, which covers most of the intensity range used in this study. At each intensity level, ten images were taken from which statistical analysis was performed. The diamond-shaped data points were the standard deviation of ten measurements for a single pixel, while the box-shaped data points were the standard deviation of ten measurements of 25 averaged pixels (5×5). Both estimate lines were the estimated errors for the above two cases. It can be seen that the magnitude of noise increased with signal strength, which is a characteristic of a shot-noise dominant system. Averaging reduced the noise level to some extent until other sources of error become dominant. The measurement results and the estimate model were consistent with each other.

In summary, the total noise of a single measurement (pixel) was approximately 8 DU with the CCD sensor near full scale (by extrapolating from the estimation model). By introducing averaging to reduce shot noise, the total noise could be reduced to about 3 DU (best case) when other noise sources become dominant.

The calibration error contains all the above errors and possibly one additional source of error, the error introduced by the mathematical representation of the calibration relation. Since calibration is conducted only at discrete points (temperatures), a polynomial or other type of model is used to interpolate a value between adjacent points, which introduces errors. The highest degree polynomial should be used for a given number of calibration points, e.g., a seventh degree polynomial will give a best fit for seven calibration points. The error given by such a model is less than 0.01° C.

With the above analysis, we can derive an estimate of the total temperature measurement error:

$$\sigma_{calib}(°C.)=\sigma_{calib}(DU)/\text{Slope\_of\_Calib\_Curve} \qquad \text{Eqn. [14]}$$

$$\sigma_{test}(°C.)=\sigma_{test}(DU)/\text{Slope\_of\_Calib\_Curve} \qquad \text{Eqn. [15]}$$

The following are calculations for the worst and best cases for $\sigma_{intensity}$:

$$\sigma_{intensity}^{worst} = \sqrt{(\sigma_{dark}^2 + \sigma_{read}^2) + \sigma_{shot}^2 + \sigma_{flicker}^2 + \sigma_{bg}^2 + \sigma_{digi}^2} \qquad \text{Eqn. [16]}$$

$$= \sqrt{0.64^2 + 6.0^2 + (30000*0.001)^2 + 0.0^2 + 1.0^2}$$

$$= 6.8(DU) = 0.24°\text{ C}$$

$$\sigma_{intensity}^{best} = \sqrt{(\sigma_{dark}^2 + \sigma_{read}^2) + \sigma_{shot}^2 + \sigma_{flicker}^2 + \sigma_{bg}^2 + \sigma_{digi}^2} \qquad \text{Eqn. [15]}$$

$$= \sqrt{0.64^2 + 0.0^2 + (30000*0.001)^2 + 0.0^2 + 1.0^2}$$

$$= 3.2(DU) = 0.11°\text{ C}$$

Taking into account the error of thermocouples (about 0.1° C., Eqn. [12]), the best and worst case of total measurement errors were approximately 0.21° C. and 0.37° C. It can be observed from the equations that substantial frame averaging is required (>25 frames) in order to approach the best case limit 0.21° C. (the shot noise term will decrease by a factor of $\sqrt{2}=5$ which will make this term insignificant compared to the other terms).

Moisture Effects. Future applications of the fluorescence-based technique might require that the film be exposed to water moisture or even be in direct contact with water. The photo-bleaching experiment indicated that the $Eu(hfa)_3$ probe of the FERIT method or system of the present invention was not susceptible to adverse effects caused by normal room conditions, such as the presence of oxygen and trace amount of moisture in the air. This is in distinct contrast to the severe photo-bleaching experienced by the EuTTA-based probes under the same conditions (Caffrey, ibid. (1994); Barton et al., Microelectronic Eng. 31: 271–279 (1996)). How the film comprising the $Eu(hfa)_3$ probe of the FERIT method or system of the present invention behaves in extreme conditions such as in water at room temperature was the object of this test.

An aluminum block coated with a film comprising the $Eu(hfa)_3$ probe of the FERIT method or system of the present invention as in Example 1 was placed in a container filled with distilled water where the film was about 2 mm below the water surface. A thermocouple was attached to the surface of the block to monitor possible temperature fluctuations of the film.

Figure 21:
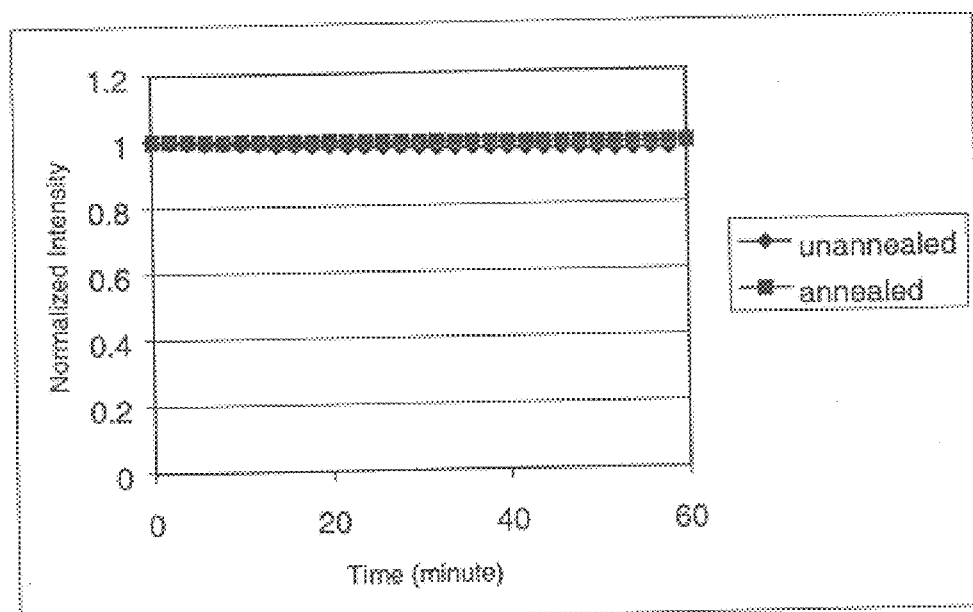
FIG. 21 is a graph that shows the effect of moisture on fluorescent emission intensity for annealed and unannealed films containing Eu(hfa)$_3$ over a time period of one hour while immersed in water.

The UV excitation level used was about 1 W/m² (typical for all experiments performed in this example) and no significant temperature changes were observed during the test (<0.2° C.) so that temperature variations could be ruled out as a parameter causing any fluorescent intensity change. An image was taken every two minutes over a one-hour period. Three frames were averaged to obtain a measurement (image). The initial fluorescent emission intensity was approximately 2500 DU at 12 bit resolution. The non-dimensional fluorescent emission intensities over time for an annealed and an unannealed film while immersed in the water are shown in FIG. 21. The percentile decreases in intensity over time were about 1.4% and 3.6%, respectively. In contrast, the percentile decreases in intensity over time annealed and unannealed films in ambient air were 1.0% and 2.1%, respectively (FIG. 16). As shown in FIG. 21, the intensity decreased about 3.6% for the unannealed film over a period of one hour and the percentile change was about twice that of the test conducted in ambient air (about 2.0% as shown in FIG. 16).

In the absence of a polymer such as the PMMA: poly methyl-methacrylate that was used herein, water molecules will compete with the hfa ligands for the central ion ($Eu^{3+}$). This results in a decrease in fluorescent intensity. However, the above test indicated that the temperature probe encapsulated by the PMMA polymer was effectively protected from moisture. This indicates that the film containing the $Eu(hfa)_3$ probe of the FERIT method or system of the present invention can be applied to surfaces that are exposed to an aqueous environment such as a water flow system and that special measures to account for variations in relative humidity need not be applied when accuracy better than about 1 to 4% is not required.

Reproducibility between Neighboring Pixels. The spatial response uniformity was evaluated. This test was aimed at evaluating the consistency of measurement results provided by individual CCD sensing element (pixel) at the given calibration points/conditions. It was desirable that all pixels produce similar calibration relations (fluorescent emission intensity as a function of temperature).

The reproducibility among neighboring pixels was investigated. A group of pixels (2×5) was chosen very close to the thermocouple junction tip. The intensities of these pixels for the range of calibration temperatures (from about 20° C. to 80° C.) were measured.

Figure 22:
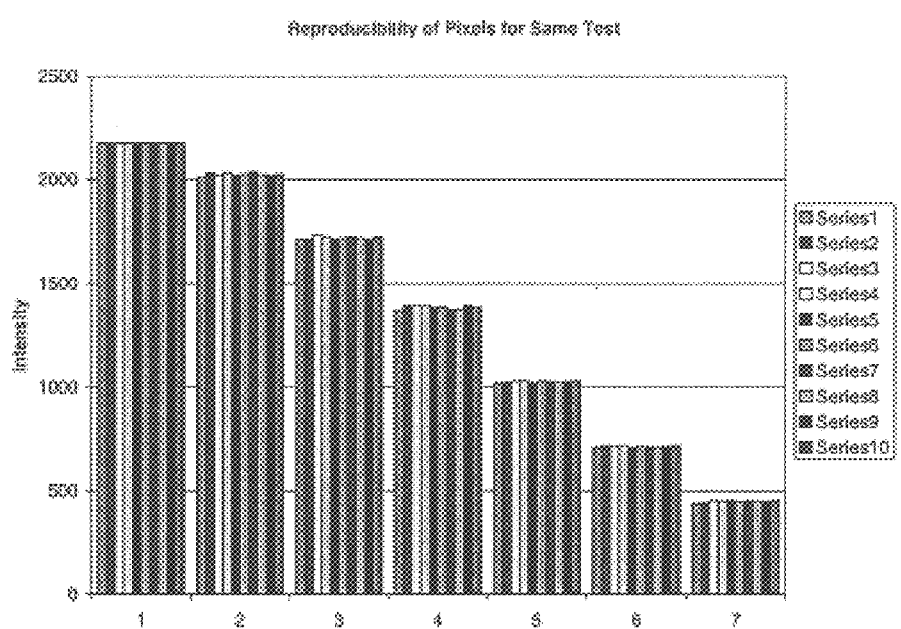
FIG. 22 is a chart that shows the reproducibility of pixels for the same test. It shows the reproducibility among neighboring ten pixels.

Net fluorescent intensities were obtained by subtracting the background from the original image, which were then compensated for UV excitation fluctuation. Because of the slight non-uniform responsivity among pixels (even for the same illumination levels), the intensities of the ten pixels were scaled to the same starting intensity (at 23° C.). The subsequent intensity variations among the ten pixels at different calibration temperatures are shown in FIG. 22. The intensities of the ten pixels at the same temperature were grouped together, in temperature-wise increasing order, i.e., 23°, 30°, 40°, 50°, 60°, 70°, and 80° C. The variation changed from about 8 DU or 0.36% at high intensity (room temperature) to about 4 DU or 0.87% at low intensity (high temperature about 80° C.), which corresponded with the error estimate for the system (shot-noise limited). This was not surprising because even though each pixel in this test behaved as an individual sensor, it showed a calibration relation similar to the others since they were at the same temperatures.

Figure 23:
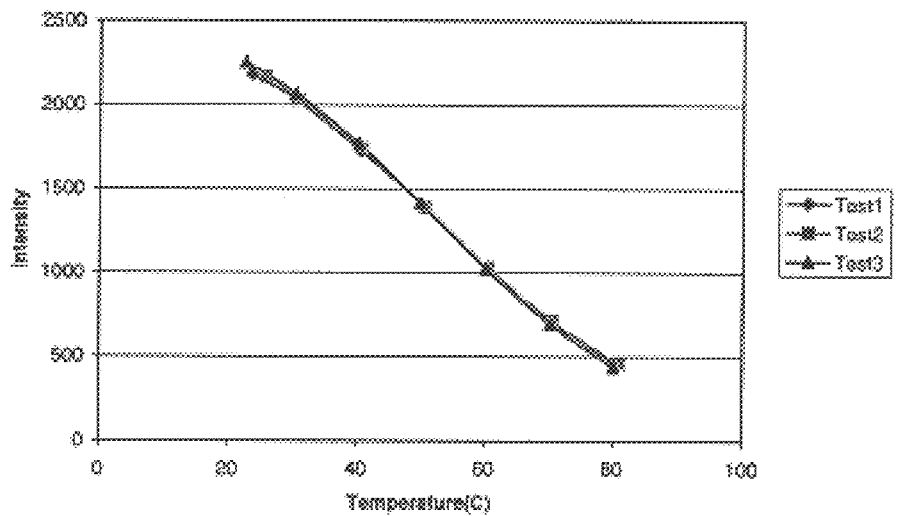
FIG. 23 is a graph that shows the reproducibility of the calibration relation before annealing the film for three tests.
Figure 24:
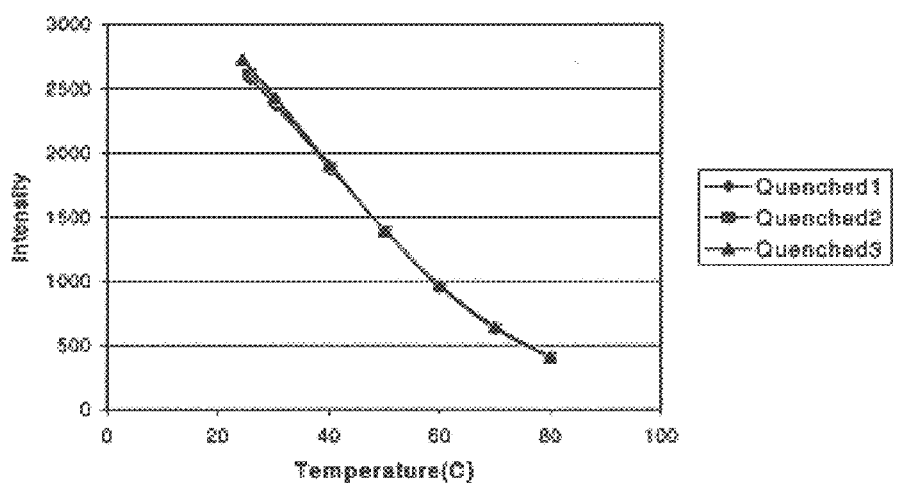
FIG. 24 is a graph that shows the reproducibility of the calibration relation after annealing the film for three tests.

Reproducibility Tests Before and After Annealing. The objective of these tests was to demonstrate the reproducibility of the calibration relation. The calibration test was repeated three times for the same sample, from room temperature to 80° C. at 10° C. intervals, before and after the film was thermally annealed. The results are summarized in FIG. 23 and FIG. 24, respectively.

Since the starting temperatures and fluorescent emission intensities were different, we chose to match the intensity at 50° C. so that the shape difference between these calibration relations was easier to observe. The calibration relation was fairly linear except for the low temperature and high temperature ends. The three repeated measurements overlapped each other very well, which indicated good reproducibility. The slopes (absolute values) increased slightly from the first test to the last test. This might be explained by the annealing effect since repeated tests caused the fluorescent film to experience thermal cycling close to the polymer glass transition temperature (about 100° C.), which made the calibration relation move slightly towards the behavior of a film that has been annealed. The slope was approximately −1.42%/° C.

To calculate the slope, the intensity was normalized by the initial intensity at room temperature. The film was then annealed at 120° C. (the glass transition temperature of PMMA is approximately 100° C.) for approximately half an hour, followed by three repeated calibration measurements. Similarly, the intensity at 50° C. was matched for the comparison. Linear behavior was observed from room temperature up to 60° C. The slope in this case was approximately −1.55%/° C., which was about 8.3% steeper than the unannealed case.

The variations within the three calibration measurements of the annealed and unannealed films were approximately 19 DU and 23 DU respectively, which corresponded to errors of approximately 0.47° C. and 0.67° C.

The slope determines the shape of the calibration relation and the FERIT method or system of the present invention's temperature sensitivity. Even though good reproducibility was observed for calibration behavior before and after the quenching, care must be taken to ensure proper calibration is used for films which have undergone different thermal treatments. An unannealed film might behave like an annealed one if the test is conducted close to the glass transition temperature of the polymer. It is recommended that the fabricated films be annealed wherever the situation allows. Possible errors introduced by improper use of calibration relations for films with different annealing history are discussed quantitatively herein.

The shape difference before and after annealing was more obvious by overlaying the two sets of data in dimensionless coordinates:

$$\text{Temperature}^* = (T - T_{min})/(T_{max} - T_{min}) \quad [\text{Eqn. 17}]$$

$$\text{Intensity}^* = (I - I_{min})/(I_{max} - I_{min}) \quad [\text{Eqn. 18}]$$

Figure 25:
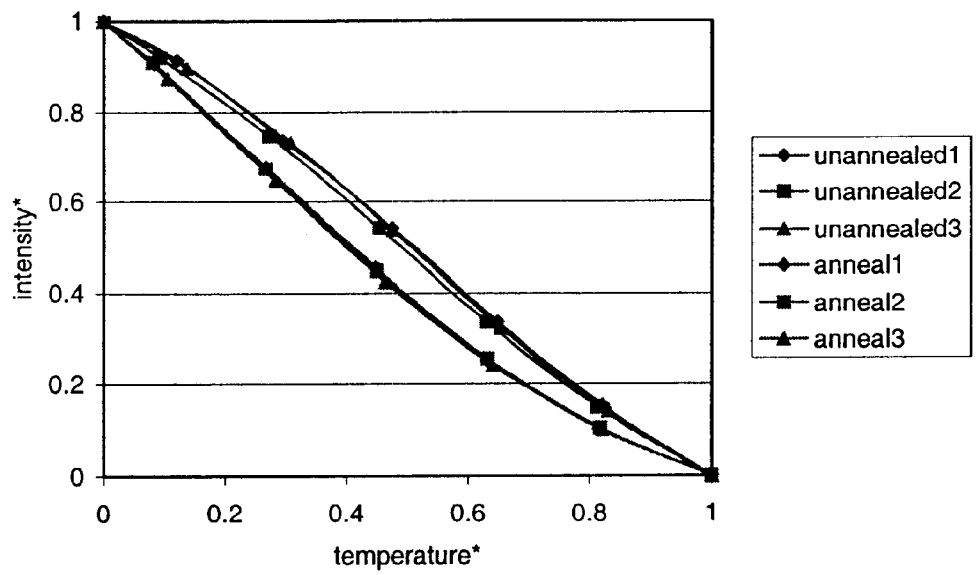
FIG. 25 is a graph that shows the effect of annealing the film by comparing the three unannealed and the three annealed tests.

Annealing changes the shape of the calibration curves and different calibration relations should be used for films which have undergone different temperature treatments. An error as high as 5° C. could be introduced if the inappropriate calibration relation is used, as explained quantitatively herein for the effect of annealing (FIG. 25).

Figure 26:
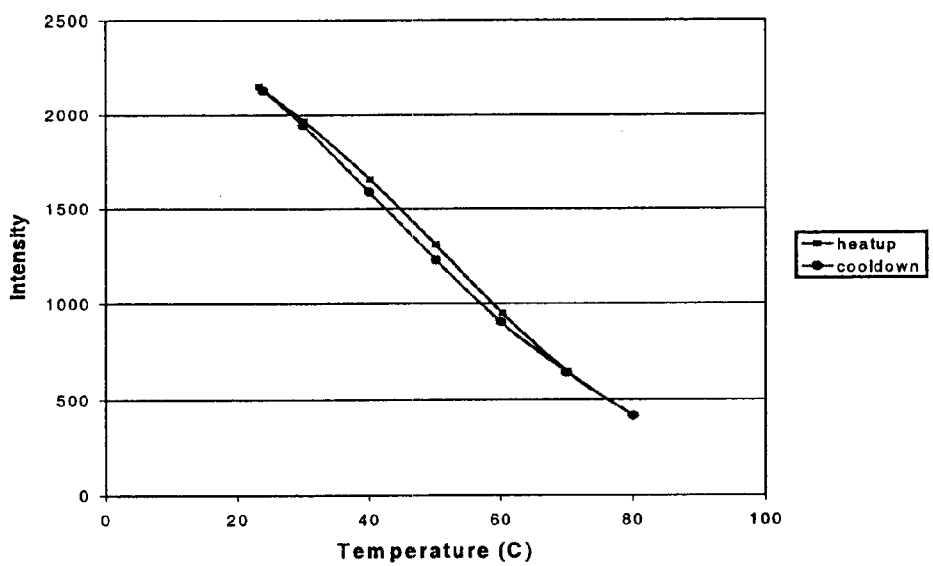
FIG. 26 is a graph that shows fluorescent emission as a function of temperature for a heat-up and cool-down process.

Hysteresis. Testing was also performed during which the annealed sample was first heated from room temperature up to 80° C. and then cooled back down to room temperature at 10° C. intervals to investigate the significance of any hysteretic behavior. For each measurement, it took approximately 15 minutes to reach the temperature setpoint and another ten minutes for the temperature to stabilize. Each intensity measurement was an average of three frames and the temperature was an average of 100 data points sampled at 100 Hz. The result is illustrated in FIG. 26.

The two curves for heating up and cooling down were matched fairly well except for the middle portion. More detailed investigation is recommended for the future in which the effects of temperature ranges and number of repeats on the hysteretic behavior should be systematically studied.

Annealing Effects. From the reproducibility experiments for the annealed and unannealed films, it was observed that annealing increased the slopes of the calibration curve over 8%, which was significant. Failure to use the appropriate calibration table might result in temperature measurement error as high as 5° C. for the entire temperature range of 60° C. The linearity of an annealed film near room temperature was better than that of an unannealed one, which is a desirable feature. Thermal cycling due to repeated tests on an unannealed specimen will have similar effects as annealing, especially if the test temperature is very close to the glass transition temperature of the polymer. This can create potential errors in temperature measurement since the unannealed calibration curve used to deduce temperature might not be valid. One should anneal the film (above the polymer glass transition temperature for approximately half an hour) whenever possible and use the appropriate calibration relation to derive accurate temperature measurements.

Effect of Fluorescent Probe Concentration. Studying the effect of fluorescent probe concentration on the calibration relation will help the user to choose an appropriate concentration level for particular applications, and it will also provide some insights regarding how possible probe non-uniformity might affect the final temperature reading. Fluorescent probe concentration is a determining factor for the fluorescent signal strength. Increasing the concentration has the potential to boost signal output level. However, an extremely high probe concentration may result in poor adhesion to the sample surface since the polymer acts as a primary binder to both the temperature probe and the surface of application. At high probe concentration, some of the surface area might be occupied by the probe molecules that would result in a weak bond.

Samples with films having $Eu(hfn)_3$ probe concentrations of 50 wt % and 12.5 w% were fabricated and compared to the test samples of 25 wt % studied earlier. Calibration relations were measured for these two samples and compared.

Figure 27:
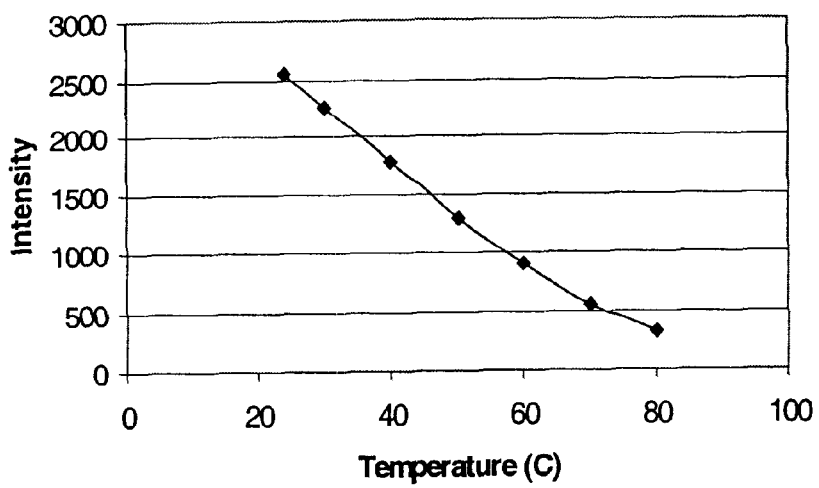
FIG. 27 is a graph of a calibration relation for a flourescent film of 50 wt % concentration of probe comparing intensity verses temperature.

The temperature-dependent fluorescent emission intensity of a quenched film with 50 wt % is shown in FIG. 27. The slope was approximately −1.56%/° C.

Figure 28:
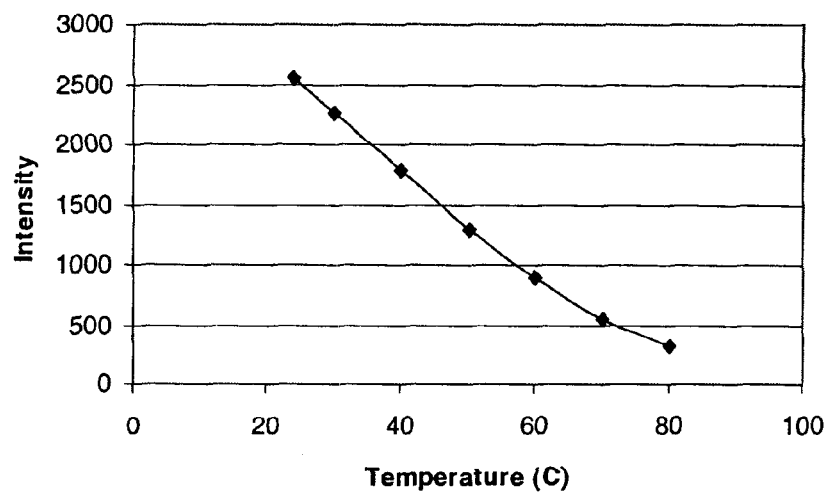
FIG. 28 is a graph of a calibration relation for a flourescent film of 12.5 wt % concentration of probe comparing intensity verses temperature.

Testing was also conducted for a quenched film with 12.5 wt % probe concentration and the result is shown in FIG. 28. The slope is −1.54%/° C.

Compared with the slope of calibration for the concentration range tested (12.5 wt %, 25.0 wt %, and 50.0 wt %), there was a slight increase of the slope (absolute value) with increasing concentration but the increase was not significant among the three samples tested (difference less than 2%). Previous studies conducted for very low probe concentrations (about 0.01%) resulted in a slope of approximately −0.1%/° C.

Figure 29:
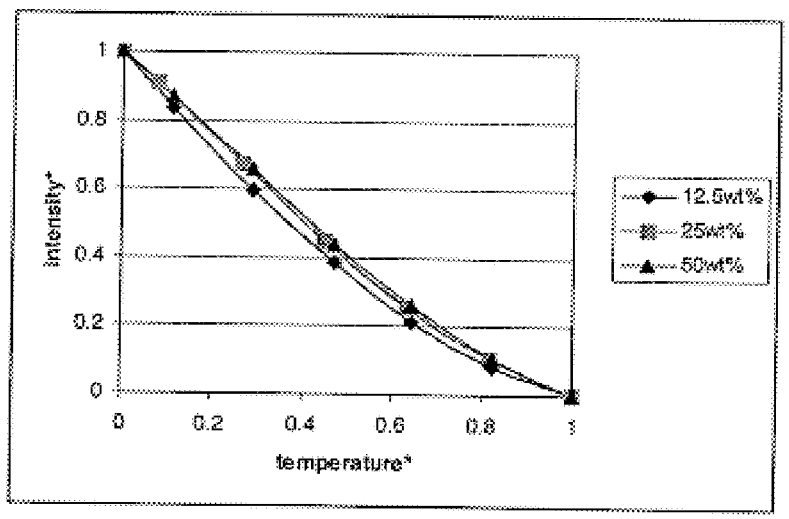
FIG. 29 is a graph that shows the effect for of probe concentration on fluorescent intensity.

FIG. 29 shows the shapes of the calibration relations in dimensionless coordinates for the three different probe concentration levels tested. The two curves of the higher concentration probes (25 wt % and 50 wt %) were very similar but the probe concentration at 12.5 wt % deviated from the other two probe concentrations slightly.

Aging Effect. Three repeated measurements (FIG. 23) were conducted over a period of one month and no significant aging behavior of the probe was observed, which is not surprising since photo-bleaching and moisture tests indicated that the FERIT method or system of the present invention was not sensitive to ambient conditions.

System Dynamic Response. The imaging system's dynamic response will determine how fast the system can capture time dependent phenomena. The FERIT method or system of the present invention was applied to a surface to measure the time-varying surface temperature of a metallic (aluminum) thin film heated by a pulse source.

A thin metallic film (30 mm×8 mm×0.03 mm) was coated according to the FERIT method or system of the present invention and its two ends were connected to a heating source. The film was initially at room temperature. The amplitudes of the square wave pulse were 1 VDC maximum and 0 VDC minimum. Three different pulse periods were tested: 10 s, 5 s, and 1 s with 50% time at maximum and 50% at minimum. The DC current at 1.0 VDC was measured about 0.45 amp, which was consistent with the heated foil resistance (2.1). The pulses were realized by sending timed high and low digital outputs through the data acquisition card to a solid state relay, which controlled the power to switch on and off. The ORBIS digital camera started taking images right before the pulsation began. Thirty frames were taken at 1.1 s interval with an image size of 512×128 and exposure time of 0.5 s. The image area (512×128) was chosen to be big enough (6"×1.5" in real space) to cover the whole metallic film but small to increase frame rate and save file storage space. This exposure time was chosen to obtain an initial (at room temperature) fluorescent intensity of approximately 70% (about 2800 DU) of full scale (4095 DU).

Figure 30:
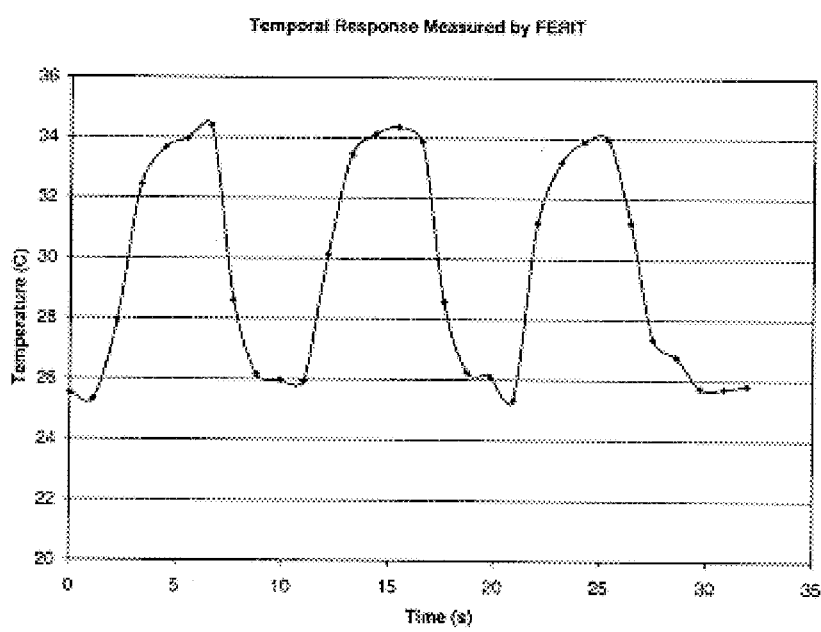
FIG. 30 is a graph that shows the temporal response measured by the method of the present invention. It shows the time-dependent surface temperatures (pulse period 10.0 s).
Figure 31:
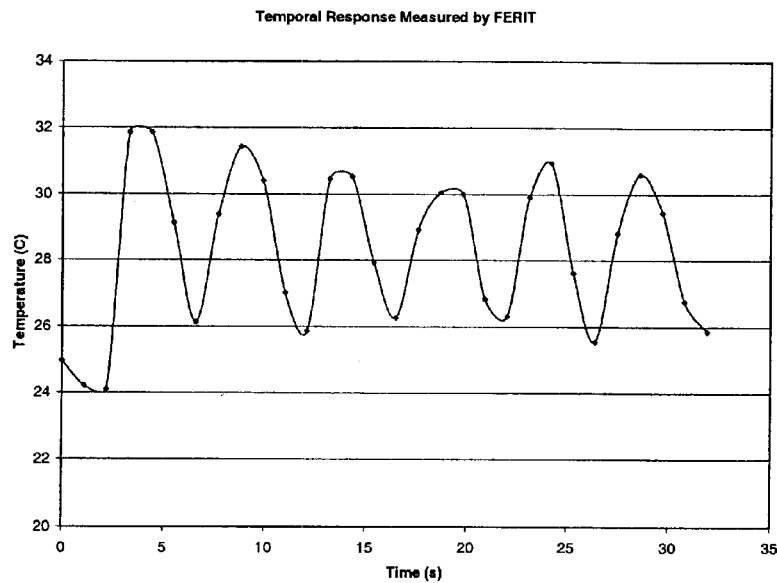
FIG. 31 is a graph that shows the temporal response measured by the method of the present invention. It shows the time-dependent surface temperatures (pulse period 5.0 s).
Figure 32:
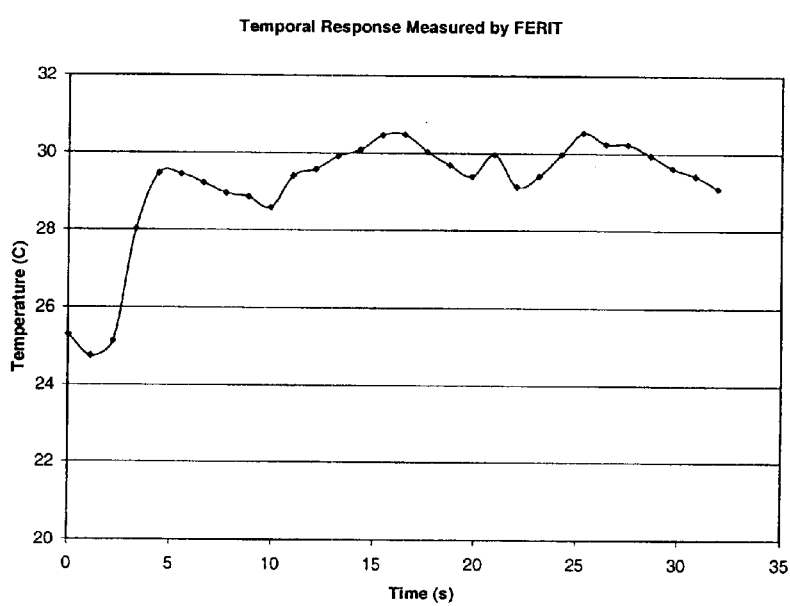
FIG. 32 is a graph that shows the temporal response measured by the method of the present invention. It shows the time-dependent surface temperatures (pulse period 1.0 s).

The temperature of the foil surface over time was measured by the FERIT method or system of the present invention for the three different pulse frequencies (0.1 Hz, 0.2 Hz, 1 Hz). The results are illustrated in FIG. 30, FIG. 31, and FIG. 32.

The system can resolve the slowly varying condition fairly well (FIG. 30) since the frame period (1.1 s) is much shorter than the pulse period (10.0 s). When the pulse period was shortened to 5.0 s, it barely caught the periodic characteristic of the heating (FIG. 30). When the pulse period became comparable (1.0 s) to the frame period (1.1 s), the system was too slow to keep up with the changes.

The slow frame rate/dynamic response (about 1 fps) of the system was primarily limited by the nature of full frame device used in this study, which can readily be improved (to about 5 fps) by using frame transfer CCD. The operating principle of these two kinds of devices is explained herein. Selecting a smaller area of interest (AOI) might benefit the frame rate to some extent, but it will still be limited by the overhead of the mechanical shutter and slow exposure/readout sequence of full frame CCD.

EXAMPLE 3

This example illustrates several applications of the FERIT method or system of the present invention using the high temperature Eu(hfa)$_3$ probe.

Figure 33:
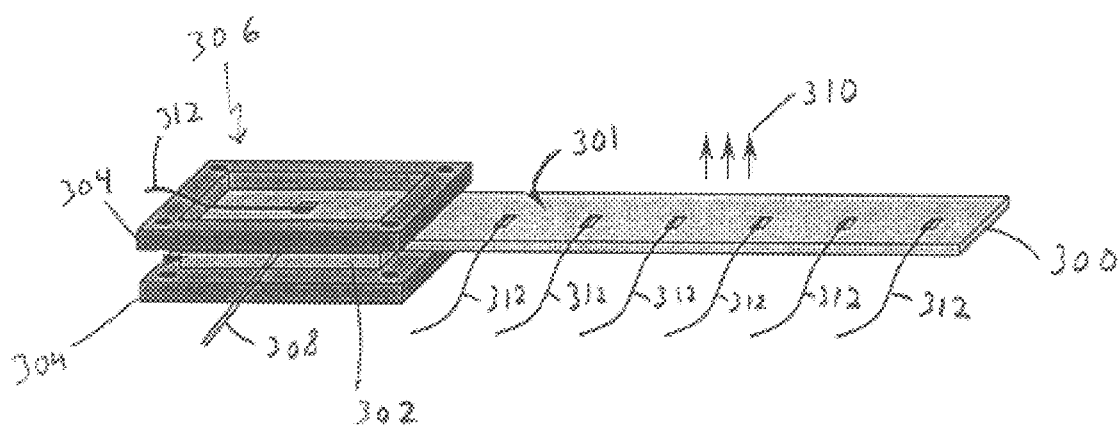
FIG. 33 shows the placement of thermocouples for making measurements on an aluminum fin coated with a layer of the probe in PMMA cooled by natural convection.

Temperature Distribution of Fin Cooled by Natural Convection. FIG. 33 shows a setup for measuring the temperature distribution along a metal fin cooled by natural convection. A rectangular aluminum fin 300 with dimensions 6"×1"×0.027" was held by the calibration block 302 at one end by brackets 304 forming calibration rig or base 306 and the rest of the fin 300 was exposed to ambient air. The film of the present invention prepared as in Example 1 was deposited onto one side of the surface with an airbrush to form layer 301. The base 306 was heated to various temperatures by a thermofoil heater 308 (MINCO thin-foil heater, model: 2-HK5318R26.1L12A) and temperature gradients of different magnitudes were created along the fin by natural convection 310. One thermocouple 312 was located at the center of the base 306 and six other thermocouples 312 were spaced equally (20 mm) along the exposed region of fin 300, as shown in FIG. 33.

Figure 34:
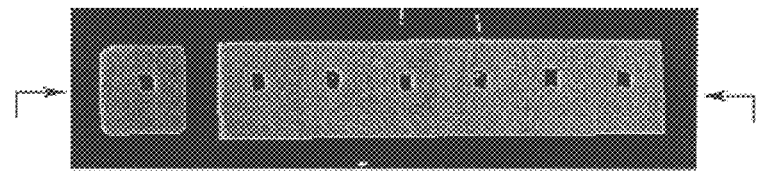
FIG. 34 shows the image of the temperature distribution along the aluminum fin in FIG. 33 wherein $T_{base}$ is 40° C. and a graph showing the temperature distribution along the aluminum fin.
Figure 34:
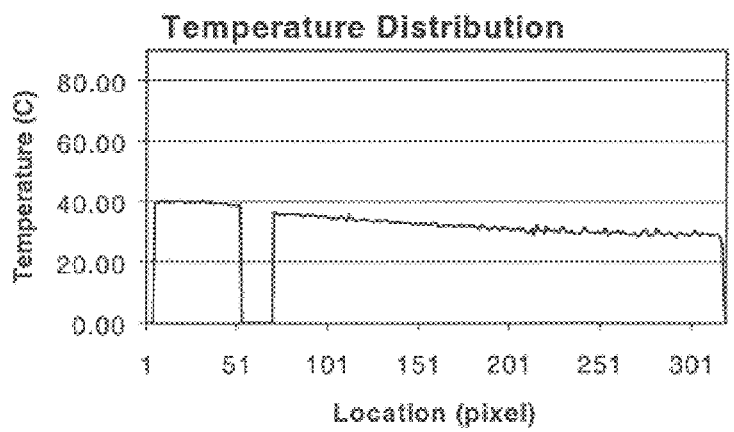
Figure 35:
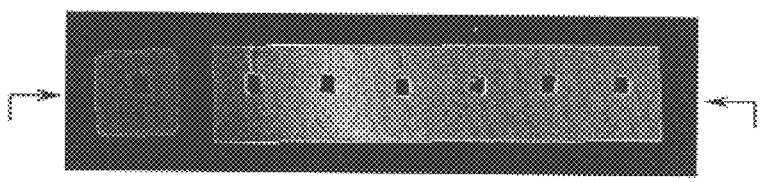
FIG. 35 shows the image of the temperature distribution along the aluminum fin in FIG. 33 wherein $T_{base}$ is 80° C. and a graph showing the temperature distribution along the aluminum fin.
Figure 35:
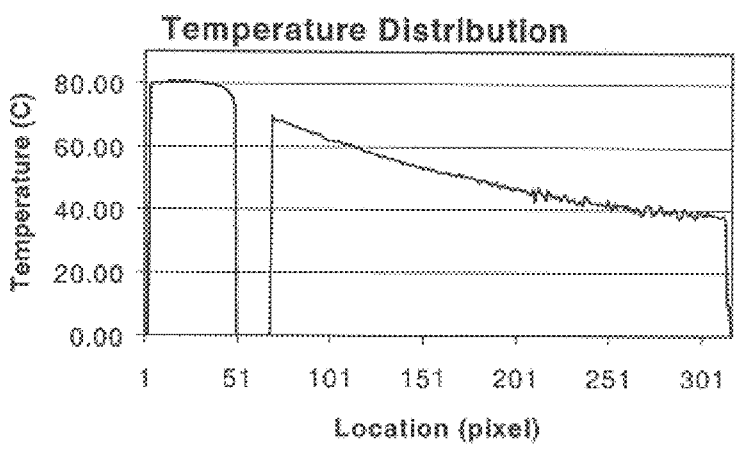

The base 306 temperatures were set from room temperature up to 80° C. at intervals of 10° C. by adjusting the power input to the thermofoil heater 310. After the base 306 temperature became steady, temperatures along the fin 300 were measured by both the thermocouples 312 and the FERIT method of the present invention (not shown). Temperature distributions measured by the FERIT method for $T_{base}$=40° C. and $T_{base}$=80° C. are shown in FIG. 34 and FIG. 35. Corresponding line profiles along the centerline of the fin 300 are also plotted below the thermographic distributions.

Figure 36:
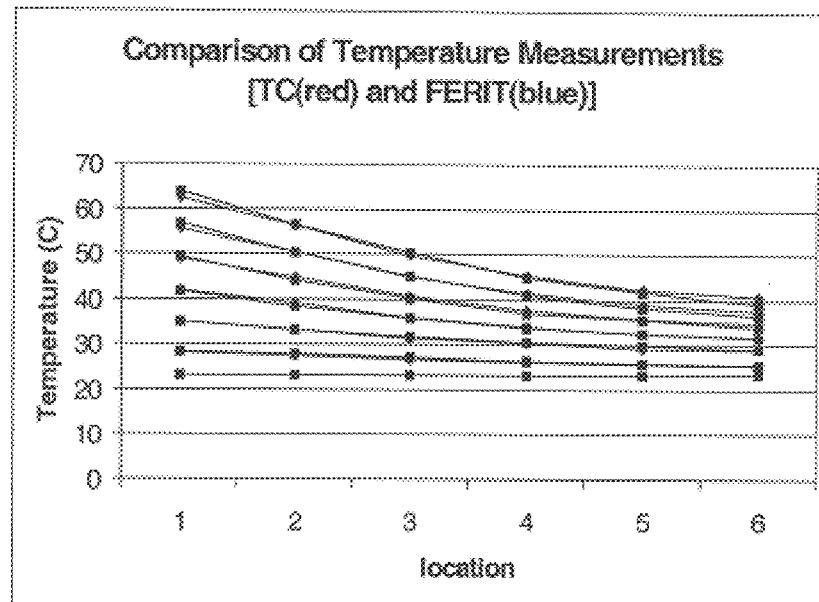
FIG. 36 shows a comparison of thermocouple (TC) and present invention measurements.

Temperatures measured by thermocouples 312 and the FERIT method of the present invention at the six thermocouple locations were compared in FIG. 36 for seven different base temperatures (from room temperature to 80° C. at 10° C. intervals).

Each line denotes the temperature distributions measured by the six thermocouples (red: thermocouple (TC) or by the FERIT method of the present invention at the corresponding locations (blue: FERIT). Location 1 corresponds to location closest (about 20 mm) to the heating source (thermofoil heater 308) at the base 306 and location 6 is the farthest point away from the base 306 (about 120 mm). The temperature differences between these two methods for different temperature ranges are summarized in Table 4. The average difference between calibrated thermocouple readings and FERIT was about 0.45° C., which was consistent with the results given by the error estimation in Example 2. The differences at higher temperatures were slightly higher, which might be attributed to the fact that the fin effect was more significant due to the larger temperature gradient between the surface and the ambient.

TABLE 4

Temperature Measurement Difference at Different Temperature Ranges

| Range (° C.) | Difference |
|---|---|
| 20~30 | 0.38 |
| 30~40 | 0.44 |
| 40~50 | 0.45 |
| 50~70 | 0.51 |

Temperature Distribution of Micro-Structure by Joule Heating.

Figure 37:
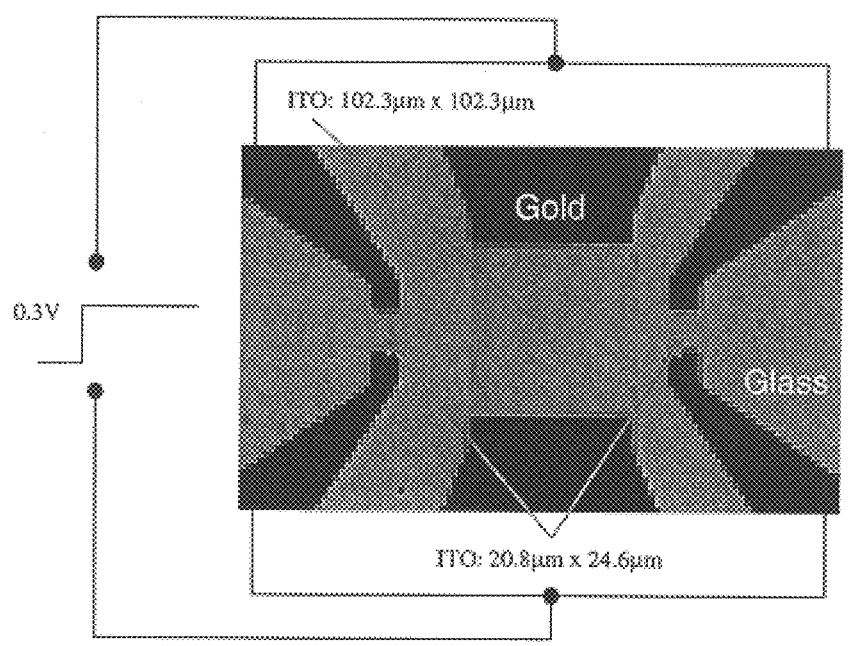
FIG. 37 illustrates the UCB microstructure.

To demonstrate the higher spatial resolution capability of the FERIT method or system of the present invention over the infrared method and the possibility to obtain quantitative temperature data at the microscopic scale, the temperature distribution induced by joule heating of a microscopic device was measured using the FERIT method or system of the present invention. The heating elements are formed by an Indium Tin Oxide (ITO) film/microstructure deposited on the surface of a microscope slide. Their dimensions are shown in FIG. 37. Electric current was carried by the thin gold strips (dark areas) to the ITO structures (light, rectangular areas). This induced localized heating. The electrical resistance for the two smaller ITO structures were 95 ohms and 102 ohms, respectively. Even though there was a voltage drop across the gold film (about 3% of total voltage) due to its length, heating in the gold film was negligible compared to that in the ITO structures. Only the two smaller ITO structures (20.8 μm×24.6 μm) on the left and right of the larger one (102.3 μm×102.3 μm) were energized. The center to center distance of these two ITO structures is approximately 180 μm. The gap distances between the left and right smaller ITO structures and the larger one in the center are 45.5 μm and 18.9 μm, respectively. The above measurements were calibrated using a 1.00 mm micrometer on a microscope slide.

Figure 38:
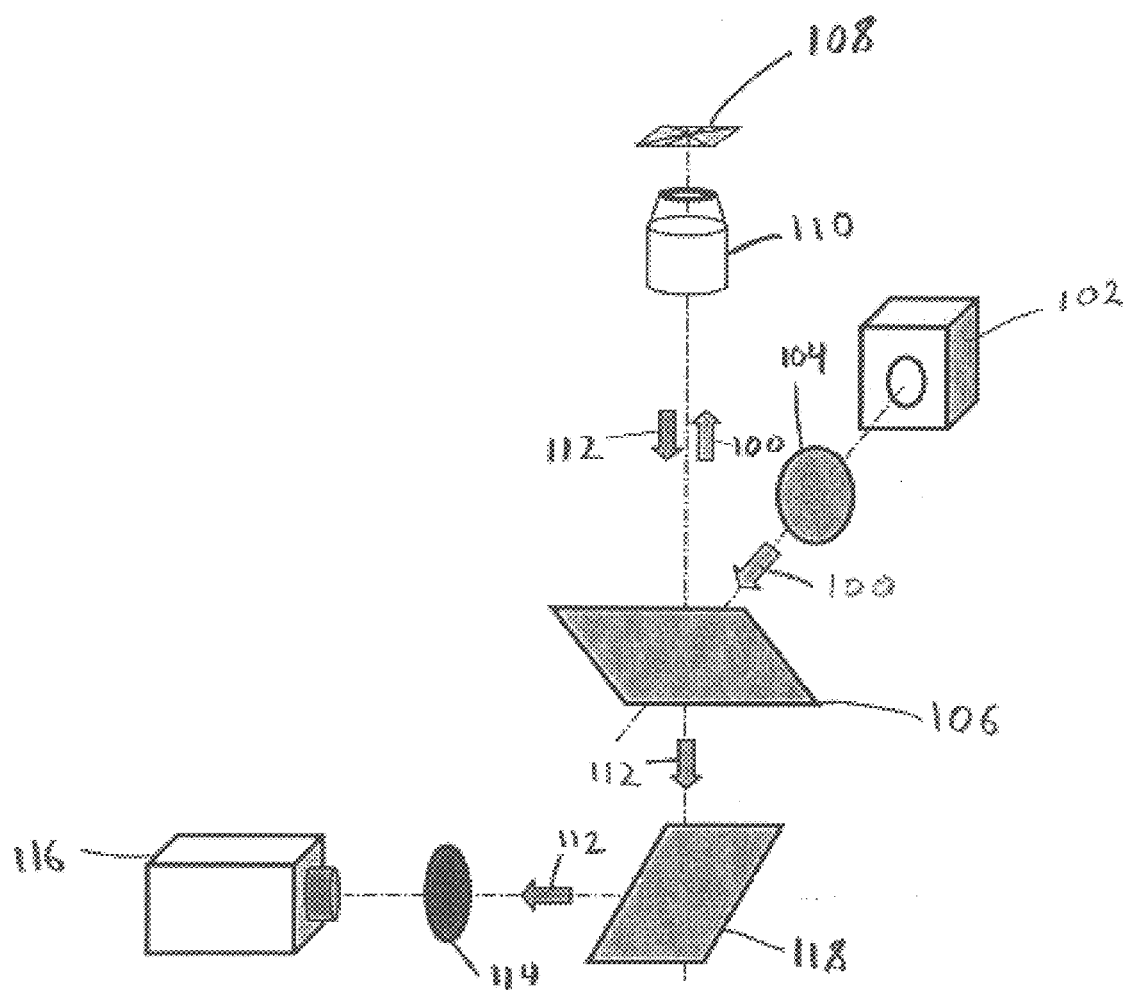
FIG. 38 is a schematic diagram of the microscopic heating study of UCB microstructure on a Nikon inverted microscope.

The test was conducted on a Nikon inverted microscope (Diaphot) as illustrated in FIG. 38. The UV excitation was realized by passing the UV output 100 from the UV source 102(OPTI-QUIP system) through the UV bandpass filter 104, UV output 100 was reflected by the dichroic mirror 106 and reached the coated surface of sample 108 (UCB sensor) after passing through the microscope objective 110. The fluorescent emission 112 was collected by the microscope objective and passed through the dichroic mirror 106, and was then directed through red filter 114 to digital camera 116 (ORBIS camera) by the reflector 118. An imaging sequence was started right before the power was connected to the ITO structures. The exposure time used was 0.8 s and the frame rate was 1.8 s. The acquired intensity images were converted to time-dependent temperature distributions with the temperature rendering functions of the FERIT software of the present invention.

Figure 39:
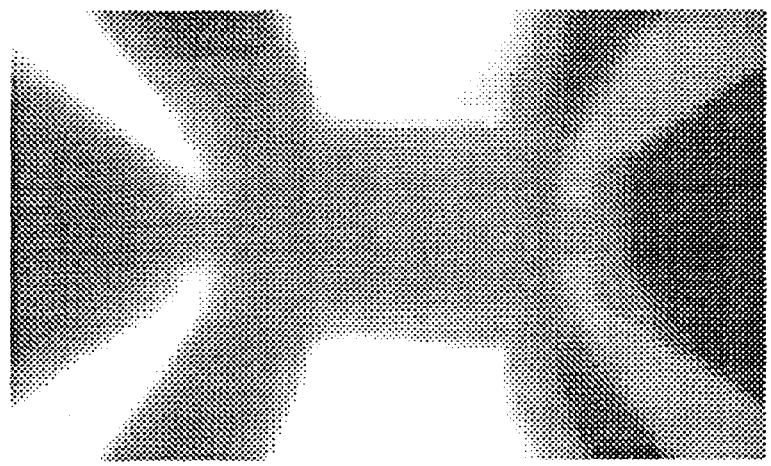
FIG. 39 is a graph of the fluorescent intensity distribution of microstructure at uniform room temperature.

FIG. 39 shows the fluorescent emission intensity distribution of the microstructure at the reference (room) temperature. The intensity difference between the left and right portion of the image was entirely due to the non-uniform illumination by the UV. Since gold has a very high reflectivity at 620 nm (about 90%), areas with the gold leads had much higher (about 1300 DU) intensity than areas of ITO and glass materials (700 DU). This indicated that the reflected signal constituted an important portion of the total signal. The ratiometric approach eliminated this optical effect, as shown in the following FERIT temperature measurement results.

Figure 40:
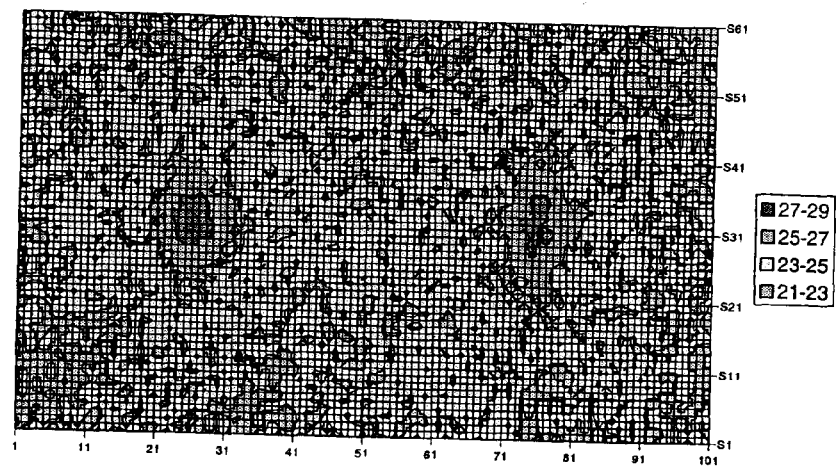
FIG. 40 is the temperature distribution of ITO microstructure measured by the method of the present invention at time=1.0 s.
Figure 41:
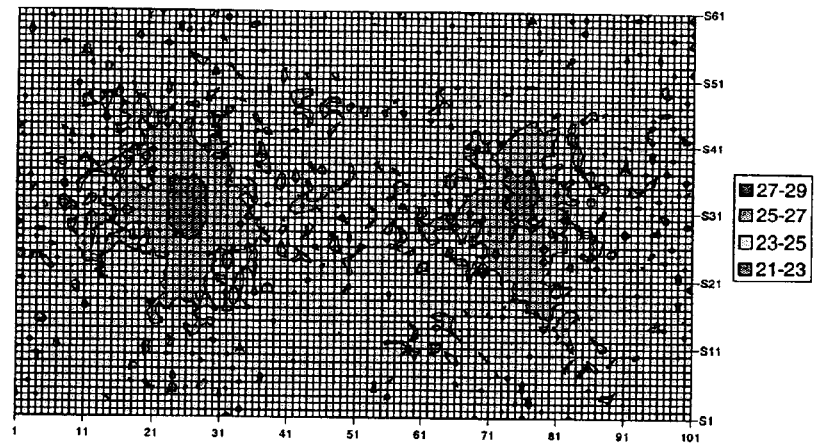
FIG. 41 is the temperature distribution of ITO microstructure measured by the method of the present invention at time=8.0 s.
Figure 42:
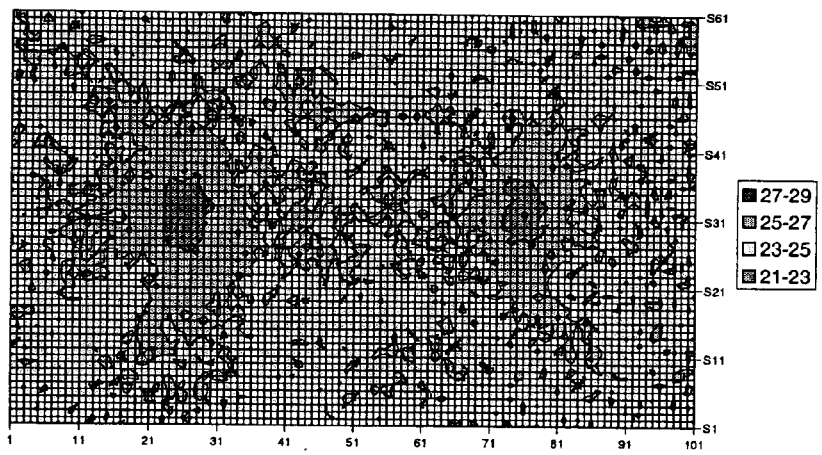
FIG. 42 is the temperature distribution of ITO microstructure measured by the method of the present invention at time=15.0 s.

The temperature distributions measured by the FERIT method of the present invention for the corresponding area (FIG. 37) at t=1.8 s, 12.6 s and 27.0 s are shown in FIG. 40, FIG. 41, and FIG. 42, respectively. The temperature elevations near the two heating elements are obvious and relatively confined to the heating regions. Thermal diffusion in the neighborhood of these two rectangular heating elements became visible after ten seconds.

To verify the experimental results obtained by the FERIT method of the present invention, a finite element simulation was conducted to derive numerical results for this test. The joule heating was modeled as constant heat flux boundary condition at the glass substrate. The result indicated that the temperature at the center of the ITO structure increased to about 6.7° C. above ambient temperature after one second and increased very slowly thereafter, which was comparable to the results of the FERIT measurements.

Figure 43:
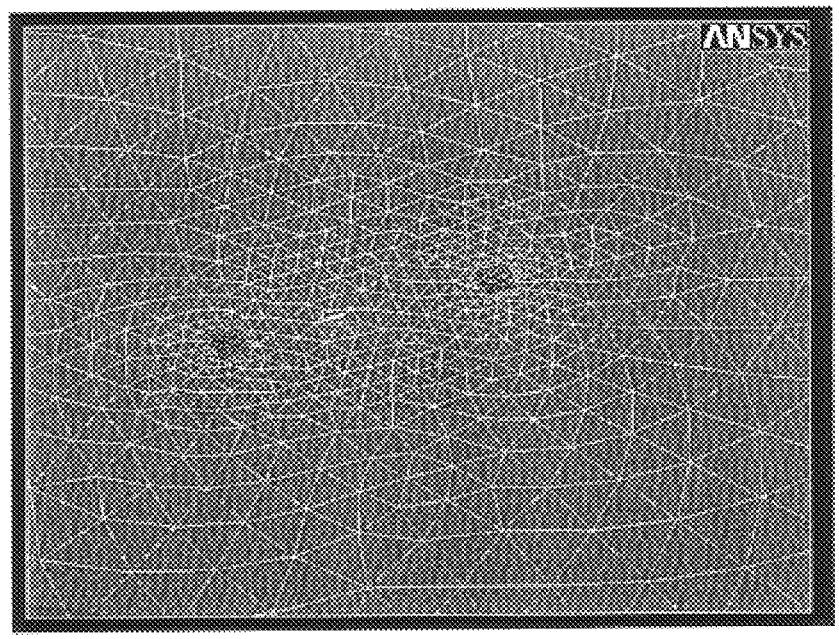
FIG. 43 shows the finite element model for ITO structures.

The finite element model was constructed for a volume of 2.00 mm×2.00 mm×1.08 mm in which the last dimension was the glass slide thickness, with the two heating elements located in the center on one of the surfaces (the 2.00 mm×2.00 mm surface) of the block. The lateral dimension was chosen to be as small as possible but large enough so that the heat flux and temperature elevation was negligible at the boundary. This allowed more finer elements to be concentrated in the heating regions. Element size increased gradually when moving away from the sources as shown in FIG. 43, with the view vector (pointing to the observer) set to (1, 1, 1). A total of 10,487 elements were used which is close to the maximum number allowed by ANSYS. A ten-node tetrahedral element type was used and the dimension of the heating elements was about four times the element size.

The ITO structure joule heating effect was represented as a surface heat flux. The heat flux was calculated by dividing the power input by the area of the two heating structures which are 704,000 W/m² and 670,000 W/m² respectively. Since they are much higher than the natural heat transfer coefficient (about 5 W/m²) and the time scale for the experiment (about 20 s) is relative small, natural convection was neglected.

Figure 44:
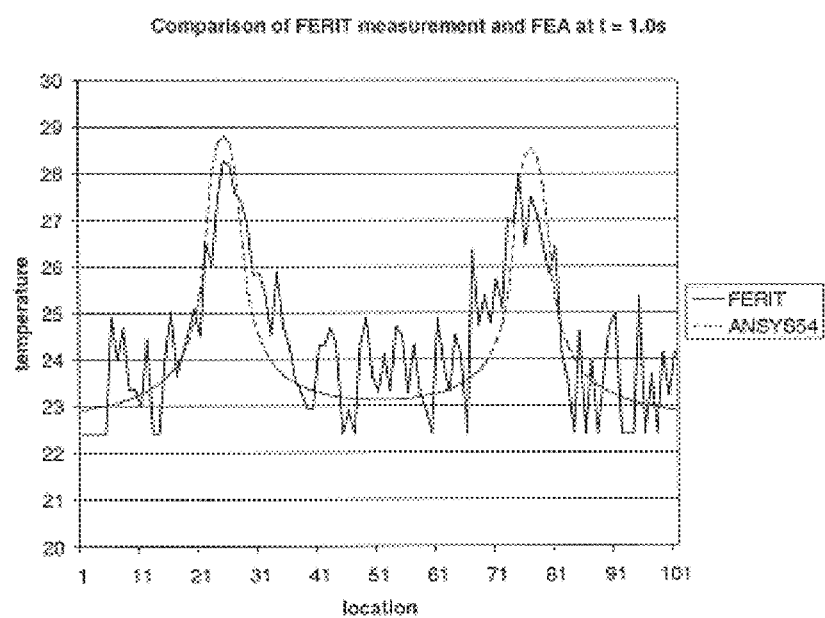
FIG. 44 shows a comparison of the temperature distribution measured at 1.0 s for the method of the present invention and ANSYS54 (FEA).
Figure 45:
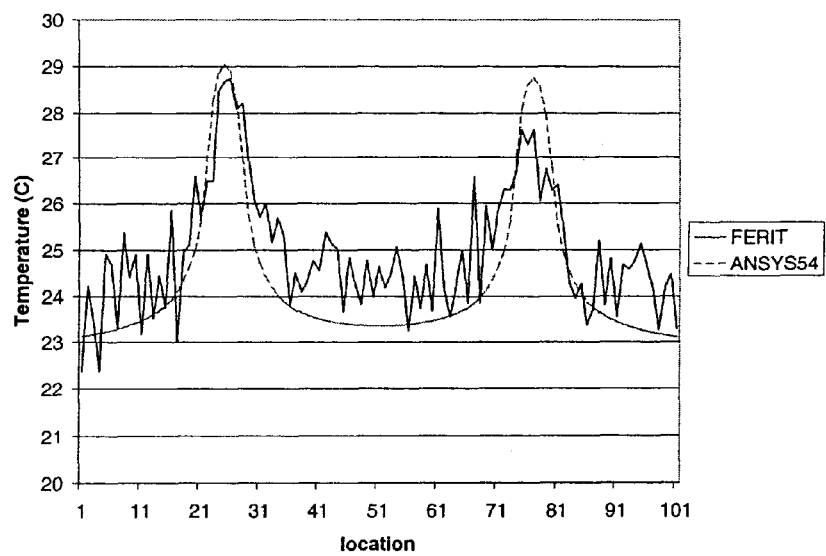
FIG. 45 shows a comparison of the temperature distribution measured at 8.0 s for the method of the present invention and ANSYS54 (FEA).
Figure 46:
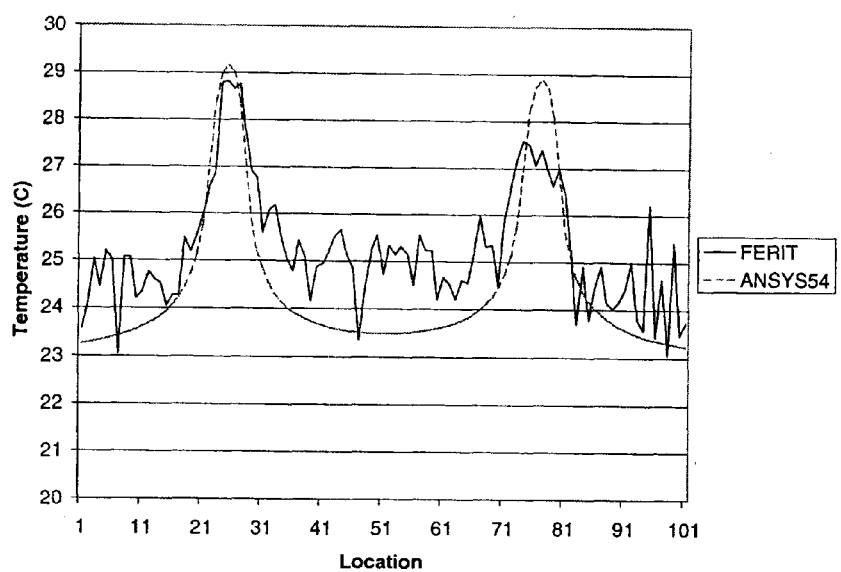
FIG. 46 shows a comparison of the temperature distribution measured at 15.0 s for the method of the present invention and ANSYS54 (FEA).

The predicted temperature profiles along the centerline of the two ITO structures at t=1 s, 8 s and 15 s are plotted in FIG. 44, FIG. 45 and FIG. 46, along with those measured by the FERIT method of the present invention. The temperature distribution reached a quasi-steady state after about one second (temperature increasing slightly after that).

Figure 47:
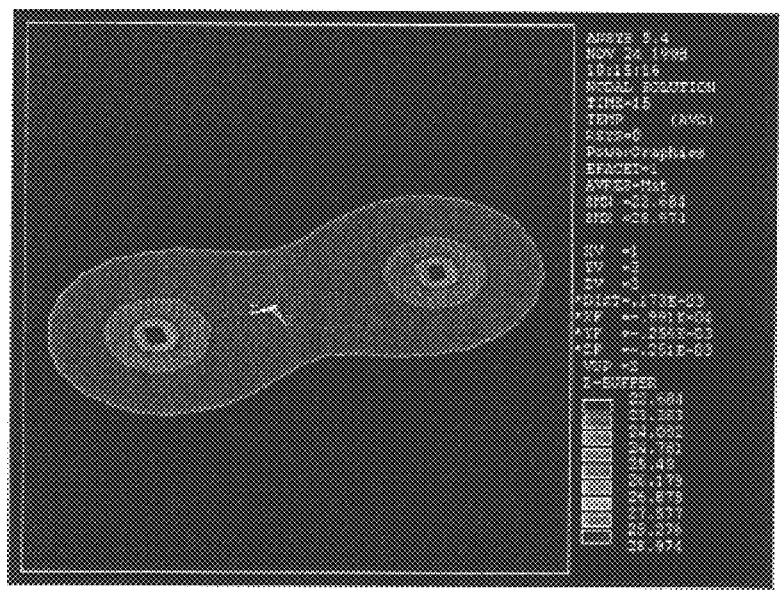
FIG. 47 shows the surface temperature distribution at time=15.0 s (simulation-ANSYS54).

The two dimensional temperature distribution at the surface predicted by the finite element analysis for t=15.0 s is illustrated in FIG. 47. An infrared camera was also applied to measure the temperature distribution of the UCB microstructure under the same testing conditions.

Since there were three components on the ITO structure which have quiet different emissivities: glass, ITO film and gold, a methodology described below was used to derive temperature distribution information after compensating for the spatial non-homogeneity of the emissivities.

The parameters of the Inframetrics 600 IR camera was set as follows: center temperature=22.0° C., room temperature= 22.0° C., temperature span=10.0° C., emissivity=1.0, frame averaging=4. The IR camera was focused to infinity by adjusting the far-near control, then the zoom lens was added and the focus was adjusted to infinity again by adjusting the focusing ring on the zoom lens. Then the close-up lens was attached. The UCB device was moved back and forth along the optical axis of the IR lens to achieve optimal focus. An image was taken at room temperature, the apparent temperature was calculated and the emissivity map was derived by the following equation:

$$\varepsilon(i,j) = \left(\frac{T_{apparent}(i,j)}{T_{ambient}(i,j)}\right)^4 \quad \text{Equ. [19]}$$

The subsequent temperature distribution after the heating started was obtained by:

$$T(i,j) = T_{apparent}(i,j)/\varepsilon^{+hu\ 1/4} \quad \text{Eqn. [20]}$$

Figure 48:
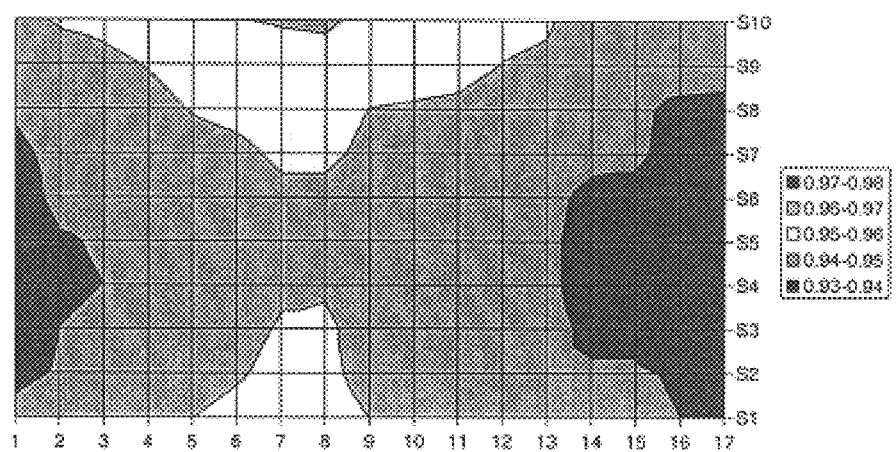
FIG. 48 shows an emissivity map of ITO structure.

The emissivity map for the area corresponding to FERIT measurements (0.361 mm×0.216 mm) are illustrated in FIG. 48. Note that the scale of this figure matches (approximately) those of FIGS. 37–42.

The emissivity is lower for the region with the gold coating (0.94) and higher for glass (0.98). Considering that pure gold has very low emissivity (=0.18 at 589 nm, =0.03 at 2000 nm) (Siegel et al., In: Thermal Radiation Heat transfer, Third Edition. Hemisphere Publishing Corp. pp. 118–130 (1992)), the high value (0.94) in the gold coating region suggested that the polymer film (PMMA) containing the fluorescent probe for FERIT contributed significantly to the apparent emissivity.

Figure 49A:
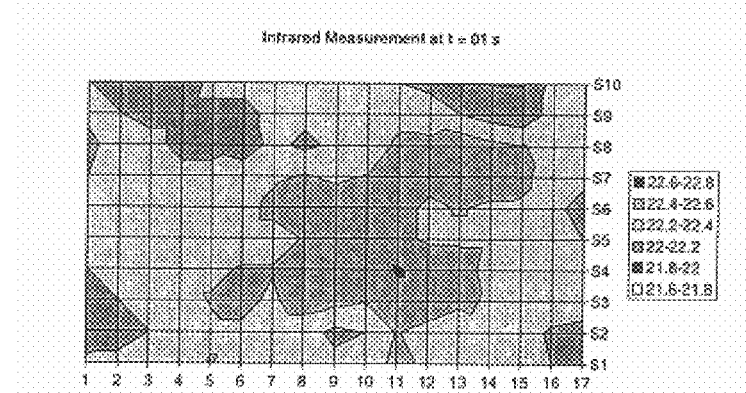
FIG. 49a shows temperature distributions measured by infrared method at 1.0 s.
Figure 49B:
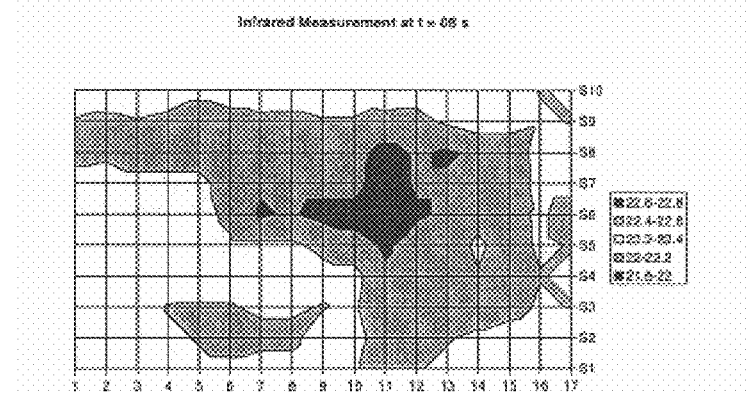
FIG. 49b shows temperature distributions measured by infrared method at 8.0 s.
Figure 49C:
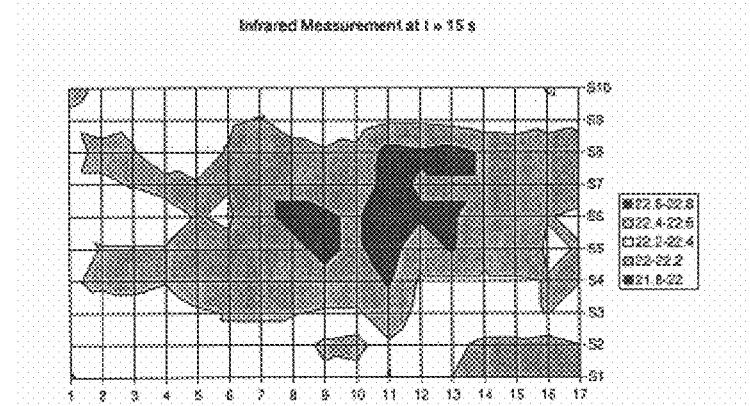
FIG. 49c shows temperature distributions measured by infrared method at 15.0 s.

The temperature measurement results using IR (again at the same scale as those in FIG. 47–52) are shown in FIGS. 49a, 49b, and 49c. It is obvious that the IR results are very noisy even with four frame averaging and that the two individual heating spots are not resolved.

The highest temperature elevation within the region measured was just 0.75° C. above ambient temperature, which was significantly lower than the predicted value (about 6.7° C.) and that measured by the FERIT method or system of the present invention. Since the size of the ITO structure is already smaller than the spatial resolution of the IR camera (about 50 m: calculated by dividing the actual dimension imaged by the number of pixels), the temperature reading is actually the average of regions with and without heating. Another factor is the slit response effect of the infrared method, which introduces temperature measurement errors while approaching its spatial resolution limit for a heated surface (Hoke. In: Experimental Measurement of the Slit Response Function and Corrected Infrared Thermographic Measurements. Master Thesis. Michigan State University, East Lansing, Mich. (1998)). Hoke showed that the slit response effect started to become significant at approximately 0.3 mm. These results show the expected behavior. Specifically, the two heating structures separated by a distance of 180 µm were not expected to be well resolved by the infrared imaging method when we knew that spatial resolution was problematic for objects separated by as much as 300 µm.

The infrared method failed to resolve the two heating elements and measured temperature incorrectly. A more elaborate emissivity mapping method and data processing model will not change this conclusion since the heating elements have the highest emissivity values.

Figure 50:
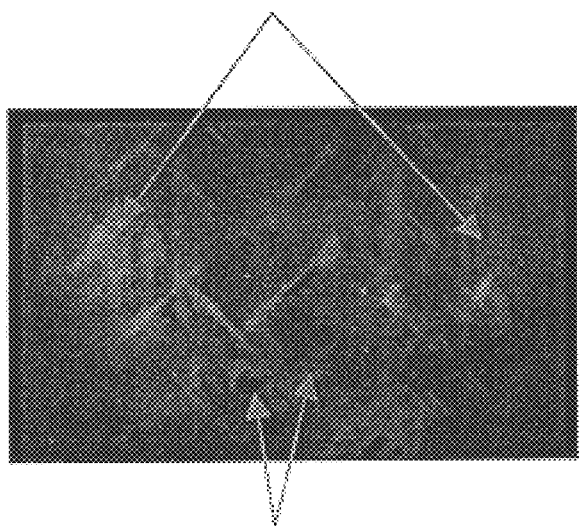
FIG. 50 shows a photograph of product defects of reaction-injection-molded composites. Photograph shows air bubbles and poor fiber/matrix wetting.

Non-Destructive Evaluation. There has been increasing usage of composite materials in both aerospace and automotive industries due to potential weight and cost saving. However, composite manufacturing usually involves processing of more than one material component and multiple procedures/processing steps. Such complexity is more likely to introduce defects into finished parts. Take polymeric composites produced by liquid molding method as an example. Air bubbles and poor wetting of fibers by the matrix impose constant challenges to the product quality. FIG. 50 shows the surface of a Reaction-Injection-Molded (RIM) Polyurethane/Glass composite with the above two types of defects, which are readily visible through the translucent matrix material (polyurethane).

In recent years, the thermographic (thermal wave) method has become a technology competing with the traditional ultrasound method for the non-destructive evaluation of defects. At the time of application, a high-energy pulse is uniformly deposited onto one of the surfaces and the temporal temperature distribution on the energized surface or the opposite surface is monitored. Due to the high temperature gradient in the thickness direction, thermal energy is dissipated through diffusion/conduction into the composites body until a uniform temperature is obtained, this energy is eventually dissipated through natural convection into the ambient air. If a defect is present within the composite, it will block the thermal diffusion path and create a temperature gradient on the surface (hot or cold spot). The magnitude of the temperature gradient depends on the pulse energy, defect size, depth, and material properties.

The FERIT method and system of the present invention was applied to conduct a non-destructive evaluation of the sample shown in FIG. 50. The sample was 2.3"×1.4"×⅛" in dimension, and one side was painted black and the other was coated with the temperature sensitive fluorescent film. The sample was energized by a 1 kW Halogen lamp for 3 seconds and the temperature distribution was measured by the FERIT method and system on the opposite side. With such a setup, the location of a defect will have a lower temperature than its surroundings and will appear as a cold spot.

Figure 51:
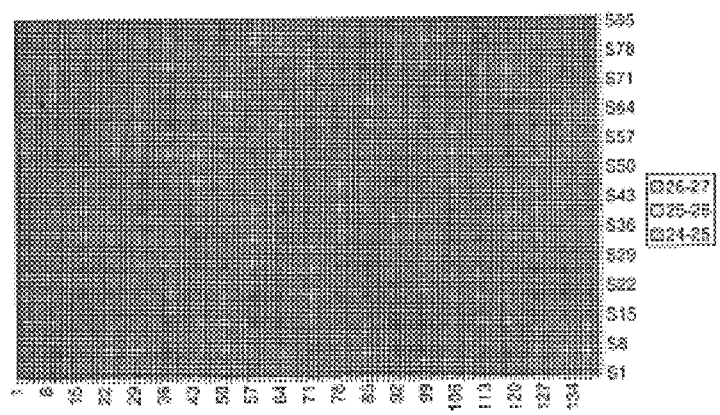
FIG. 51 shows composite surface temperature distribution at time zero.
Figure 52:
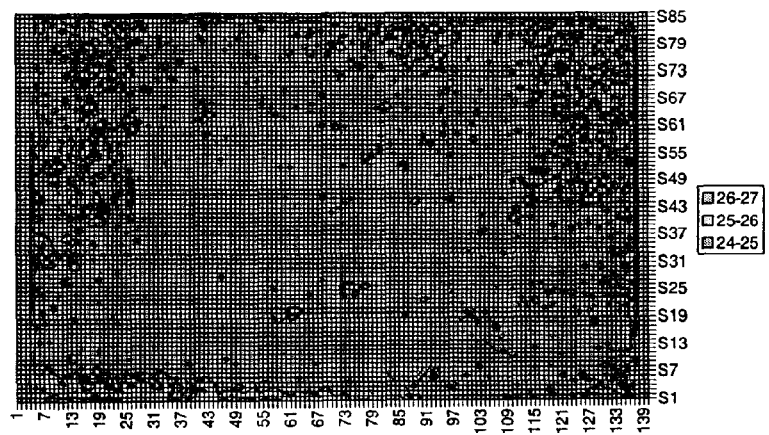
FIG. 52 shows composite surface temperature distribution at 21.0 s.
Figure 53:
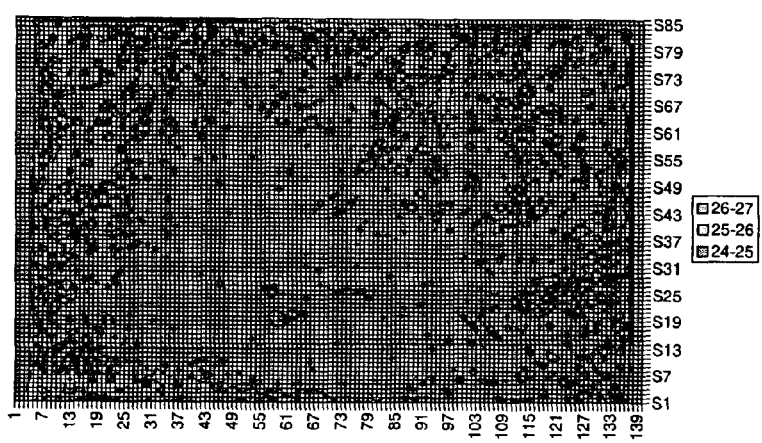
FIG. 53 shows composite surface temperature distribution at 45.5 s.

The temperature distribution of the composite surface before the pulse started (t=0.0 s) is shown in FIG. 51. Even though there was intensity non-uniformity due to surface condition (reflection) or UV non-uniformity, the FERIT's ratiometric processing eliminated these optical effects and provided uniform temperature readings (room temperature). The temperature distributions measured by FERIT at t=21.0 s and t=45.5 s are shown in FIG. 52 and FIG. 53, respectively.

The temperature gradient locations defined by the thermal wave method are consistent with visual determination of the locations of the air bubbles and poor wettings. At t=45 s, the effects of lateral diffusion and ambient cooling start to set in.

This study demonstrated that the FERIT method of the present invention can be used for non-destructive evaluation of composites.

Tests were also conducted for plastic material (Acrylic) with simulated defects (cylindrical holes) to test the idea of conducting thermal wave experiment in reflective mode (energizing and detection on the same surface) since this is a prefer method for thermal wave method. A layer of black paint (for absorbing pulse energy) was applied to the sample surface first and followed by the deposition of a layer of fluorescent paint on top of black paint. The signal strength was very weak due to the strong absorption of the black paint to the fluorescent signal, the solvent for fabricating the fluorescent film was also observed to dissolve the dried black paint. With similar energizing power level, temperature distribution measured by FERIT on the surface was found to be very noisy and fluctuating from point to point dramatically (>1° C.), which overwhelmed the temperature gradient created by the defects (0.5° C., estimated by numerical simulation). Low signal level and possible interaction between solvent/probe/black-paint may be the possible causes.

EXAMPLE 4

A general schematic of the FERIT method and system used for Examples 4–10 is shown in FIG. 1.

In general, for Examples 4–10, a test object was coated with a film containing either the $Eu(hfa)_3$ high temperature probe or the $Tr(hfa)_3$ low temperature probe depending on the temperature range the object will experience. A stable UV light source (OPTIQUIP) excited the film while the ORBIS digital camera images the test object. The camera measured the gray scale intensity in 16-bit format. As the temperature of the test object changed, the digital camera measured the intensity changes. These intensity changes were calibrated to quantify the change in temperature of the test object.

Figure 54:
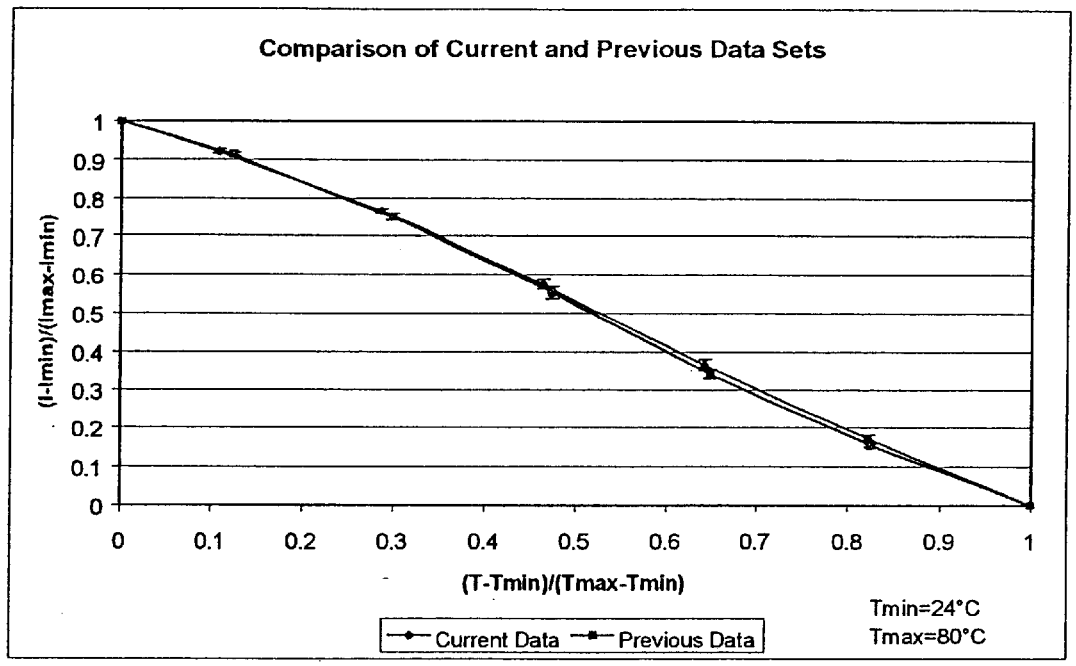
FIG. 54 is a graph that compares the current and previous data sets.

The initial tests were performed using a fluorescent chemical/probe to measure temperatures in the +24° C. to +80° C. range. An aluminum sheet (2 cm ×2 cm) was coated with the temperature sensitive fluorescent film and heated with a thermofoil heater the same size as the aluminum sample. The digital camera averaged three image frames at each data point to reduce error. Gray scale intensity was then averaged over a 4×4 pixel area (1 mm×1 mm) near a thermocouple mounted on the sample. The results obtained were compared to past results to ensure repeatability and accuracy. The data are presented in FIG. 54 in non-dimensional form.

These results indicate that the fluorescent film system was operating in the same manner as shown in Examples 1–3. These results also indicate that the fluorescent probe was stable over long periods of time, since the same sample of probe was used for the current and previous results. The time elapsed between the two data sets was approximately 1 year.

Once the previous results were reproduced, work was begun using the $Tr(hfa)_3$ probe, which as shown herein is suitable for low temperature measurements. Published literature suggested that $Tr(hfa)_3$ could be used to measure temperatures in the range of +24° C. to −170° C.

EXAMPLE 5

This example demonstrates that using the low temperature $Tr(hfa)_3$ probe, the FERIT method or system of the present invention can be used for measuring low temperatures on a flat test object without requiring housing, condensation, or ice formation thereby extending the usefulness of the present invention to measure temperatures in the range of +24° C. to −170° C.

The Tr(hfa)$_3$ probe in PMMA was applied to a flat aluminum plate approximately 1 cm×1 cm. A foil thermocouple of thickness 0.005 in was mounted near the center of the plate. The plate was cooled using a Linkam cryostage, model TMS 600 and cryopump. The stage consisted of an isothermal silver cooling block and an evacuated chamber to prevent condensation formation on the test sample. The test sample was mounted on the cooling block with Omegatherm 201 thermopaste and imaged with the ORBIS Camera (16 bit resolution) through a microscope. A Nikon UV source was used to excite the sample. The same UV source used in Example 4 was not used since the UV source had to mount to the microscope for this test. This was significant since the Nikon source is not nearly as stable as the OPTIQUIP UV source. The sample was cooled to defined temperatures and imaged with the ORBIS digital camera.

Figure 55:
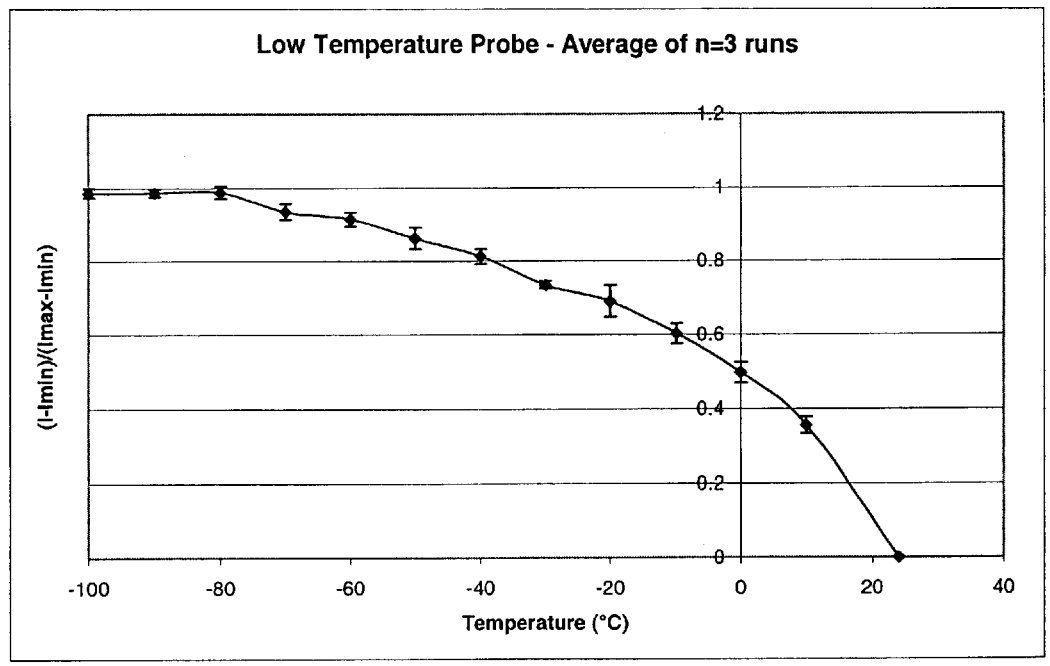
FIG. 55 is a graph that shows the measurable changes in the fluorescent intensity of the Tr(hfa)$_3$ probe to a minimum temperature of −80° C.

The results in FIG. 55 show that there were measurable changes in fluorescent intensity to a minimum temperature of −80° C. The standard deviations seen in the figure are expected to diminish with the use of the more stable UV source (OPTIQUIP) used in Example 4. There was also some variation introduced with camera shutter speed. A fast shutter speed (50 ms to 100 ms) was used when the camera was mounted on the microscope compared to 1000 ms used for the initial testing. Subsequent tests examining the faster shutter speed resulted in inconsistent intensity measurements for constant temperature situations.

Based on the measured standard deviations, the temperature accuracy is expected to be 3° C. At 16 bits of resolution, 0.002° C. is expected at +20° C. diminishing to 0.004° C. at 80° C.

In summary, these preliminary results establish that with this particular chemical, low temperature measurements will be possible down to below −80° C. Current levels of accuracy and resolution are about 3° C. and 0.002° C., respectively. The accuracy is expected to improve when the stable UV source and shutter speeds of 1000 ms are used. The resolution will remain unchanged.

EXAMPLE 6

An assessment of the influence of surface curvature on a test object without housing, condensation or ice formation. This test was performed to determine whether or not the curvature of the pintle such as that at the edges and boundaries had an effect on the intensity measurements and introduce artifacts into temperature measurements.

This series of tests was performed using a film comprising the Eu(hfa)$_3$ probe. The Tr(hfa)$_3$ probe is expected to behave in the same manner as the Eu(hfa)$_3$ probe. To test the concept, the Eu(hfa)$_3$ film was applied to a 3.96 mm diameter aluminum tube, comparable to the smallest diameter of the pintle. A cartridge heater, supplied by HotWatt, was inserted into the hollow tube and a 0.005" diameter thermocouple was mounted to each end. The thermocouples were calibrated with an Omega RTD thermometer with an average temperature difference of 0.07° C.

The thermocouples showed the cartridge heater to be isothermal to within 0.3° C. from end to end. The temperature over the surface of the aluminum tube was then measured. Sample test images are shown in FIGS. 56a and 56b.

Figure 56A:
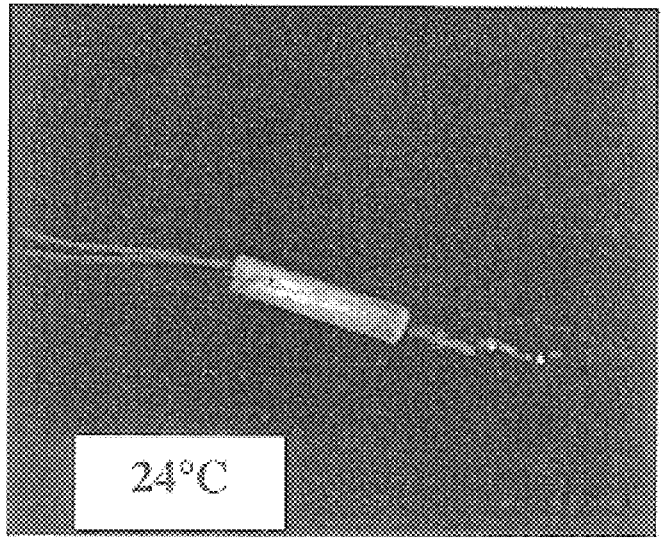
FIG. 56a shows the fluorescence of a heated element coated with Eu(hfa)$_3$ at 24° C.
Figure 56B:
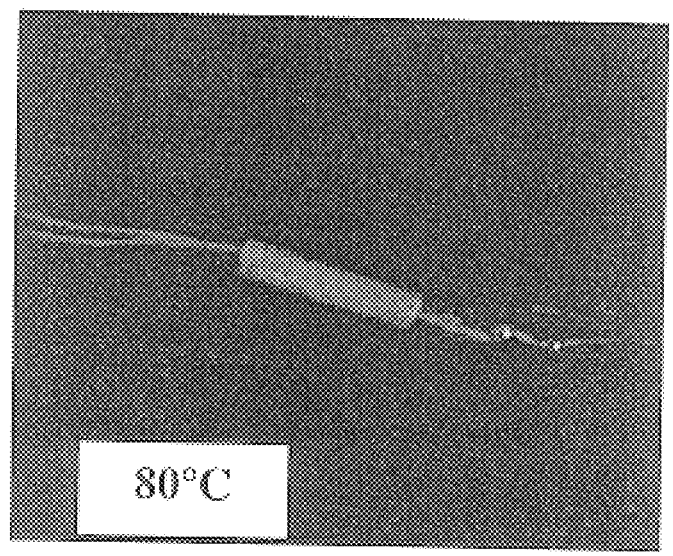
FIG. 56b shows the fluorescence of the heated element coated with Eu(hfa)$_3$ at 80° C.

The images in FIGS. 56a and 56b show the difference in fluorescent intensity between +24° C. and +80° C. The UV illumination was kept the same throughout the experiment. Fluorescent intensity changes can be seen with the eye at 5° C. increments in temperature. FIGS. 56a and 56b also shows that the fluorescent film was not uniform over the surface area of the aluminum tube. This did not affect the results of the temperature measurement, since the image was analyzed on the individual pixel level and the magnitude of intensity change is not dependent on fluorescent film concentration. This is described next.

After a set of images was taken, an intensity analysis was performed on the images with an image analysis software package. A line was drawn across the diameter of the aluminum tube and the intensity at each pixel was measured along this line. The line was drawn at the same location in each image. There were about 4 pixels/mm. The intensity was then normalized to that pixel's data set.

Figure 57:
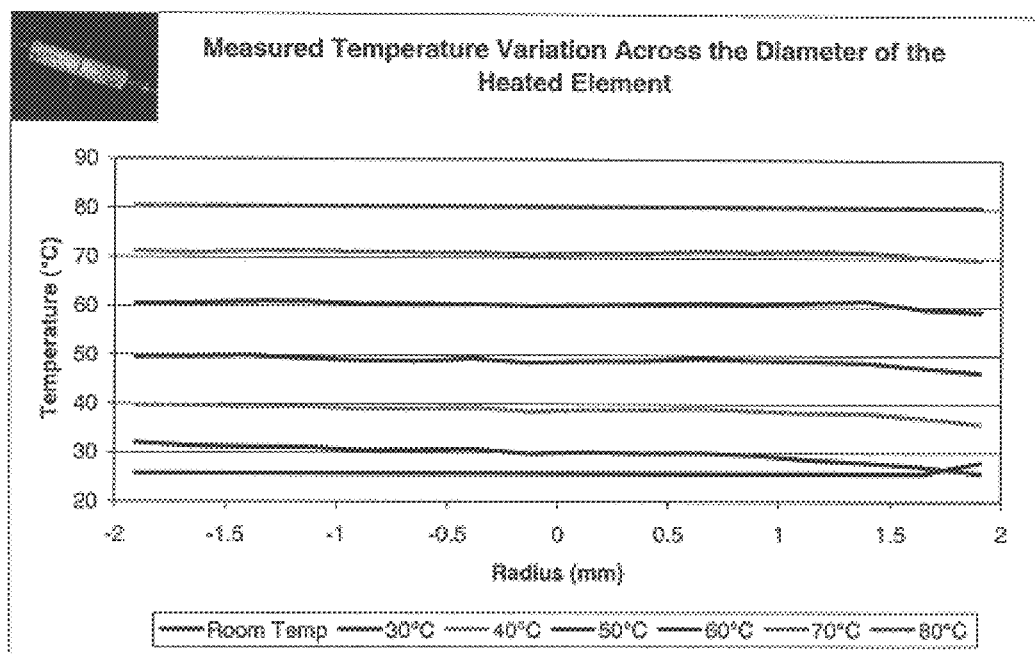
FIG. 57 is a graph measuring the temperature variation across the diameter of the heated element coated with Eu(hfa)$_3$.

For this example, there were approximately 16 pixels across the diameter of the probe and, therefore, 16 normalized sets of data where each set of data represented a particular location on the test object. This was performed for each temperature measurement. The normalized data sets were compared to the calibration curve from FIG. 54 and a temperature was assigned to each pixel. FIG. 57 illustrates the results of the temperature line profile across the diameter of the heated element. The upper left corner shows the approximate location of the line profile.

As shown in FIG. 57, the temperature profiles exhibited non-uniformity near the 1.5 mm measurement location. A cause of this effect may be a slight shadow since the end that was experiencing the variations was on the horizon with respect to the UV source. The radial side (−2 mm) was in better optical contact with the UV source and did not exhibit the same non-uniformity as the right side. Changing the angle at which the UV source illuminates the test object is expected to reduce these effects. Since edge effects will be present regardless, looking at the middle region will reduce this variation. The average standard deviation for the middle 75% section of the heated element was measured to be ±0.33° C. The intensity line profile was also measured along the centerline of the heated element. The results are shown in FIG. 58.

Figure 58:
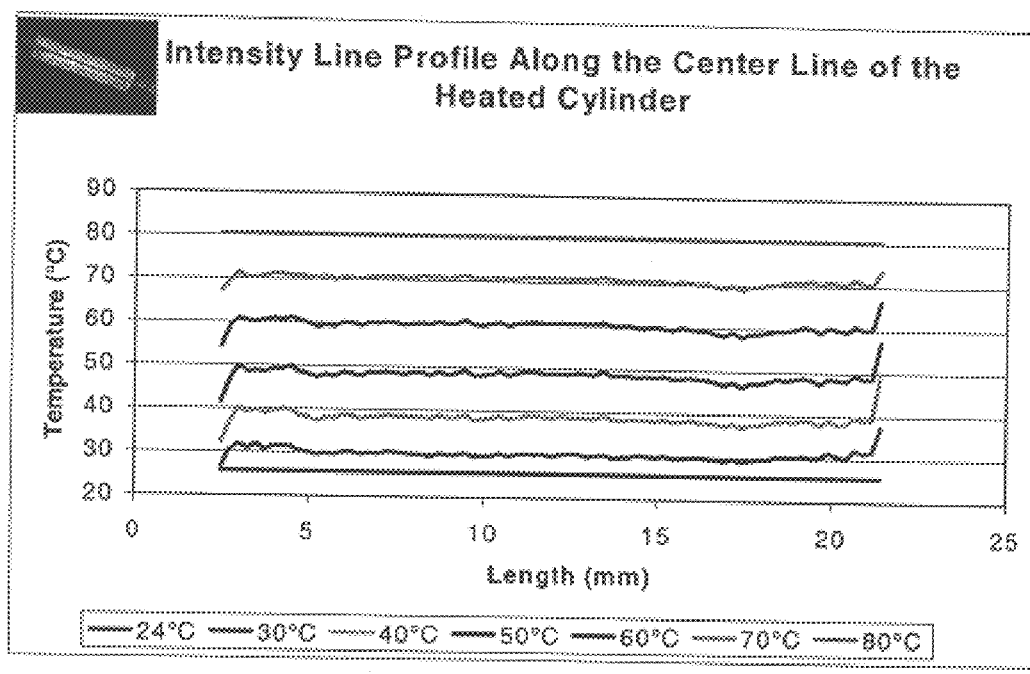
FIG. 58 is a graph measuring the intensity lime profile along the center line of the heated cylinder coated with Eu(hfa)$_3$.

FIG. 58 shows that there were also variations near the end regions of the plot. This was where the heated specimen ended and was not a result of illumination or surface curvature. The average standard deviation along the middle 75% section of the centerline was ±0.34° C.

In summary, these results indicate that non-idealities such as non-uniformities of UV excitation illumination, fluorescent film thickness, etc. can be dealt with adequately with our approach so as to measure temperature fields on curved objects that are accurate to within ±0.33° C. This matches the 0.3° C. degree of uniformity of surface temperature measured end to end by thermocouples. This accuracy can be improved by increasing the number of frames averaged for each data point. The accuracy is expected to improve by $1/N^{1/2}$ where N is the number of frames averaged. All images were averaged 3 times. Increasing this sample size will in turn increase the time it takes to record a measurement. We expect the same type of result with the low temperature fluorescent film.

EXAMPLE 7

Temperature measurements on a cylindrical test object within a transparent housing but with no condensation or ice formation. In this example, a test was performed to assess the influence of a glass housing on the intensity of a test object. This was done to make sure the UV loss caused by the glass did not reduce the intensity magnitude of the fluorescent film to a non-measurable level. The tests indicated a decrease in intensity magnitude less than 4%. This drop in intensity was not expected to affect experimental results.

Figure 59A:
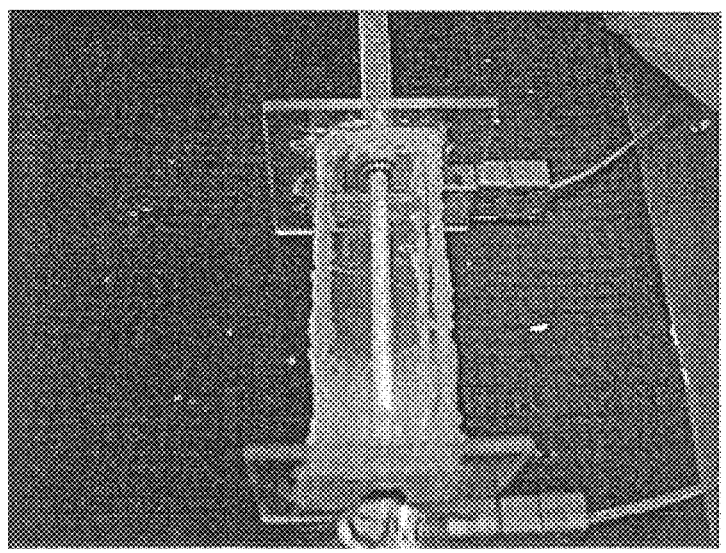
FIG. 59a shows a chamber made out of glass housing a 3.96 mm diameter aluminum tube coated with Tr(hfa)$_3$.
Figure 59B:
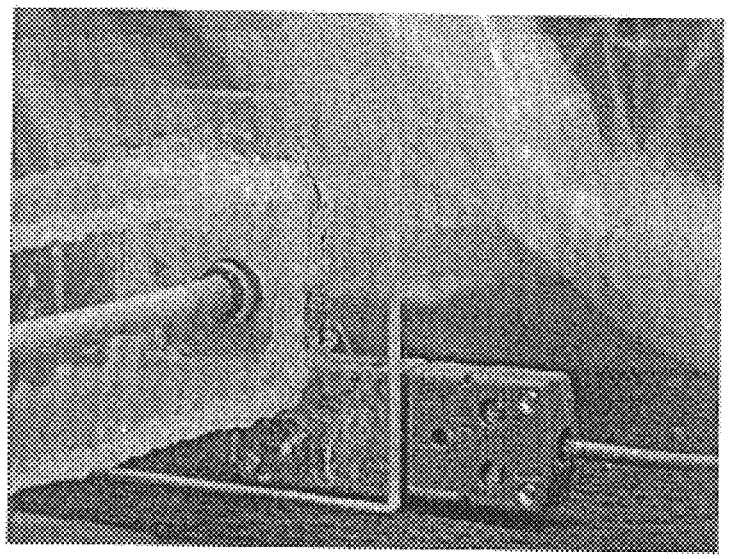

FIGS. 59*a* and 59*b* shows a chamber made out glass, housing a 3.96 mm diameter aluminum tube, approximately 8 cm, long with the Tr(hfa)$_3$ low temperature film applied to it. The chamber can be pressurized with nitrogen gas to prevent the formation of condensation. There was a 0.005" calibrated thermocouple attached to each end of the tube. The tube was connected to a constant temperature bath to control the temperature and is imaged from above by the digital camera.

The equipment shown in FIGS. 59*a* and 59*b* did not have the capability to reach the minimum temperatures of −80° C. This test was later validated in Example 10 on an actual PCV pintle to −80° C.

EXAMPLE 8

Temperature measurement on a flat test object without a housing but with condensation or ice formation. This test was performed to see if changes in fluorescent intensity could indicate the onset of condensation.

Figure 60A:
FIG. 60a shows a photograph of a flat aluminum plated coated with Tr(hfa)$_3$ at −7.7° C.
Figure 60B:
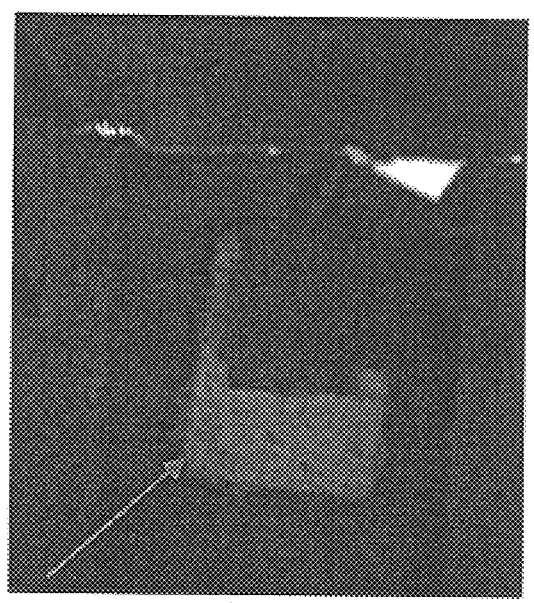
FIG. 60b shows the flat aluminum plate in FIG. 60a at −40° C.

A flat aluminum plate (1 cm×1 cm) was coated with the Tr(hfa)$_3$ low temperature probe and mounted to a brass cooling block. Dry nitrogen gas cooled by liquid nitrogen was passed through the cooling block. Images were taken at isothermal set points from room temperature to −40° C. FIGS. 60*a* and 60*b* shows images taken at 7.7° C. and −40° C. The condensation is clearly visible as dark spots in the latter image. The inset arrows indicate regions of condensation formation. Intensity was measured along a line as in FIG. 57. FIG. 10 illustrates the intensity variations caused by the formation of condensation.

Figure 61:
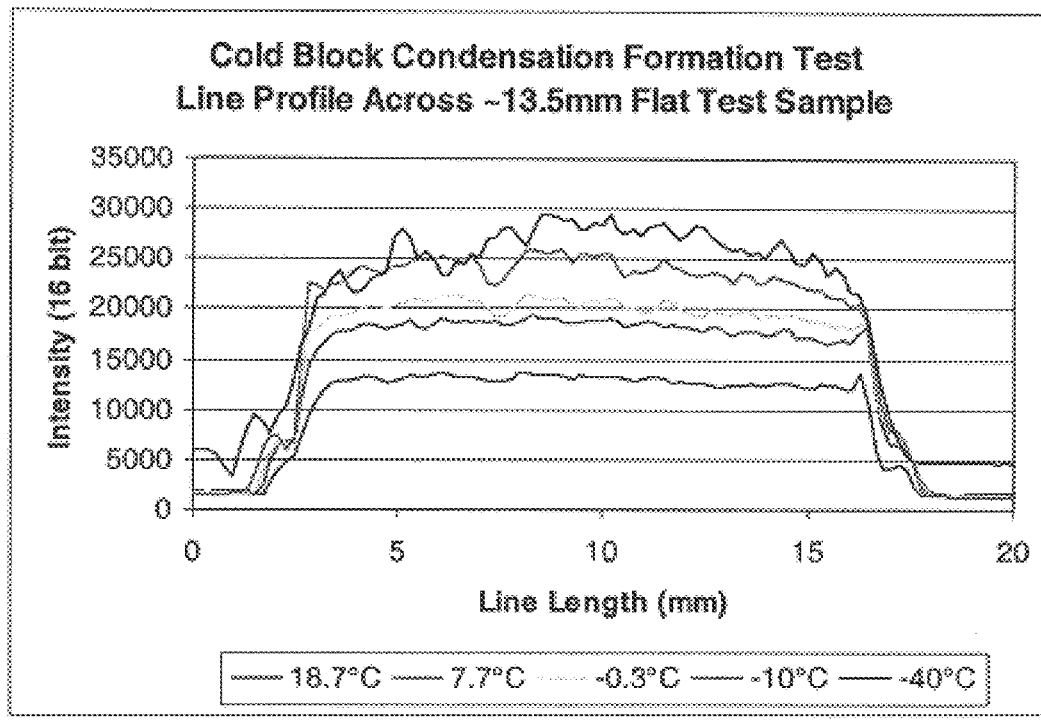
FIG. 61 is a graph of the cold block condensation formation test line profile across the flat aluminum plate in FIGS. 60a and 60b.

The image in FIG. 60*b* shows significant regions of condensation formation. This was expected, but the main goal of this example was to determine if the fluorescent film technique could determine the onset of condensation formation. FIG. 61 indicates that significant "noise" appeared in the fluorescence intensity once condensation appeared. Further work must be done to quantify and interpret these results. However, it appears that some form of noise to signal ratio may be a suitable quantitative measure of the onset and development of condensation.

EXAMPLE 9

Temperature measurement on cylindrical test object within a transparent housing with condensation or ice formation. Tests are performed on the chamber shown in FIGS. 59*a* and 59*b* except that the chamber is not purged with nitrogen. In this way, it is possible to detect accurate temperature fields down to some temperature at which condensation appears. At this point, based on the results in Example 10, the results shown in FIG. 61 are expected.

EXAMPLE 10

Figure 62:
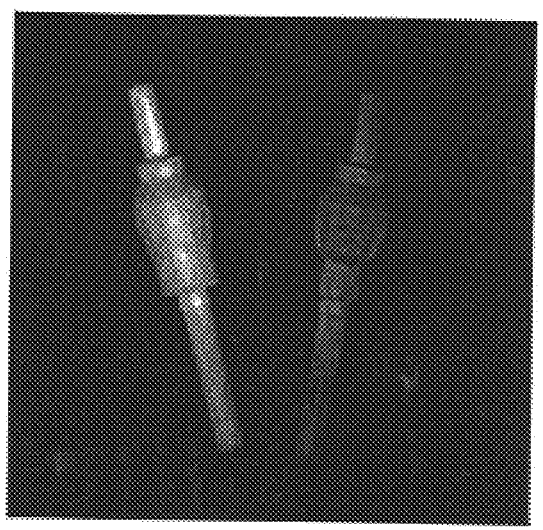
FIG. 62 shows a pintle coated with Eu(hfa)$_3$ (left) and a pintle coated with Tr(hfa)$_3$ (right).

Temperature measurement on an actual PCV valve. In FIG. 62, the pintle on the left was coated with the high temperature Eu(hfa)$_3$ probe and the one on the right was coated with the low temperature Tr(hfa)$_3$ probe. This photo was taken at room temperature so it was expected that the intensity of the high temp probe was greater than that of the low temp probe. These results indicate that the high and low temperature probes can be applied successfully to the pintles, yielding fluorescent intensities that allow temperature fields to be measured on the pintle surfaces. The film can be applied such that the spatial uniformity of the fluorescent intensity was comparable to that produced on flat samples.

Figure 63A:
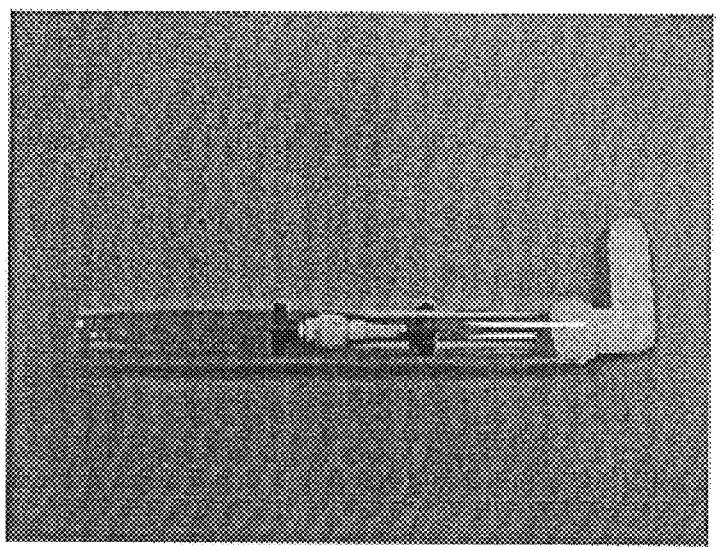
FIG. 63a shows the coated pintle enclosed in a glass tube.
Figure 63B:
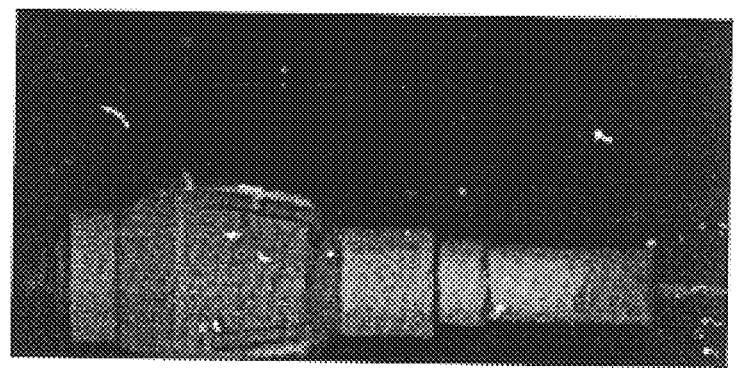
FIG. 63b shows the coated pintle illuminated with UV light.

FIG. 63*a* is an image of the pintle inside a glass tube. The tube has an inside diameter of 14 mm and a length of 13 cm. The pintle is held in place by the components of the PCV valve. FIG. 63*b* shows the pintle illuminated by UV light and imaged inside the glass tube. This image shows that the glass housing did not affect the intensity of the test sample. Dry nitrogen gas, cooled by liquid nitrogen will flow through the tube to cool the pintle.

Figure 64:
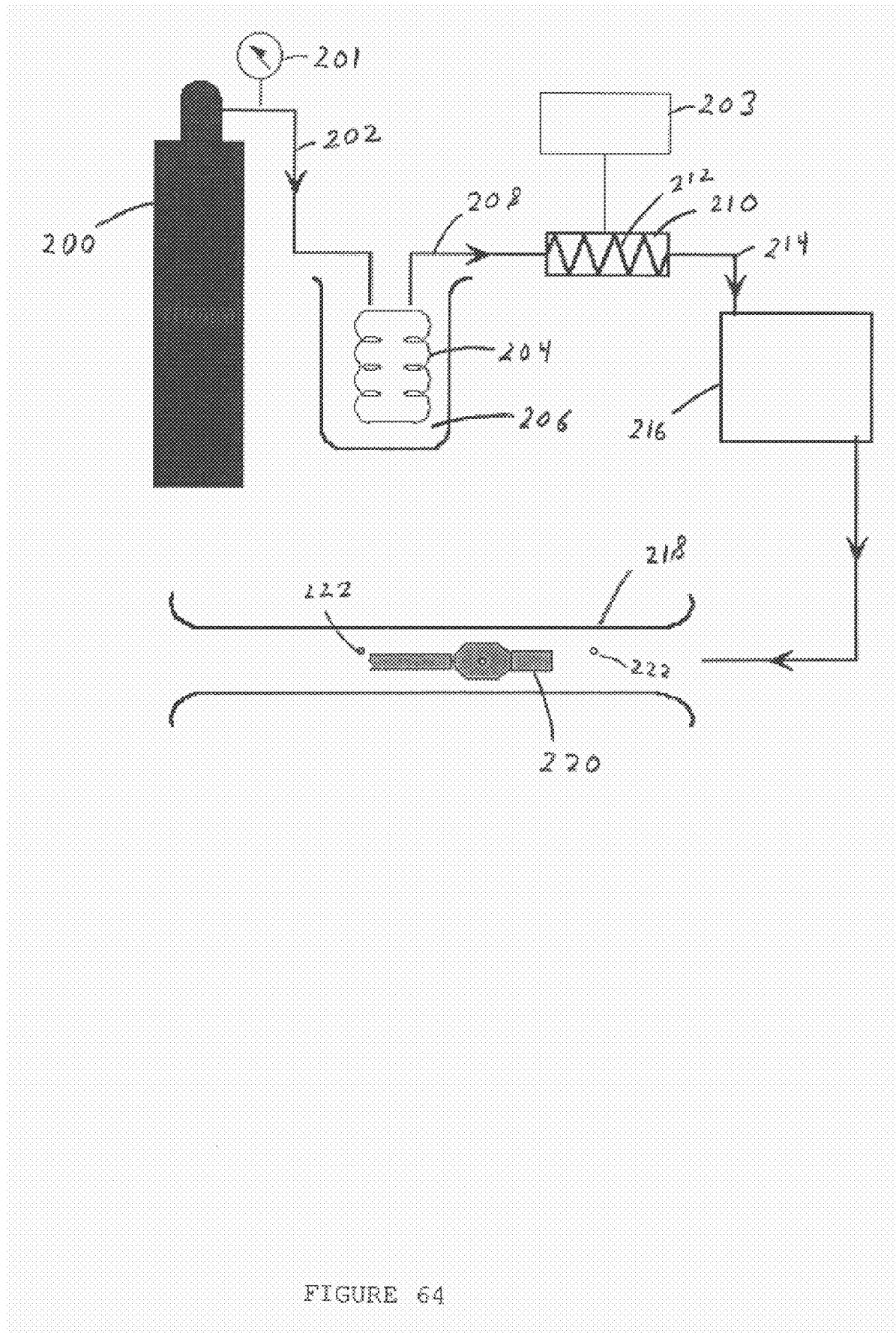
FIG. 64 shows a schematic diagram of the set up that was used to control the temperature around the pintle enclosed in the glass tube.
Figure 65:
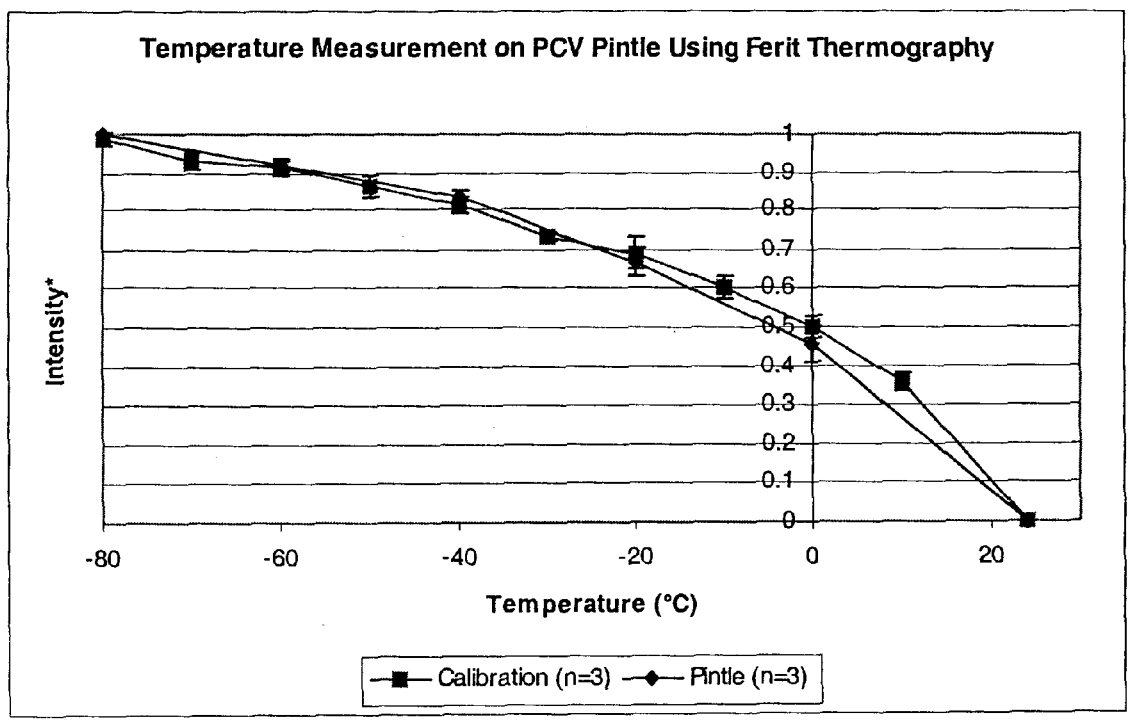
FIG. 65 is a graph of the temperature measurement on the pintle using the method and system of the present invention.

FIG. 64 is a schematic layout of the system used to control the temperature of the environment surrounding the pintle 220. The temperature control system has the capability to vary temperature by controlling the flow of the dry nitrogen gas or by controlling the voltage of an in-line cartridge heater 212. Adjusting the flow of Nitrogen gas by valve 201 or adjusting the voltage of the cartridge heater 212 by voltage controller 203 controls temperature over a range of +50° C. to −100° C. Nitrogen gas from source 200 flows through line 202 into copper coil 204 submerged in a bath of liquid nitrogen 206. The cooled gas then flows through line 208 to tube 210 containing a cartridge heater 212 and then through line 214 into mixing box 216 to create a more spatially uniform temperature flow through the glass tube 218 housing the pintle 220. The temperature in the glass tube 218 was monitored by three calibrated thermocouples 222 mounted as indicated in FIG. 64. The thermocouples 222 were calibrated and were within 0.07° C. of each other. The middle thermocouple was embedded inside the pintle 220 within a small hole drilled down the axis of the pintle 220 (not shown). This thermocouple was used for the reference data in FIG. 65. The others were mounted at the ends of the pintle to measure the inlet and exit temperature variations. The pintle 220 was imaged using a COOKE SensiCam high performance digital camera (not shown). This digital camera has improved frame rate and image averaging capabilities compared to the ORBIS digital camera. The same method used for the tests above was applied to obtain a temperature fluorescent intensity calibration relationship as presented in FIG. 65. Images were taken from 24° C. to −80° C. in twenty-degree increments. The intensity of the pintle was measured on the surface of the pintle 220 near the location of the interior thermocouple. The setup seen in FIG. 64 has been used successfully to measure temperatures on a PCV pintle. FIG. 65 compares the test measurements from the pintle 220 to the calibration results in FIG. 55.

In summary, these results indicate that the FERIT method and system of the present invention can be used to measure temperature changes on a PCV pintle from 24° C. to −80° C. The pintle curve differs from the calibration curve by an average of 2%. This difference was in part due to the temperature control device. The calibration curve was obtained using a very stable temperature control device that could not be used for the pintle temperature measurements. The temperature control system used for the pintle, shown in FIG. 64, did not produce a uniform temperature flow inside the glass tube. Measured temperature variation across the diameter was about 6° C. A stable environmental chamber is used in phase II of this study and allows for more controlled and reproducible results. Even with this significant temperature variation, reproducible results with an average standard deviation of ±2% were possible.

Another possible cause for the difference between the calibration curve and the pintle curve was that they were obtained with different methods and instruments. The calibration curve was obtained with a flat aluminum test sample viewed at 20× magnification under a microscope with the ORBIS camera, whereas the pintle curve was imaged at a distance of 25 cm with a zoom camera lens with the Cooke camera. These results indicate good agreement even though the intensity measurement techniques were different. This is an indication that the film containing the probes of the present invention behave the same even when applied to different materials using different equipment.

EXAMPLE 11

As a part of the FERIT method and system of the present invention, a Microsoft WINDOWS-based application software program was developed to accomplish camera control, imaging, data acquisition and digital input/output (I/O), measurement, temperature rendering, and visualization. The structure of the software is shown in FIG. 5. The software has the following advantages over the software (Hpcwin32.exe) that is provided with the ORBIS CCD camera. It is compatible with Hpcwin32.exe in terms of camera control functions and enhanced in some functions such as multi-frame acquisition; it uses the common image file format (TIFF), which enables the use of other image processing software for data processing; it incorporates other electronic hardware for system integration to accomplish analog and digital signal monitoring and control; and, it enhances image processing capabilities such as temperature rendering.

The supported operations of the software are grouped according to their functionality.

(1) File Handling. Similar to most Windows applications, the software support common file functions such as "New", "Open", "Save", "Save As", "Close", "Print", "Print Previews", "Print Setup", and "Exit". The software implements TIFF as its internal file format, which makes it possible to use other image processing software such as Image-Pro Plus to manipulate images created by FERIT. The resolution can be set to 12 or 16 bit.

(2) Camera Control. The cooled digital camera is initialized before it is used to take images. This is accomplished by selecting the "Initialize" command under the "Camera" menu or by pressing the quick access button on the tool bar.

After initialization, the camera is configured for the operating parameters: Cooler On/Off, Resolution 12/16 bit, Exposure Time (in ms), Frame Averaging, Image Format/Size, Offsets, Binning, Multi-frame Acquisition. To activate the Configuration panel, "Config" is selected under the "Camera" menu or by pressing the corresponding quick access button. The configuration panel is shown in FIG. 6.

The software performs an automatic range check for the parameters such as image size, and a warning is given if the parameters are out of bounds or a negative value has been entered.

(3) Imaging. Imaging is performed in single frame mode or multiple frame mode. To obtain a single image, "Acquire" under the "Image" menu is selected or the quick access button is pressed. If the "Number of Frame variable in the Frame Averaging" option box is greater than one, the camera will acquire the specified number of images and return the averaged result as a single frame.

For FERIT specific application (thermography), a scripting mode is provided to help the user to step through the required steps: acquiring background image, acquiring the reference image, starting sequence. The steps are accomplished by selecting commands under the "Script" menu. For background image, "Background" command under the menu is selected. For reference image, "Reference" command under the menu is selected. To start the measurement sequence for the experiment, "Start Sequence" is selected. This brings up a dialog box to confirm the action. The "Start" button in the dialog box is pressed to start the acquisition.

(4) Temperature. After the images have been acquired (bg.tif, ref.tif, image##.tif), the temperature distribution can be obtained using the temperature rendering commands. The punch sign denotes the index of the image acquired at a specified moment. With at least the above three files opened, the temperature corresponding to image##.tif can be converted to temperature. The "Settings" command under the "Process" menu allows the user to input the reference temperature and the desired temperature range to be displayed. Temperature Conversion can be activated by the Temperature command under the Process menu and a new image containing the thermographic information is created (therm##.tif). To view a temperature, "Temperature" under the "View" menu is selected.

(5) View. Several visualization modes are provided, which includes "Gray Scale", pseudo "Color" (green-yellow-red), "Default" (no 16 to 8 bit conversion, useful to get higher frame rate), and "Temperature" for viewing the temperature distribution. The temperature is represented internally as 16 bit data (to comply with TIFF file format) which is related by the following equations.

$$\text{Intensity} = \text{Temperature}(C) * 100 + 32767 \qquad [\text{Eqn. 5}]$$

$$\text{Temperature} = (\text{Intensity} - 32767)/100.0 \qquad [\text{Eqn. 6}]$$

Figure 7:
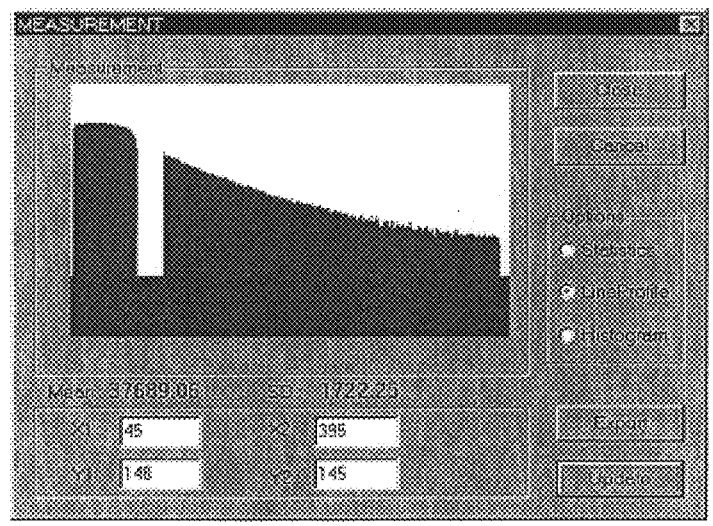
FIG. 7 is a computer screen display of a measurement panel produced by the program of the present invention.

(6) Measurement. Two measurement methods are provided with the software. A single point measurement is given in the status bar (at the bottom portion of the application window), which indicates the intensity or temperature (depending on the View mode) at the location of the mouse pointer. A more advanced measurement tool is also provided to facilitate intensity and statistical measurements for a line profile and an area of interest. The measurement template can be activated by selecting the "Measurements" command under "Process" menu. FIG. 7 shows the measurement template.

Measurement modes (Statistics, Line-Profile, and Histogram) is selected by clicking the selection buttons. Coordinates of two end points are defined in the four editable input fields. The measurement can be performed by pressing the "Update" button. The statistical measurement results (average, standard deviation) will be displayed below the plot area. After the measurement has been updated, the results can be output to an external ASCII file "output.txt". For example, if the measurement mode is Line-Profile, the value of pixels along the line segment connecting the two specified end points will be exported as a column of numbers. If the Mode is set to Statistics, the pixel values within the rectangle defined by the two end points will be exported as a two dimensional matrix. The "Close" button saves the current measurement configuration so that they can be used in future measurements without the need to re-enter them.

(7) DAQ Control. The software also provides control for extra hardware such as data acquisition and temperature measurement. The commands under the "DAQ" menu can be used to activate the simultaneous UV intensity monitoring function and an output digital pulse to control the duration of the application of the heating source.

TCDAQ—A Temperature Measurement Virtual Instrument. Because temperature measurement using thermocouples is necessary in order to conduct calibration and provide reference temperature, a WINDOWS-based software TCDAQ.EXE was developed to integrate data acquisition and temperature measurement hardware such as the CIO-DAS802/16 and CIO-EXP16 boards and software library (Cbw32.dll), as well as to provide visualization for the acquired data.

The CIO-DAS802/16 and CIO-EXP16 boards (from Computerboards) are both used to conduct temperature measurement. The CIO-DAS802/16 is a data acquisition board with 8 input channels and four digital output channels. The CIO-EXP16 is an extension board with on-board amplifier and cold junction compensation (CJC) sensor for temperature measurement and has 16 inputs. The four digital lines of the CIO-DAS802/16 select which input channel to read by sending digital controls to the multiplexer on the CIO-EXP16. The thermocouple and CJC outputs occupy two of the eight inputs to the CIO-DAS802/16 (channel 7 and 8, they can be re-configured by rearranging the jumpers on the extension board CIO-EXP16) and reading from the corresponding input channels.

Figure 8:
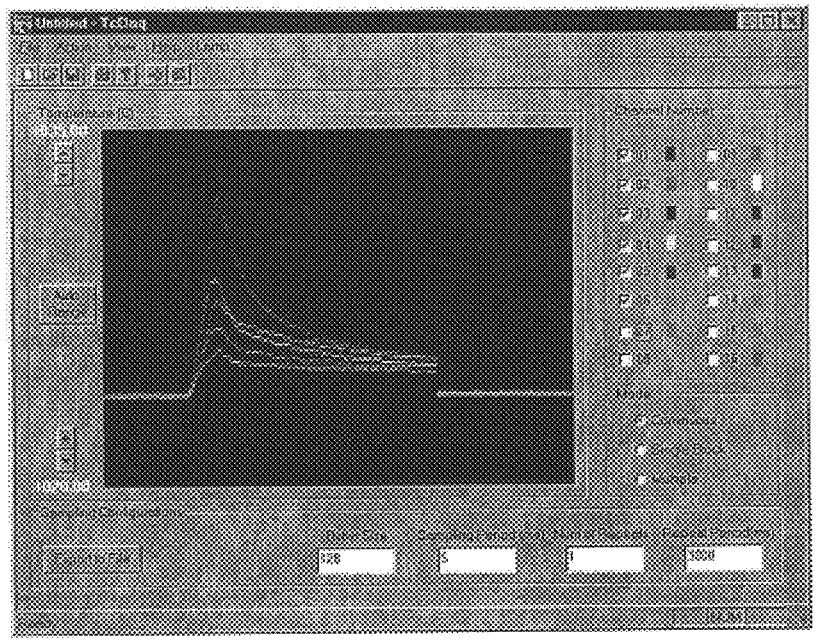
FIG. 8 is a computer screen display of a single-document graphic user interface panel produced by the program of the present invention.

The software was created with Microsoft VISUAL C++ and features a single-document graphic user interface. Supported operations are straightforward since the application interface emulates a virtual instrument (FIG. 8).

(1) File Handling. Instead of implementing an internal data structure to represent temperature, an export function was incorporated to output ASCII format data since they are readily read by data processing software such as Excel.

(2) Display Area. Data being measured or previously measured are display in the display area as colored pixels. The display upper and lower temperature ranges are shown in the top and bottom left of the plot area. Two display modes are supported, the auto or manual range. In the Auto-Range mode, the software checks the maximum and minimum values of the acquired data in the buffer and appropriately changes the display range so that all data will fit in the display area. In the Manual-Range mode, the range can be changed manually using the buttons near the numeric range displays. The triangle within the button indicates the direction of change.

(3) Channels. The CIO-EXP16 extension board has 16 inputs which are reflected in the channel selection area in the application software. A channel can be activated by clicking in the checkbox so that a check mark is displayed for that channel. To deactivate a channel, simply click the checkbox again and the check mark will disappear, which will terminate the measurement and display for that channel. A warning message is given if the user is trying to start the acquisition without specifying at least one input channel.

(4) Modes. Three measurement modes are provided: Single block, Continuous, and Multiple-Blocks. In the Single Block measurement mode, the application will not return and the results will not be displayed until the specified number of data points has been obtained. A message box will notify the user that the acquisition is completed.

In the Continuous mode, data acquisition and display are concurrent so the acquisition rate is limited. The software uses a circular buffer to hold the data which means it will over-write the beginning of the buffer if it reaches the end of it. All the data in the buffer will be output starting from the most recently acquired ones, if the "Export" button is pressed.

In the Multiple-Blocks mode, the software will acquire a block of data at the specified rate, and will wait for a specified amount of time before starting to acquire another block of data, until the specified number of blocks of data has been obtained. This feature is useful for repeated measurements such as long term stability analysis.

(5) Configuration. The parameters for acquisition are controlled by the user inputs for acquisition rate, buffer size (number of samples), number of multiple blocks, and multiple block interval, which are located in the lower right corner of the interface. For multi-channel acquisition, the sampling rate is for all channels, saving the user the effort of calculating the actually rate if the rate is per channel based.

(6) Export. The export file is in ASCII format so that it can be imported to other programs for further analysis. At the beginning of the file is information regarding the acquisition parameters such as sampling rate and number of samples. Data are listed as columns with channel number indicted at the beginning of each column. In multiple blocks mode, there is a blank line separating two blocks of data and each block of data is marked by a block number at the beginning of that block.

(7) Action Control. Two simple action controls are provided to control the acquisition: Start and Stop. The Start command under Action menu or the button can be used to initiate an acquisition. The Stop command under the Action menu or the button is used to stop a continuous acquisition at any time.

DAQ—A General Purpose Data Acquisition Virtual Instrument. This program is very similar to the TCDAQ program except that it is a general purpose data acquisition instrument, which will work with CIO-DAS802/16. It can read 8 analog input channels and has 4 digital input/output lines. In our application, its first channel was used to measure UV excitation fluctuation with the integrated photodiode and amplifier (OPT301M).

The software was created with Microsoft VISUAL C++ and it features a single-document graphic user interface. Supported operations are fairly straightforward since the application interface emulates a virtual instrument (FIG. 9).

(1) File Handling. Instead of implementing an internal data structure to represent temperature, an export function was incorporated to output ASCII format data since they are readily read by data processing software such as Excel.

(2) Display Area. Data being measured or previously measured are displayed in the display area as colored pixels. The display ranges are shown in the top and bottom left of the plot area.

(3) Channels. A channel can be activated by clicking in the checkbox so that a check mark is displayed for that channel. To deactivate a channel, simply click the checkbox again and the check mark will disappear, which will terminate the measurement and display for that channel. A warning message will be given if the user is trying to start the acquisition without specifying at least one input channel.

(4) Modes. Three measurement modes are provided: Single block, Continuous, and Multiple-Blocks. In Single Block measurement, the application will not return and the results will not be displayed until the specified number of data points has been obtained. A message box will notify the user that the acquisition is completed.

In Continuous mode, data acquisition and display are concurrent so the acquisition rate is limited. The software uses a circular buffer to hold the data which means it will over-write the beginning of the buffer if it reaches the end of it. All the data in the buffer will be output starting from the most recently acquired ones, if the "Export" button is pressed.

In Multiple-Blocks mode, the software will acquire a block of data at the specified rate, and wait for a specified amount of time before starting to acquire another block of data, until the specified number of blocks of data has been obtained. This feature is useful for repeated measurement such as long term stability analysis.

(5) Configuration. The parameters for acquisition are controlled by the user inputs for ranges, acquisition rate, buffer size (number of samples), number of multiple blocks, multiple block interval, which are located in the lower right corner of the interface. For multi-channel acquisition, the sampling rate is for all channels, saving the user the effort to calculate the actually rate if the rate is per channel based.

(6) Export. The export file is in ASCII format so that they can be imported to other programs for further analysis. At the beginning of the file is information regarding the acquisition parameters such as sampling rate and the number of samples. Data are listed as columns with channel number indicted at the beginning of each column. In multiple blocks mode, there is a blank line separating two blocks of data and each block of data is marked by a block number at the beginning of that block.

(7) Action Control. Two simple action controls are provided to control the acquisition: Start and Stop. The Start command under Action menu is used to initiate an acquisition. The Stop command under the Action menu is used to stop a continuous acquisition at any time.

EXAMPLE 12

This example provides an example on how to compensate for error of the mathematical model While using a polynomial to describe the fluorescent~temperature behavior (calibration), an error can be reduced by employing a polynomial of an appropriate degree. The following MATAB script gives an estimate of the possible error for different cases:

clear all;

temperature=
  [23.499431
  30.381219
  40.340126
  50.516041
  60.448514
  70.215188
  80.385338];

intensity=
  [2179.73
  2031.4607
  1727.6707
  1391.8878
  1032.6153
  718.93476
  454.10963];

N=7;

[P,S]=polyfit(temperature,intensity,N);/*get polynomial coefficients*/T=[23.5:0.1:80.5]; [out, delta]=polyval(P, T,S);/* interpolation results and error */ error1=max(abs(delta))

error2=(sum(abs(delta)))/length(T)

TABLE 5

Errors of Polynomial Fits.

| Degree | 1 | 2 | 3 | 4 | 5 | 6 | 7 |
|---|---|---|---|---|---|---|---|
| Max_Error (DU) | 43.61 | 52.67 | 8.62 | 10.71 | 16.10 | N/A | 0.32 |
| Ave. Error (DU) | 40.02 | 45.66 | 7.45 | 9.56 | 13.59 | N/A | 0.16 |

TABLE 5-continued

Errors of Polynomial Fits.

| Degree | 1 | 2 | 3 | 4 | 5 | 6 | 7 |
|---|---|---|---|---|---|---|---|
| Max Error (° C.) | 1.44 | 1.74 | 0.28 | 0.35 | 0.53 | N/A | 0.01 |
| Max Error (° C.) | 1.32 | 1.50 | 0.25 | 0.32 | 0.45 | N/A | 0.005 |

Remarks: (1) Error (c)=Error (DU)/Slope_of_Calib_Curve=Error(DU)/30.34. (2) Polynomial of degree 6 caused singularity in error estimate parameters.

While the present invention is described herein with reference to illustrated embodiments, it should be understood that the invention is not limited hereto. Those having ordinary skill in the art and access to the teachings herein will recognize additional modifications and embodiments within the scope thereof. Therefore, the present invention is limited only by the claims attached herein.

An example of the program that contains the key code for the software as used herein is as follows.

```
void CFeritApp::OnProcessTemperature()
{
/* This data processing function/method calculates the
ratio of pixel intensities of image of interest
to the reference image intensities where the
temperature is known, and then compares the ratio
against the calibration lookup table to deduce the
actual temperature; according to
the following equation, for each pixel in the image:
    image_intensity_ratio [i, j ]
    = (Image_of_interest[i, j] – background_image[i,
j]) / (reference_image[i, j] – background_image[i,
j]);
then searches for corresponding temperature at the
calibration lookup table that satisfies:
    image_intensity_ratio [i, j ]
    =
calibration_lookup_table(temperature_of_interest[i,
j])/calibration_lookup_table(reference_temperature[i,
j]).
```

The calibration lookup table takes the form of (example):

| temperature | intensity |
|---|---|
| 20.00 | 2177.3639 |
| 20.01 | 2177.5030 |
| 20.02 | 2177.6411 |
| 20.03 | 2177.7784 |
| 20.04 | 2177.9148 |
| 20.05 | 2178.0502 |
| ... | ... |
| 83.00 | 354.9928 |
| 83.01 | 354.5434 |
| 83.02 | 354.0934 |
| 83.03 | 353.6426 |
| 83.04 | 353.1913 |
| 83.05 | 352.739 |

```
*/
  // TODO: Add your command handler code here
  CDocument* doc;
  POSITION pos;
  int getboth=0, skip;
  char newname[8];
  CFeritDoc *img, *active, *therm, *bg, *ref;
  CObList* pdoclist=new CObList;
  WORD *bgptr, *refptr, *thermptr, *activeptr;
  GetDocumentList (pdoclist);
```

-continued
```
        if (pdoclist->GetCount() <=2) { delete pdoclist;
return; }
        pos=pdoclist->GetHeadPosition();
        while (pos) {
            doc=(CDocument *) pdoclist->GetNext(pos);
            img=(CFeritDoc*) doc;
            if ( img->GetTitle()=="bg.tif" ) {bg =img;
getboth++;}
            if ( img->GetTitle()=="ref.tif") {ref=img;
getboth++;}
            if (getboth==2) break;
        }
        if(getboth != 2) { delete pdoclist;
AfxMessageBox((LPCSTR)"Background and Reference Images
not Available", MB_OK, NULL); return;}
        bg->DeleteHDAT();
        ref->DeleteHDAT();
        bg->SetHDAT(::DIBToData(bg->GetHIMG()));
        ref->SetHDAT(::DIBToData(ref->GetHIMG()));
        DoWaitCursor(1);
        HDAT hDat = (HDAT) ::GlobalAlloc(GMEM_MOVEABLE |
GMEM_ZEROINIT, (area_height*area_width*2));
        thermptr=(WORD *) ::GlobalLock((HGLOBAL) hDat);
        HDAT hbg = bg->GetHDAT();
        HDAT href= ref->GetHDAT();
        bgptr=(WORD *) ::GlobalLock((HGLOBAL) hbg);
        refptr=(WORD *) ::GlobalLock((HGLOBAL) href);
        CMDIChildWnd *child=((CMainFrame *)
m_pMainWnd)->MDIGetActive();
        if (child==NULL) return;
        active=(CFeritDoc *) child->GetActiveDocument();
        newname[5]=(active->GetTitle()).GetAt(5);
        newname[6]=(active->GetTitle()).GetAt(6);
        if (child->IsIconic())
child->ShowWindow(SW_RESTORE);
        active->SetHDAT(::DIBToData(active->GetHIMG()));
        HDAT hactive = active->GetHDAT();
        activeptr = (WORD *) ::GlobalLock((HGLOBAL)
hactive);
        double        Irefcalib, Idestcalib;
        double        *tempT, *tempI;
        //Iredcalib:intensity at Tref along calibration
curve
        //Idestcalib: intensity of Tunknown at sought
temperature
        //Iref: measured temperature at Tref
        //Ithis: measured intensity at current image
        if(!calibread) {
            FILE *fpcalib;
if(fpcalib=fopen("C:\\Windows\\Calibpoly.txt","r")) {
                fscanf(fpcalib, "%d", &numofpoints);
                calibTptr=new double
[numofpoints];
                calibIptr=new double
[numofpoints];
                tempT=calibTptr; tempI=calibIptr;
                for(int i=0;i<numofpoints;i++) {
                    fscanf(fpcalib," %lf %lf",
tempT,tempI);
                    tempT++;
                    tempI++;
                }
                calibread=true;
                fclose(fpcalib);
            }
            else {
                AfxMessageBox("Unable to Open Calib
File!",MB_OK,NULL); }
            }
        Tmin=*calibTptr; Tmax=* (calibTptr+numofpoints-1);
        Imax=*calibIptr; Imin=* (calibIptr+numofpoints-1);
        deltaT = (Tmax-Tmin)/(numofpoints-1);
        Nref = (int)((Tref - Tmin)/deltaT);
        Irefcalib=*(calibIptr+Nref);
        for(int i=0;i<area_width;i++) {
            for(int j=0;j<area_height;j++) {
                if(*activeptr >inten_threshold &&
*bgptr <bg_threshold) {
                    Idestcalib= Irefcalib *
                    (*activeptr - *bgptr)/(*refptr - *bgptr);
                    tempI = calibIptr + Nref;
                    if (Idestcalib < Imax ||
Idestcalib > Imin) {
                        if( Idestcalib < Irefcalib)
                            tempI += (int)((numofpoints -
Nref) * (Idestcalib-Irefcalib)
/(Imin-Irefcalib));
                        else
                            tempI += (int) (Nref *
(Irefcalib-Idestcalib)
/(Imax-Irefcalib));
                        found=true;
                        while(found && tempI <
(calibIptr+numofpoints-1) && tempI > calibIptr) {
                            if ( ( (*tempI) > Idestcalib ) {
                                if ( *(tempI+1) < Idestcalib)
                                    found=false;
                                else tempI++;
                            }
                            else {
                                if ( *(tempI-1) > Idestcalib)
                                    found=false;
                                else tempI--;
                            }
                        }
                        skip=tempI-calibIptr;
                        if (skip < Nref && Tpolarity)
skip=Nref;
                        if (skip > Nref && !Tpolarity)
skip=Nref;
*thermptr=(WORD)((*(calibTptr+skip))*100+32767);
                    }
                    else *thermptr=(WORD) (Tref*100)+32767;
                    thermptr++;
                    refptr++;
                    bgptr++;
                    activeptr++;
                }
            }
        //Make a New Document without a dialog showing up
        OpenDlg=TRUE;
        OnFileNew();
        OpenDlg=FALSE;
        pdoclist->RemoveAll();
        GetDocumentList(pdoclist);
        doc=(CDocument* ) pdoclist->GetTail();
        therm=(CFeritDoc* ) doc;
        name[0]='T';
        name[1]='h';
        name[2]='e';
        name[3]='r';
        name[4]='m';
          name[5]=newname[5];
          name[6]=newname[6];
        therm->SetTitle(name);
        therm->SetHIMG(::DataToDIB(hDat)); // Get the
horizontal image from the global chunk
        therm->DeleteHDAT();
        therm->SetHDAT(::DIBToData(therm->GetHIMG()));
        therm->SetModifiedFlag(FALSE);
        therm->UpdateAllViews(NULL);
        bg->UpdateAllViews(NULL);
        ref->UpdateAllViews(NULL);
        bg->DeleteHDAT();
        ref->DeleteHDAT();
        active->DeleteHDAT();
        :GlobalUnlock((HGLOBAL)hDat);
        ::GlobalUnlock((HGLOBAL)hbg);
        ::GlobalUnlock((HGLOBAL)href);
        ::GlobalUnlock((HGLOBAL)hactive);
        ::GlobalFree((HGLOBAL) hDat);          // Free the
global chunk
        delete pdoclist;
        DoWaitCursor(-1);
        DoWaitCursor(0);
}
```

We claim:

1. A system for determining a temperature distribution of a surface exhibiting spatial, temporal, or combinations thereof variations in temperature over time where there is a layer on the surface with a temperature sensitive fluorescent material in an ultraviolet and fluorescence transparent medium, wherein the material is in thermal contact with the surface, and wherein the fluorescence emission of the material varies as the temperature of the surface varies, which system comprises:
   (a) as the temperature sensitive fluorescent material a lanthanide($\beta$-diketone)$_3$ chelate which is resistant to photobleaching when exposed to a fluorescence-inducing energy over time;
   (b) light producing means for exposing the material to the fluorescence-inducing energy over time as the temperature varies to induce the material to emit fluorescence at one or more visible wavelengths;
   (c) sensing means for detecting an image of the fluorescence induced by the fluorescence-inducing energy;
   (d) photodiode means for measuring fluctuations in the fluorescence-inducing energy during calibration of the system or during long exposure times of the material to the fluorescence-inducing energy source; and
   (e) computer means for processing the image from the sensing means and the measurements from the photodiode means wherein the computer means determines the temperature distribution of the surface over time by establishing a calibration between either
      (i) a ratio of broadband fluorescent intensity at an unknown temperature and at a known reference temperature for each location on the surface, or
      (ii) a ratio of fluorescent intensities of at least two distinct wavelengths of fluorescence emission, whereby the ratio is an indication of the temperature for each location on the surface.

2. A system for determining a temperature profile of a surface exhibiting spatial, temporal, or combinations thereof variations in temperature where on the surface is a layer including a temperature-sensitive fluorescent material in an ultraviolet and fluorescence transparent medium capable of being positioned on the surface wherein the fluorescence of the material varies as the temperature varies, which comprises:
   (a) the layer including at least one temperature-sensitive fluorescent material selected from the group consisting of europium(1,1,1,5,5,5-hexafluoroacetylacetone)$_3$ and terbium(1,1,1,5,5,5-hexafluoroacetylacetone)$_3$;
   (b) a light producing means for providing a fluorescence-inducing energy source for inducing the temperature-sensitive fluorescent material to emit fluorescence in one or more visible wavelengths, which are reproducible over time;
   (c) a sensing means for acquiring an image of the fluorescence;
   (d) a photodiode means for measuring fluctuations in the fluorescence-inducing energy during calibration of the apparatus or during long exposure times of the layer on the surface to the fluorescence-inducing energy source; and
   (e) a computer means for processing the image acquired by the sensing means and the measurements from the photodiode means wherein the computer means determines the temperature distribution of the surface at each point in the image by determining a relationship between the fluorescence and the temperature for each location on the surface by establishing a calibration between either
      (i) a ratio of broadband fluorescent intensity at an unknown temperature and at a known reference temperature for each location on the surface, or
      (ii) a ratio of fluorescent intensities of at least two distinct wavelengths of fluorescence emission, whereby the ratio is an indication of the temperature for each location on the surface.

3. A method for measuring a temperature distribution of a surface exhibiting spatial, temporal, or combinations thereof variations in temperature, comprising:
   (a) providing a surface with a layer of a temperature-sensitive fluorescent material including a lanthanide($\beta$-diketone)$_3$ chelate which is resistant to photo-bleaching over time in an ultraviolet and fluorescence transparent medium, wherein the material is in thermal contact with the surface, and wherein the fluorescence emission of the material varies as the temperature of the surface varies;
   (b) exposing the material to a fluorescence-inducing energy source which induces the material to emit fluorescence at one or more visible wavelengths over time;
   (c) detecting the induced fluorescence emission with a sensing means over time, which produces an image of the induced fluorescence, and measuring fluctuations in the fluorescence-inducing energy during calibration of the method and during long exposure times of the material on the surface to the fluorescence-inducing energy source with a photodiode; and
   (d) determining the temperature distribution of the surface from the image produced by the sensing means and the fluctuations detected by the photodiode by establishing a calibration which defines quantitatively a relationship between fluorescence intensity and the temperature for each location on the surface wherein the calibration is either
      (i) a ratio of broadband fluorescent intensity at an unknown temperature and at a known reference temperature for each location on the surface, or
      (ii) a ratio of fluorescent intensities of at least two distinct wavelengths of fluorescence emission, whereby the ratio is an indication of the temperature for each location on the surface.

4. A method for measuring a temperature distribution of a surface exhibiting spatial, temporal, or combinations thereof variations in temperature, comprising:
   (a) providing a surface with a layer of a temperature-sensitive fluorescent material including a lanthanide($\beta$-diketone)$_3$ chelate selected from the group consisting of europium(1,1,1,5,5,5-hexafluoroacetylacetone)$_3$, europium(benzoyl-1,1,1-trifluoroacetone)$_3$, europium(6,6,7,7,8,8,8-heptafluoro-2,2-dimethyl-3,5-octanedionato, europium(2,2,6,6-tetramethyl-3,5-heptanedionato)$_3$, terbium(1,1,1,5,5,5-hexafluoroacetylacetone)$_3$, terbium(benzoyl-1,1,1-trifluoroacetone)$_3$, terbium(6,6,7,7,8,8,8-heptafluoro-2,2-dimethyl-3,5-octanedionato)$_3$, and terbium(2,2,6,6-tetramethyl-3,5-heptanedionato)$_3$, and combinations thereof and which is resistant to photo-bleaching over time in an ultraviolet and fluorescence transparent medium, wherein the material is in thermal contact with the surface, and wherein the fluorescence emission of the material varies as the temperature of the surface varies;

(b) exposing the material to a fluorescence-inducing energy source which induces the material to emit fluorescence at one or more visible wavelengths over time;

(c) detecting the induced fluorescence emission with a sensing means over time, which produces an image of the induced fluorescence, and measuring fluctuations in the fluorescence-inducing energy during calibration of the method and during long exposure times of the material on the surface to the fluorescence-inducing energy source with a photodiode; and (d) determining the temperature distribution of the surface from the image produced by the sensing means and the fluctuations detected by the photodiode by establishing a calibration which defines quantitatively a relationship between fluorescence intensity and the temperature for each location on the surface wherein the calibration is either
   (i) a ratio of broadband fluorescent intensity at an unknown temperature and at a known reference temperature for each location on the surface, or
   (ii) a ratio of fluorescent intensities of at least two distinct wavelengths of fluorescence emission, whereby the ratio is an indication of the temperature for each location on the surface.

5. A method for measuring a temperature distribution of a surface exhibiting spatial, temporal, or combination thereof variations in temperature, comprising:

(a) providing on the surface with a layer of at least one temperature-sensitive fluorescent material selected from the group consisting of Europium(1,1,1,5,5,5-hexafluoroacetylacetone)$_3$ and terbium(1,1,1,5,5,5-hexafluoroacetylacetone)$_3$ in an ultraviolet and fluorescence transparent medium, wherein the material is in thermal contact with the surface, and wherein fluorescence emission of the material varies as the temperature of the surface varies;

(b) exposing the material to fluorescence-inducing energy which causes the material to emit fluorescence in a visible wavelength;

(c) detecting the fluorescence emission of the material and fluctuations in the fluorescence-inducing energy over time; and (d) determining the temperature distribution of the surface over time by determining a relationship between the fluorescence intensity and the temperature for each location on the surface by establishing a calibration between either
   (i) a ratio of broadband fluorescent intensity at an unknown temperature and at a known reference temperature for each location on the surface, or
   (ii) a ratio of fluorescent intensities of at least two distinct wavelengths of fluorescence emission, whereby the ratio is an indication of the temperature for each location on the surface.

* * * * *

UNITED STATES PATENT AND TRADEMARK OFFICE
CERTIFICATE OF CORRECTION

PATENT NO.    : 6,648,506 B2
DATED         : November 18, 2003
INVENTOR(S)   : John J. McGrath and Bin Lian It is certified that error appears in the above-identified patent and that said Letters Patent is hereby corrected as shown below:

Column 3,
Lines 59 and 60, "produces is ultraviolet" should be -- produces ultraviolet --.

Column 4,
Lines 13 and 16, "heptafluooro" should be -- heptafluoro --.

Column 5,
Lines 47 and 50, "heptafluooro" should be -- heptafluoro --.

Column 8,
Lines 14 and 17, "verses" should be -- versus --.
Line 18, "effect for of probe" should be -- effect of probe --.

Column 9,
Line 45, "plated" should be -- plate --.

Column 12,
Lines 54 and 58, "heptafluooro" should be -- heptafluoro --.

Column 13,
Line 29, "Eh(hfa)$_3$" should be -- Eu(hfa)$_3$ --.
Line 49, "240 C" should be -- 24°C --.

Column 14,
Line 21, "I$^+$ (T$_{ref}$)" should be -- I* (T$_{ref}$) --.
Lines 22 and 24, "I$^+$(T$_{unknown}$) " should be -- I$^*$ (T$_{unknown}$) --.
Line 47, "I$^+$ (T$_{ref}$)" should be -- I$^*$ (T$_{ref}$) --.
Line 48, "I$^+$ (T$_{unknown}$) " should be -- I$^*$(T$_{ref}$) --.
Lines 48 and 49, "intensity temperature" should be -- intensity ~ temperature --.
Line 66, "QE$_{ccd}$ is is the" should be -- QE$_{ccd}$ is the --.

Column 19,
Line 2, "amount amateurs" should be -- amount for amateurs --.

Column 21,
Line 37, "Q=$_\Pi$ (D$_1$/2)$^2$/L$^2$=" should be -- $\Omega$=$_\Pi$ (D$_1$/2)$^2$/L$^2$= --.
Line 42, "Q=$_\Pi$(D$_2$/2)$^2$/L$^2$=0.785" should be -- $\Omega$=$_\Pi$ (D$_2$/2 )$^2$/L$^2$=0.785 --.

Column 24,
Line 49, "UXM-S20OKL," should be -- UXM-S200KL, --.

UNITED STATES PATENT AND TRADEMARK OFFICE
CERTIFICATE OF CORRECTION

PATENT NO.    : 6,648,506 B2
DATED         : November 18, 2003
INVENTOR(S)   : John J. McGrath and Bin Lian It is certified that error appears in the above-identified patent and that said Letters Patent is hereby corrected as shown below:

Column 27,
Line 35, "CDD" should be -- CCD --.
Line 65, "30°C" should be -- -30°C --.

Column 30,
Line 40, "EUTTA" should be -- EuTTA --.

Column 33,
Line 40, "σtest" should be -- $\sigma_{test}$ --.
Line 42, "$\sigma^2_{intensity}+\sigma^2_{TC}$" should be -- $\sigma_{intensity}^2+\sigma_{TC}^2$ --.

Column 35,
Line 14, "$0.64^2 +6.0^2 +(30000*0.001)^2 +0.0^2 +1.0^2$" should be -- $0.64^2 +6.0^2 + (3000. 0*0. 001)^2 +0.0^2 +1.0^2$ --.
Line 19, "$0.64^2 +0.0^2 + (30000* 0.001)^2 +0.0^2 +1.0^2$" should be -- $0.64^2+ 0.0^2 + (3000. 0*0.001)^2+ 0.0^2+ 1.0^2$ --.

Column 42,
Line 37, "T (i, j) = $T_{apparent}$ (i, j) /$\epsilon^{+hu1/4}$" should be -- T (i, j) = $T_{apparent}$ (i, j) /$\epsilon^{1/4}$ --.

Column 52,
Line 14, "indicted" should be -- indicated --.

Column 53,
Line 16, "indicted" should be -- indicated --.

Signed and Sealed this

Eleventh Day of May, 2004

JON W. DUDAS
*Acting Director of the United States Patent and Trademark Office*